US 12,541,544 B2

(12) United States Patent
D'Agostino

(10) Patent No.: US 12,541,544 B2
(45) Date of Patent: Feb. 3, 2026

(54) GENERATING A RESPONSE FOR A COMMUNICATION SESSION BASED ON PREVIOUS CONVERSATION CONTENT USING A LARGE LANGUAGE MODEL

(71) Applicant: The Toronto-Dominion Bank, Toronto (CA)

(72) Inventor: Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/620,601

(22) Filed: Mar. 28, 2024

(65) Prior Publication Data

US 2025/0307290 A1 Oct. 2, 2025

(51) Int. Cl.
G06F 16/33 (2025.01)
G06F 16/334 (2025.01)
G06F 16/338 (2019.01)

(52) U.S. Cl.
CPC ........ G06F 16/3347 (2019.01); G06F 16/338 (2019.01)

(58) Field of Classification Search
None
See application file for complete search history.

(56) References Cited

U.S. PATENT DOCUMENTS

| | | | |
|---|---|---|---|
| 10,025,775 B2 | 7/2018 | Nowson et al. | |
| 10,033,860 B2 | 7/2018 | Rajanna | |
| 10,147,427 B1 | 12/2018 | Johnson et al. | |
| 10,311,161 B2 | 6/2019 | Cypher et al. | |
| 10,339,931 B2 | 7/2019 | Tseretopoulos et al. | |
| 10,360,303 B2 | 7/2019 | Volkovs et al. | |
| 10,362,978 B2 | 7/2019 | Des Jardins et al. | |
| 10,418,035 B1 | 9/2019 | Johnson et al. | |
| 10,460,748 B2 | 10/2019 | Tseretopoulos et al. | |
| 10,482,675 B1 | 11/2019 | Sutter et al. | |
| 10,509,864 B2 | 12/2019 | Kang et al. | |
| 10,552,505 B2 | 2/2020 | Ezepov | |
| 10,565,533 B2 * | 2/2020 | Keyngnaert | G06N 20/00 |
| 10,659,400 B2 | 5/2020 | Moon et al. | |
| 10,706,635 B2 | 7/2020 | Sutter et al. | |
| 10,728,259 B2 | 7/2020 | McCarter et al. | |
| 10,776,619 B2 | 9/2020 | Collinson et al. | |
| 10,782,986 B2 | 9/2020 | Martin | |
| 10,795,923 B2 | 10/2020 | Jayaraman et al. | |
| 10,812,937 B2 | 10/2020 | Mittal et al. | |
| 10,824,941 B2 | 11/2020 | Volkovs et al. | |
| 10,849,542 B2 | 12/2020 | Des Jardins et al. | |

(Continued)

*Primary Examiner* — Eliyah S. Harper

(57) ABSTRACT

An example operation may include one or more of receiving interaction content from a communication session between a source device and a service provider device of a service provider, identifying a search criteria from the interaction content, retrieving a subset of vectors from a plurality of vectors stored in a vector database based on the search criteria of the interaction content, wherein the subset of vectors includes previous interaction content with the service provider, generating a response for the communication session based on execution of a large language model (LLM) on the subset of vectors, and outputting the response to at least one of the source device and the service provider device during the communication session.

20 Claims, 34 Drawing Sheets

(56) References Cited

U.S. PATENT DOCUMENTS

| | | | |
|---|---|---|---|
| 10,878,816 B2 | 12/2020 | Tseretopoulos et al. | |
| 10,902,220 B2 | 1/2021 | Lozon et al. | |
| 10,922,665 B2 | 2/2021 | Miller et al. | |
| 10,943,605 B2 | 3/2021 | Tseretopoulos et al. | |
| 11,004,187 B2 | 5/2021 | Kuruvilla et al. | |
| 11,017,028 B2 | 5/2021 | Dunjic et al. | |
| 11,030,415 B2 | 6/2021 | Volkovs et al. | |
| 11,030,625 B1 | 6/2021 | Fisi et al. | |
| 11,061,638 B2 | 7/2021 | Lam | |
| 11,070,448 B2 | 7/2021 | Miller et al. | |
| 11,080,481 B2 | 8/2021 | Zhang | |
| 11,080,605 B1 | 8/2021 | Yarbrough et al. | |
| 11,087,314 B2 | 8/2021 | Gandhi et al. | |
| 11,100,168 B2 | 8/2021 | Miller et al. | |
| 11,138,424 B2 | 10/2021 | Denk et al. | |
| 11,144,921 B2 | 10/2021 | Dunjic et al. | |
| 11,144,998 B2 | 10/2021 | Kuruvilla et al. | |
| 11,146,865 B2 | 10/2021 | Gattis et al. | |
| 11,151,328 B2 | 10/2021 | Prasad et al. | |
| 11,182,860 B2 | 11/2021 | Kuruvilla et al. | |
| 11,200,328 B2 | 12/2021 | Shpurov et al. | |
| 11,200,411 B2 | 12/2021 | Rizvi et al. | |
| 11,222,286 B2 | 1/2022 | Choe et al. | |
| 11,233,897 B1 | 1/2022 | Gardner et al. | |
| 11,244,226 B2 | 2/2022 | Munkberg et al. | |
| 11,276,257 B2 | 3/2022 | Moghtadai et al. | |
| 11,294,891 B2 | 4/2022 | Aggarwal et al. | |
| 11,334,574 B2 | 5/2022 | Caputo et al. | |
| 11,341,962 B2 | 5/2022 | Poltorak | |
| 11,354,442 B2 | 6/2022 | Haldenby et al. | |
| 11,361,566 B2 | 6/2022 | Collinson et al. | |
| 11,367,435 B2 | 6/2022 | Poltorak | |
| 11,373,229 B2 | 6/2022 | Tseretopoulos et al. | |
| 11,379,446 B1 | 7/2022 | Detmer et al. | |
| 11,392,776 B2 | 7/2022 | Lozon et al. | |
| 11,393,020 B2 | 7/2022 | Mathew et al. | |
| 11,394,668 B1 | 7/2022 | Subbunarayanan et al. | |
| 11,397,765 B2 | 7/2022 | Volkovs et al. | |
| 11,409,811 B2 | 8/2022 | D'Agostino | |
| 11,411,734 B2 | 8/2022 | Shpurov et al. | |
| 11,469,878 B2 | 10/2022 | Shpurov et al. | |
| 11,470,091 B2 | 10/2022 | McCarter et al. | |
| 11,475,059 B2 | 10/2022 | Liu et al. | |
| 11,475,251 B2 | 10/2022 | Morin et al. | |
| 11,477,265 B2 | 10/2022 | McPhee et al. | |
| 11,507,622 B2 | 11/2022 | Grebenisan et al. | |
| 11,507,868 B2 | 11/2022 | Kwong et al. | |
| 11,538,041 B1 | 12/2022 | Fisi et al. | |
| 11,570,302 B1 | 1/2023 | Cha et al. | |
| 11,580,762 B2 | 2/2023 | Rizvi et al. | |
| 11,580,968 B1 | 2/2023 | Gupta et al. | |
| 11,604,899 B2 | 3/2023 | Haldenby et al. | |
| 11,620,741 B2 | 4/2023 | Kuruvilla et al. | |
| 11,632,311 B2 | 4/2023 | Miller et al. | |
| 11,636,850 B2 | 4/2023 | Iyer | |
| 11,651,107 B2 | 5/2023 | Pasupuleti et al. | |
| 11,663,488 B2 | 5/2023 | Volkovs et al. | |
| 11,687,995 B2 | 6/2023 | Tseretopoulos et al. | |
| 11,689,484 B2 | 6/2023 | Moon et al. | |
| 11,698,922 B2 | 7/2023 | Pedersen | |
| 11,699,039 B2 | 7/2023 | Somech et al. | |
| 11,704,782 B2 | 7/2023 | Wakim et al. | |
| 11,741,305 B2 | 8/2023 | Skaljin et al. | |
| 11,743,210 B2 | 8/2023 | Moon et al. | |
| 11,748,400 B2 | 9/2023 | Volkovs et al. | |
| 11,755,641 B2 | 9/2023 | Hsiao | |
| 11,782,935 B2 | 10/2023 | Caputo et al. | |
| 11,789,909 B2 | 10/2023 | Grebenisan et al. | |
| 11,790,012 B2 | 10/2023 | D'Agostino | |
| 11,790,354 B2 | 10/2023 | Gandhi et al. | |
| 11,809,486 B2 | 11/2023 | Liu et al. | |
| 11,809,577 B2 | 11/2023 | Begg et al. | |
| 11,829,413 B1 | 11/2023 | Hao et al. | |
| 11,842,252 B2 | 12/2023 | Kuang et al. | |
| 11,886,764 B2 | 1/2024 | Lam | |
| 11,907,674 B1 | 2/2024 | Akerlund et al. | |
| 11,928,112 B2 | 3/2024 | Dunjic et al. | |
| 11,941,525 B2 | 3/2024 | Morin et al. | |
| 11,966,491 B2 | 4/2024 | D'Agostino | |
| 11,978,085 B2 | 5/2024 | Rai et al. | |
| 11,978,090 B2 | 5/2024 | Navarro et al. | |
| 11,995,121 B2 | 5/2024 | Volkovs et al. | |
| 12,008,315 B2 | 6/2024 | Miller et al. | |
| 12,021,874 B2 | 6/2024 | Dunjic et al. | |
| 12,039,535 B2 | 7/2024 | Dunjic et al. | |
| 12,052,363 B2 | 7/2024 | Shpurov et al. | |
| 12,061,652 B2 | 8/2024 | Miller et al. | |
| 12,067,130 B2 | 8/2024 | Shpurov et al. | |
| 12,067,580 B2 | 8/2024 | Jeske et al. | |
| 12,079,351 B2 | 9/2024 | Begg et al. | |
| 12,106,220 B2 | 10/2024 | Volkovs et al. | |
| 12,111,793 B2 | 10/2024 | Grebenisan et al. | |
| 12,124,925 B2 | 10/2024 | Rho et al. | |
| 12,136,079 B2 | 11/2024 | Jones et al. | |
| 12,164,664 B1* | 12/2024 | Dupont | H04L 9/0618 |
| 12,248,974 B1* | 3/2025 | Gates | G06F 40/20 |
| 12,353,456 B2* | 7/2025 | Banda | G06N 3/045 |
| 2012/0110009 A1* | 5/2012 | Kraft | G06Q 10/10 |
| | | | 707/769 |
| 2017/0017897 A1* | 1/2017 | Bugay | G06F 40/169 |
| 2017/0235848 A1* | 8/2017 | Van Dusen | G06Q 30/0201 |
| | | | 705/12 |
| 2018/0268818 A1 | 9/2018 | Schoenmackers et al. | |
| 2019/0189120 A1 | 6/2019 | Sohn et al. | |
| 2019/0205402 A1* | 7/2019 | Sernau | G06Q 50/01 |
| 2020/0058068 A1 | 2/2020 | Gandhi et al. | |
| 2020/0064986 A1 | 2/2020 | Huang | |
| 2021/0027160 A1 | 1/2021 | Volkovs et al. | |
| 2021/0037040 A1 | 2/2021 | Aleks et al. | |
| 2021/0089539 A1 | 3/2021 | Li et al. | |
| 2021/0117893 A1* | 4/2021 | Sohum | G06Q 30/016 |
| 2021/0232950 A1 | 7/2021 | Kono | |
| 2021/0264461 A1 | 8/2021 | Fam | |
| 2021/0352176 A1 | 11/2021 | Van Den Dungen et al. | |
| 2021/0406978 A1* | 12/2021 | Subramanian | G06N 3/08 |
| 2021/0407016 A1 | 12/2021 | Kuruvilla et al. | |
| 2022/0005121 A1* | 1/2022 | Hayward | G06N 3/044 |
| 2022/0058489 A1 | 2/2022 | Volkovs et al. | |
| 2022/0108069 A1 | 4/2022 | Lee | |
| 2022/0157094 A1 | 5/2022 | Moghtadai et al. | |
| 2022/0172083 A1 | 6/2022 | Wu et al. | |
| 2022/0179894 A1* | 6/2022 | Liu | G06F 16/35 |
| 2022/0188705 A1 | 6/2022 | Davoodi et al. | |
| 2022/0198411 A1 | 6/2022 | Jones et al. | |
| 2022/0198445 A1 | 6/2022 | Jones et al. | |
| 2022/0198486 A1* | 6/2022 | Gin | G06N 3/006 |
| 2022/0207295 A1 | 6/2022 | Stanevich et al. | |
| 2022/0207430 A1 | 6/2022 | Dickie et al. | |
| 2022/0207432 A1 | 6/2022 | Whelan et al. | |
| 2022/0207606 A1 | 6/2022 | Dickie et al. | |
| 2022/0253900 A1 | 8/2022 | Mardikar | |
| 2022/0270155 A1 | 8/2022 | Volkovs et al. | |
| 2022/0277213 A1 | 9/2022 | Braviner et al. | |
| 2022/0277227 A1 | 9/2022 | Yu et al. | |
| 2022/0277323 A1 | 9/2022 | Whelan et al. | |
| 2022/0300903 A1 | 9/2022 | Huang et al. | |
| 2022/0309573 A1 | 9/2022 | Mathew et al. | |
| 2022/0318573 A1 | 10/2022 | Smith et al. | |
| 2022/0318617 A1 | 10/2022 | Wong et al. | |
| 2022/0327397 A1 | 10/2022 | Braviner et al. | |
| 2022/0327430 A1 | 10/2022 | Zuberi et al. | |
| 2022/0327431 A1 | 10/2022 | Braviner et al. | |
| 2022/0327432 A1 | 10/2022 | Gutierrez Bugarin et al. | |
| 2022/0327625 A1 | 10/2022 | Leung et al. | |
| 2022/0335718 A1 | 10/2022 | Ma et al. | |
| 2022/0343422 A1 | 10/2022 | Zuberi et al. | |
| 2022/0383313 A1 | 12/2022 | Jones et al. | |
| 2022/0414495 A1 | 12/2022 | Stanevich et al. | |
| 2023/0006809 A1 | 1/2023 | Shpurov et al. | |
| 2023/0007075 A1 | 1/2023 | McPhee et al. | |
| 2023/0011451 A1 | 1/2023 | Lu | |
| 2023/0048437 A1 | 2/2023 | Karbasi et al. | |
| 2023/0083899 A1 | 3/2023 | Gandouet et al. | |
| 2023/0086653 A1 | 3/2023 | Zykh et al. | |

(56) References Cited

U.S. PATENT DOCUMENTS

| | | |
|---|---|---|
| 2023/0107703 A1 | 4/2023 | Zhang et al. |
| 2023/0113752 A1 | 4/2023 | Jorlett et al. |
| 2023/0119108 A1 | 4/2023 | Volkovs et al. |
| 2023/0131935 A1 | 4/2023 | Volkovs et al. |
| 2023/0138014 A1 | 5/2023 | Björkqvist |
| 2023/0153461 A1 | 5/2023 | Kalra et al. |
| 2023/0195734 A1 | 6/2023 | Cashion et al. |
| 2023/0196406 A1 | 6/2023 | Gandouet et al. |
| 2023/0244917 A1 | 8/2023 | Loaiza Ganem et al. |
| 2023/0244962 A1 | 8/2023 | Volkovs et al. |
| 2023/0252301 A1 | 8/2023 | Volkovs et al. |
| 2023/0259883 A1 | 8/2023 | Misler et al. |
| 2023/0267367 A1 | 8/2023 | Volkovs et al. |
| 2023/0267475 A1 | 8/2023 | Navarro et al. |
| 2023/0318994 A1 | 10/2023 | Moon et al. |
| 2023/0351116 A1 | 11/2023 | Skaljin et al. |
| 2023/0368048 A1 | 11/2023 | Yang et al. |
| 2023/0368284 A1 | 11/2023 | Sheikh et al. |
| 2023/0377047 A1 | 11/2023 | Bouëtté et al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0401192 A1 | 12/2023 | Yang et al. |
| 2023/0401553 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |
| 2024/0062019 A1 | 2/2024 | Aberle |
| 2024/0062117 A1 | 2/2024 | Kuang et al. |
| 2024/0095645 A1* | 3/2024 | Elfgren .............. G06Q 10/1053 |
| 2024/0106851 A1 | 3/2024 | Kennedy et al. |
| 2024/0119346 A1 | 4/2024 | Chang et al. |
| 2024/0127036 A1 | 4/2024 | Zuberi et al. |
| 2024/0127214 A1 | 4/2024 | Wander et al. |
| 2024/0193562 A1 | 6/2024 | Pratten et al. |
| 2024/0202756 A1 | 6/2024 | Karl et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289365 A1* | 8/2024 | Beauchamp ........ G06F 16/3329 |
| 2024/0289645 A1 | 8/2024 | Makhijani et al. |
| 2024/0289876 A1 | 8/2024 | Mathew et al. |
| 2024/0296219 A1* | 9/2024 | Gardner ............ G06F 16/90332 |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0338520 A1 | 10/2024 | Misler et al. |
| 2024/0346338 A1 | 10/2024 | Desai et al. |
| 2024/0370479 A1* | 11/2024 | Hudetz ................. G06F 16/316 |
| 2024/0370880 A1 | 11/2024 | Jeske et al. |
| 2024/0370881 A1 | 11/2024 | Jeske et al. |
| 2024/0378396 A1* | 11/2024 | Bhupati .................. G06F 40/20 |
| 2024/0403373 A1* | 12/2024 | Chao .................. G06F 16/9538 |
| 2025/0086647 A1* | 3/2025 | Gao ........................ G06F 40/30 |
| 2025/0182134 A1* | 6/2025 | Arianpoo ............... G06N 5/022 |
| 2025/0190470 A1* | 6/2025 | Khullar ............. G06F 16/3347 |

* cited by examiner

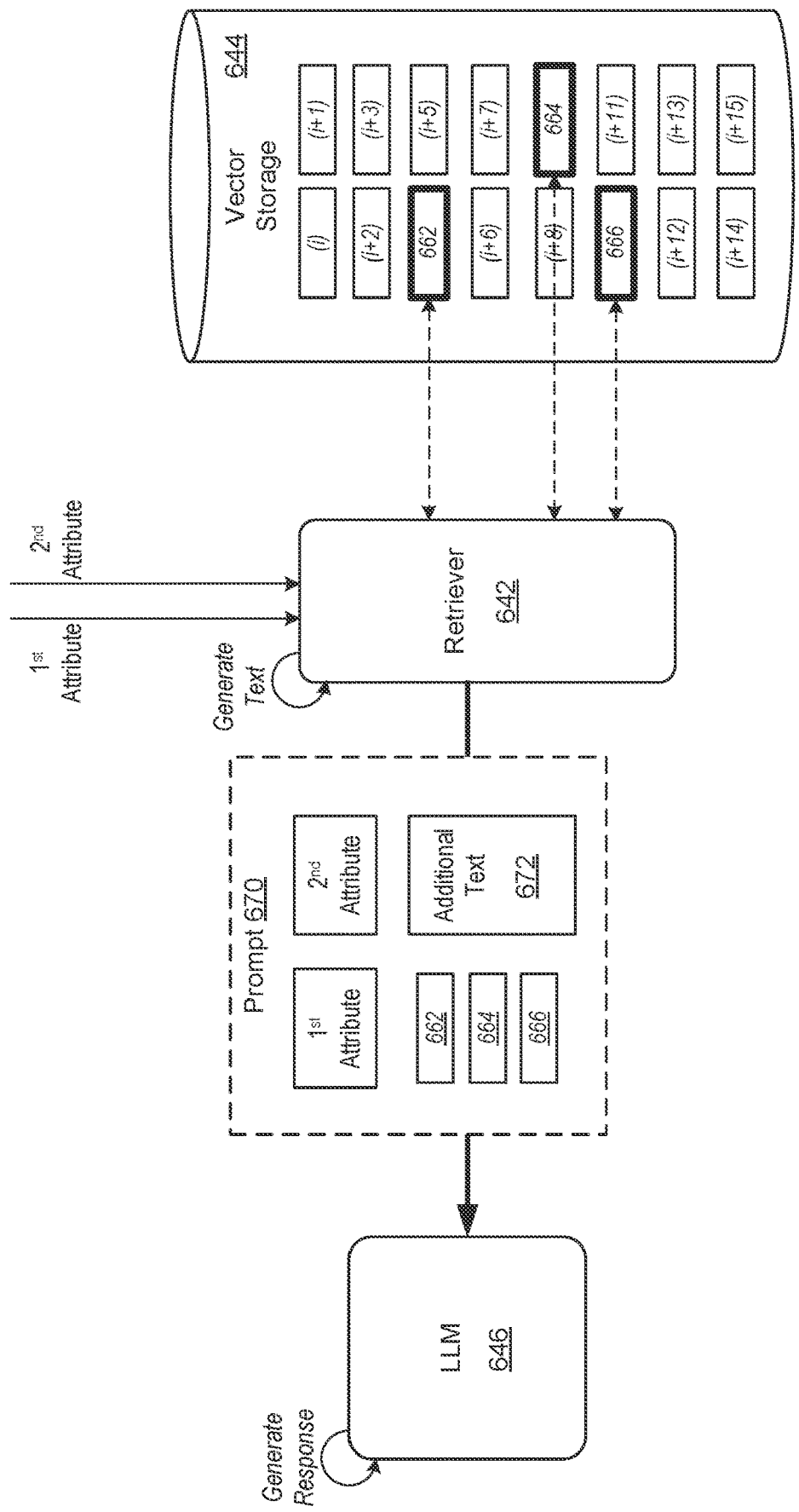

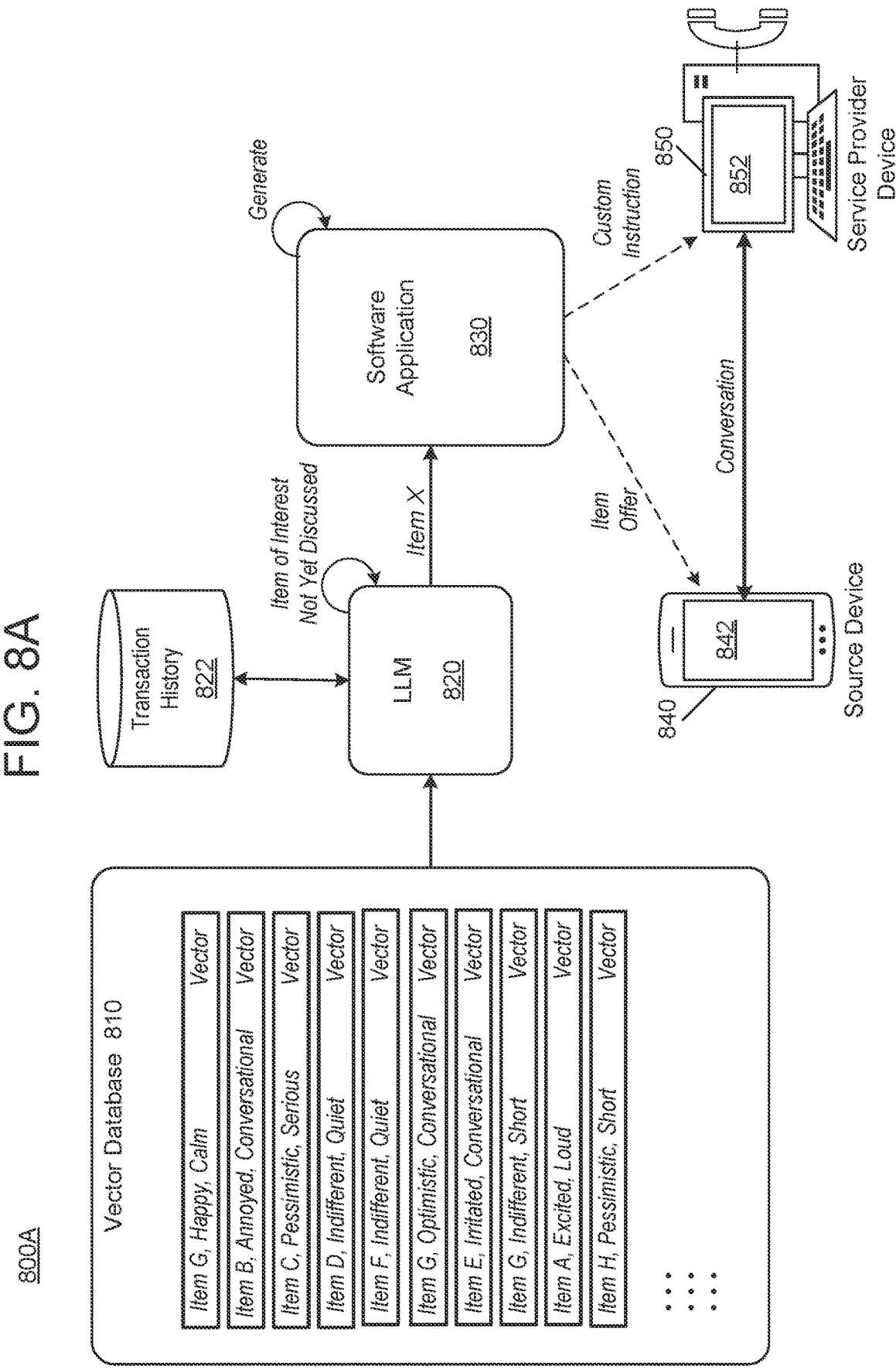

GENERATING A RESPONSE FOR A COMMUNICATION SESSION BASED ON PREVIOUS CONVERSATION CONTENT USING A LARGE LANGUAGE MODEL

BACKGROUND

Many organizations rely on contact centers, chatbots, and other forms of communication to provide information to their customers and to help customers navigate their needs, preferences, and behaviors. Customers can contact the contact center and interact with contact center agents or converse with chatbots from mobile and web-based applications, based on the customers' needs and preferences.

SUMMARY

One example embodiment provides an apparatus that may include a memory and a processor coupled to the memory, the processor configured to store first interaction content with a service provider, receive second interaction content from a communication session between a source device and a service provider device of the service provider, identify at least one contextual attribute associated with the source device, determine a response based on execution of at least one large language models (LLMs) on the second interaction content, the at least one contextual attribute associated with the source device, and the first interaction content with the service provider, and output the response to at least one of the source device and the service provider device during the communication session.

Another example embodiment provides a method that includes at least one of storing first interaction content with a service provider, receiving second interaction content from a communication session between a source device and a service provider device of the service provider, identifying at least one contextual attribute associated with the source device, determining a response based on execution of at least one large language models (LLMs) on the second interaction content, the at least one contextual attribute associated with the source device, and the first interaction content with the service provider, and outputting the response to at least one of the source device and the service provider device during the communication session.

A further example embodiment provides a computer-readable medium comprising instructions stored therein, which when executed by a processor cause the processor to perform at least one of storing first interaction content with a service provider, receiving second interaction content from a communication session between a source device and a service provider device of the service provider, identifying at least one contextual attribute associated with the source device, determining a response based on execution of at least one large language models (LLMs) on the second interaction content, the at least one contextual attribute associated with the source device, and the first interaction content with the service provider, and outputting the response to at least one of the source device and the service provider device during the communication session.

One example embodiment provides an apparatus that may include a memory and a processor coupled to the memory, the processor configured to receive interaction content from a communication session between a source device and a service provider device of a service provider, identify a plurality of contextual attributes of the communication session based on execution of at least one large language models (LLMs) on the interaction content, convert the interaction content and the plurality of contextual attributes of the communication session into a vectorized data based on execution of an additional LLM, label the vectorized data with identifiers of the plurality of contextual attributes, and store the vectorized data within a vector database along with a timestamp.

Another example embodiment provides a method that includes one or more of receiving interaction content from a communication session between a source device and a service provider device of a service provider, identifying a plurality of contextual attributes of the communication session based on execution of at least one large language models (LLMs) on the interaction content, converting the interaction content and the plurality of contextual attributes of the communication session into vectorized data based on execution of an additional LLM, labelling the vectorized data with identifiers of the plurality of contextual attributes, and storing the vectorized data within a vector database.

A further example embodiment provides a computer-readable medium comprising instructions stored therein, which when executed by a processor cause the processor to perform one or more of receiving interaction content from a communication session between a source device and a service provider device of a service provider, identifying a plurality of contextual attributes of the communication session based on execution of at least one large language models (LLMs) on the interaction content, converting the interaction content and the plurality of contextual attributes of the communication session into vectorized data based on execution of an additional LLM, labelling the vectorized data with identifiers of the plurality of contextual attributes, and storing the vectorized data within a vector database.

One example embodiment provides an apparatus that may include a memory and a processor coupled to the memory, the processor configured to receive interaction content from a communication session between a source device and a service provider device of a service provider, identify a search criteria from the interaction content, retrieve a subset of vectors from a plurality of vectors stored in a vector database based on the search criteria of the interaction content, wherein the subset of vectors includes previous interaction content with the service provider, generate a response for the communication session based on execution of a large language model (LLM) on the subset of vectors, and output the response to at least one of the source device and the service provider device during the communication session.

Another example embodiment provides a method that includes one or more of receiving interaction content from a communication session between a source device and a service provider device of a service provider, identifying a search criteria from the interaction content, retrieving a subset of vectors from a plurality of vectors stored in a vector database based on the search criteria of the interaction content, wherein the subset of vectors includes previous interaction content with the service provider, generating a response for the communication session based on execution of a large language model (LLM) on the subset of vectors, and outputting the response to at least one of the source device and the service provider device during the communication session.

A further example embodiment provides a computer-readable medium comprising instructions stored therein, which when executed by a processor cause the processor to perform one or more of receiving interaction content from a communication session between a source device and a service provider device of a service provider, identifying a search criteria from the interaction content, retrieving a subset of vectors from a plurality of vectors stored in a vector database based on the search criteria of the interaction content, wherein the subset of vectors includes previous interaction content with the service provider, generating a response for the communication session based on execution of a large language model (LLM) on the subset of vectors, and outputting the response to at least one of the source device and the service provider device during the communication session.

One example embodiment provides an apparatus that may include a memory and a processor coupled to the memory, the processor configured to receive interaction content from a communication session between a source device and a service provider device, execute a large language model (LLM) on the interaction content, wherein the LLM comprises a plurality of attention heads which are configured to simultaneously identify a mood and an item of interest from the interaction content, generate a response to the interaction content based on the mood and the item of interest, and output the response to at least one of the source device and the service provider device during the communication session.

Another example embodiment provides a method that includes one or more of receiving interaction content from a communication session between a source device and a service provider device, executing a large language model (LLM) on the interaction content, wherein the LLM comprises a plurality of attention heads which are configured to simultaneously identify a mood and an item of interest from the interaction content, generating a response to the interaction content based on the mood and the item of interest, and outputting the response to at least one of the source device and the service provider device during the communication session.

A further example embodiment provides a computer-readable medium comprising instructions stored therein, which when executed by a processor cause the processor to perform one or more of receiving interaction content from a communication session between a source device and a service provider device, executing a large language model (LLM) on the interaction content, wherein the LLM comprises a plurality of attention heads which are configured to simultaneously identify a mood and an item of interest from the interaction content, generating a response to the interaction content based on the mood and the item of interest, and outputting the response to at least one of the source device and the service provider device during the communication session.

One example embodiment provides an apparatus that may include a memory and a processor coupled to the memory, the processor configured to retrieve vectors from a vector database, where the vectors include previous communication content between a source device and a service provider device, identify an item of interest that has not been discussed in the previous communication content based on execution of a large language model (LLM) on the vectors, generate content about the item of interest, and output the content about the item of interest to at least one of the source device and the service provider device during an active communication session between the source device and the service provider device.

Another example embodiment provides a method that includes one or more of retrieving vectors from a vector database, where the vectors include previous communication content between a source device and a service provider device, identifying an item of interest that has not been discussed in the previous communication content based on execution of a large language model (LLM) on the vectors, generating content about the item of interest, and outputting the content about the item of interest to at least one of the source device and the service provider device during an active communication session between the source device and the service provider device.

A further example embodiment provides a computer-readable medium comprising instructions stored therein, which when executed by a processor cause the processor to perform one or more of retrieving vectors from a vector database, where the vectors include previous communication content between a source device and a service provider device, identifying an item of interest that has not been discussed in the previous communication content based on execution of a large language model (LLM) on the vectors, generating content about the item of interest, and outputting the content about the item of interest to at least one of the source device and the service provider device during an active communication session between the source device and the service provider device.

BRIEF DESCRIPTION OF THE DRAWINGS

FIGS. 6A-6C are diagrams illustrating a process of retrieval augmented generation (RAG) architecture for enhancing conversational responses generated by a LLM according to example embodiments.

FIGS. 8A-8C are diagrams illustrating a process of identifying items of interest from previous conversations and using the items of interest to modify future conversations according to example embodiments.

DETAILED DESCRIPTION

Figure 1:
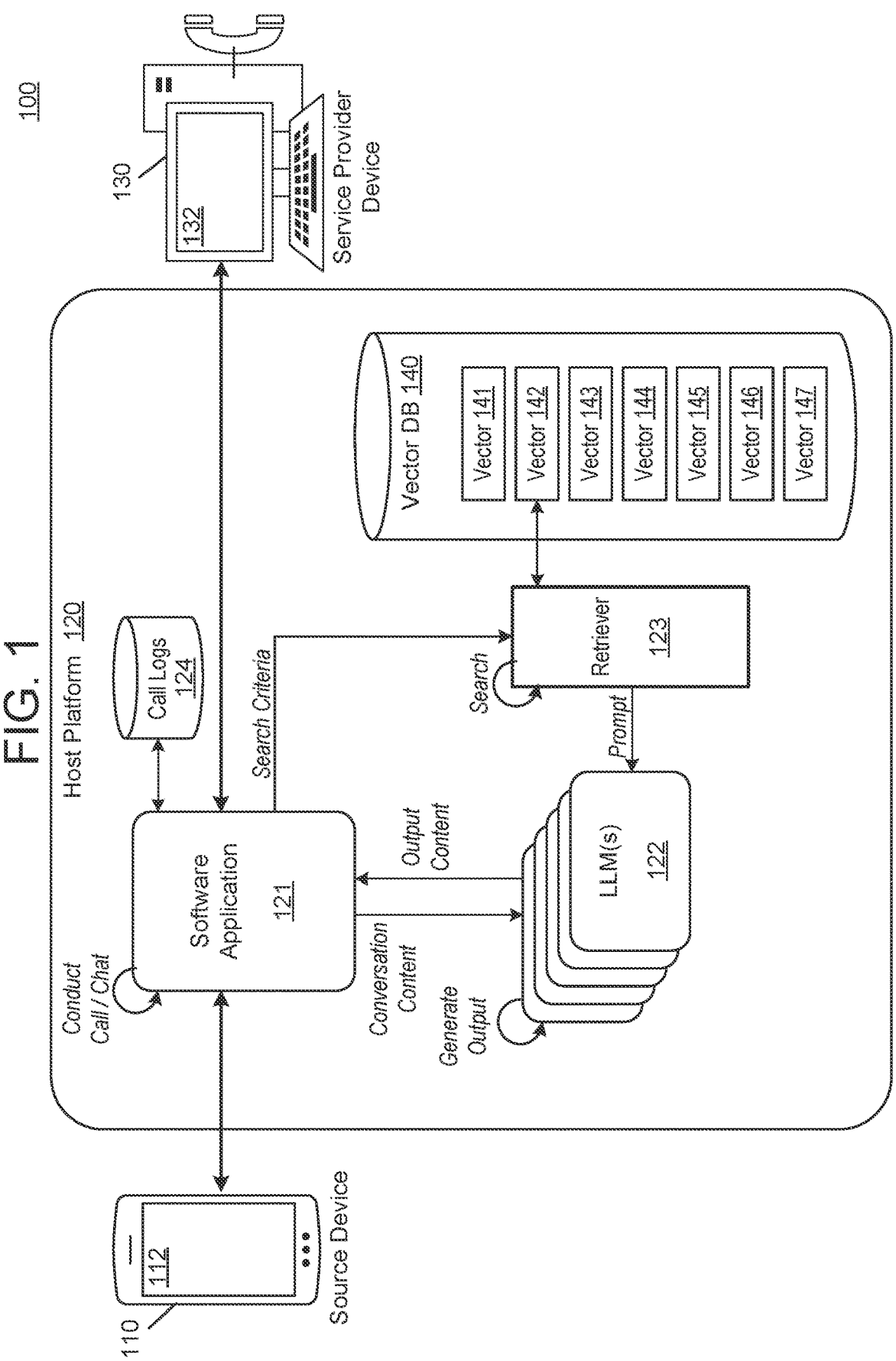
FIG. 1 is a diagram illustrating a host platform that includes a large language model (LLM) framework for contextual-based communications within a contact center environment according to example embodiments.

It is to be understood that although this disclosure includes a detailed description of cloud computing, implementation of the instant solution recited herein is not limited to a cloud computing environment. Rather, embodiments of the instant solution are capable of being implemented in conjunction with any other type of computing environment now known or later developed.

The example embodiments are directed to a host platform such as a contact center platform (which may be a call center) of a service provider which can harvest contextual information from calls, chats, and other communications between customers and the service provider, and memorialize the communications and the context for subsequent analysis, retrieval, and use. According to various embodiments, the host platform may include an artificial intelligence (AI) framework which includes one or more large language models (LLMs) that can extract context from a communication session between a user and a contact center (or chatbot), and generate a vectorized representation of the communication session which includes the context. Although the term LLM is primarily used herein, it is important to note that any machine learning model or algorithm may be used including supervised, unsupervised, semi-supervised, self-supervised, reinforcement, linear regression, decision-making, random forest, neural network, clustering, deep learning, network analysis, regression, and the like.

In some embodiments, the AI framework may include a first LLM (or group of LLMs) to identify contextual attributes within a conversation between a customer (via a customer device) and the contact center (via one or more devices of the contact center), including an item of interest being discussed, a mood of the customer with respect to the item of interest, specific concerns noted by the customer, dates, times, and the like. The AI framework may also include a converter which can convert the conversation between the customer and the contact center into a vector. In some embodiments, the converter may be an additional LLM model. Here, the additional LLM model may annotate the interaction content with the contextual attributes prior to converting the interaction content into a vector. The LLM may be an additional LLM of the one or more LLMs, or an LLM different than the LLM used to identify the plurality of contextual attributes.

Interaction content may be a conversation content, previous conversation content, historical conversation content, communication session and any other data related to a session or interaction between one party and another party.

According to various embodiments, the vector of the conversation may be labelled with identifiers (e.g., metadata tags, account data, etc.) which identify the contextual attributes of the communication session embedded in the vector. Furthermore, the system may store the vector with the labels in a database, such as a vector database. By labelling the vectors with the contextual attributes, a search process may be used to retrieve vectors that match a search-criteria, such as a specific value for a contextual attribute. The vectors can be input to an AI model (such as an AI conversational model), a LLM, a chatbot, or the like, which can generate custom instructions, responses, verifications, and the like, to output during a live/real-time (or near-real time) communication session.

According to various embodiments, the host platform may use one or more artificial intelligence models to identify context of a conversation between a user and a service provider, such as a contact center of the service provider, a chatbot of the service provider, or the like. In this example, the context may include a mood of the user, a sentiment of the user, a tone of voice of the user, an item of interest, and the like. The system may use the contextual attributes to generate more accurate and customized responses which can be output during a live conversation between the user and the service provider.

In some embodiments, a host platform may include a large language model (LLM) framework that includes one or more LLMs capable of identifying different contextual attributes from a current and/or previous conversation (which may be or have been a voice, text, video, etc. conversation) between a user and a service provider. The LLM framework may generate a vectorized representation of the conversation between the user and the service provider. The vectorized representation transforms text data into numerical formats or representations that allow natural language processing tasks such as machine translation, sentiment analysis, and information retrieval. These representations allow the instant solution to understand the meaning of words and their relationships, enabling them to perform the actions described herein. As part of this process, the system may annotate the interaction content with the contextual attributes thereby creating a richer data record of the conversation for future use by the LLM framework. The vectorized representation of the conversation may be managed within a vector database (or other storage) that is included with the LLM framework. In some embodiments, the LLM framework may employ a retrieval augmented generation (RAG) framework for improving the efficiency of the outputs of the LLM models within the LLM framework.

In the examples or embodiments described herein, an LLM may be a machine learning model. As another example, an LLM may be an artificial intelligence (AI) model such as a "generative" AI model. As another example, the LLM may be a multimodal large language model. As another example, the LLM may be a transformer neural network ("transformer"), or the like. According to various embodiments, an LLM may be trained to identify contextual attributes based on content from a conversation (e.g., speech, text, sounds, etc.) For example, the LLM may identify contextual attributes such as an item of interest to a caller/user, a tone of voice of the user, a mood of the user, and the like. The LLM may include libraries and/or deep learning frameworks that enable the LLM to understand the context.

In some embodiments, the LLM framework may include a plurality of LLMs that are each configured to identify a different contextual attribute from the conversation. The plurality of LLMs may be executed in sequence/parallel on the interaction content. As another example, the LLM framework may include a single LLM with a plurality of attention heads associated with a plurality of contextual attributes, and which work in parallel to identify different contextual attributes from the interaction content by masking different portions of content from the conversation.

FIG. 1 illustrates a host platform 120 that includes a LLM framework for contextual-based communications within a contact center environment according to example embodiments. The host platform 120 shown in FIG. 1 may correspond to the host platforms that are further shown in any of the examples herein.

Referring to FIG. 1, the host platform 120 may host a software application 121 that enables at least one of conversations such as calls, chats, video, and the like between devices such as a source device 110 and a service provider device 130. In this example, the host platform 120 may be a cloud platform, web server, distributed system, and the like. Meanwhile, the source device 110 may refer to a mobile device, smartphone, desktop computer, laptop, tablet, smart-wearable device, and the like. The service provider device 130 may correspond to a contact center or other third-party device and may include audio, video, and text capabilities. As an example, the service provider device 130 may be a mobile device, a computer, a tablet, a Voice over Internet Protocol (VOIP) phone, and/or the like. As another example, the service provider device 130 may correspond to a server, software application, or the like, which provides a chatbot functionality that is able to generate chat communications and send the chat communications to the source device 110 via the software application 121. The source device 110 and the service provider device 130 may connect to the host platform 120 over a computer network such as the Internet, a private network, a combination thereof, and the like.

When contact occurs between the source device 110 and the service provider device 130, audio from the contact, such as a call, may be recorded and converted into text and stored within a contact or call logs data store 124. The text can be analyzed by one or more LLMs 122 and converted into a vector that is stored within a vector database (DB) 140. In some embodiments, the interaction content may be analyzed for contextual attributes. The one or more LLMs 122 may annotate the interaction content with the contextual attributes prior to converting the interaction content into a vector. An example of a process of generating contextualized vectors is described with respect to the examples of FIGS. 5A-5C.

In the example of FIG. 1, the vector DB 140 stores a plurality of vectors including a vector 141, a vector 142, a vector 143, a vector 144, a vector 145, a vector 146, and a vector 147. Each vector within the vector DB 140 may represent a different previous conversation between the source device 110 and a service provider associated with the service provider device 130 (although not necessarily the same device). For example, each vector may correspond to a different conversation between the user and a contact center agent of the service provider, however, embodiments are not limited thereto. In some embodiments, multiple vectors may be generated from the same conversation, or multiple conversations may be included in the same vector. The vectors may be used to generate responses during an active contact, such as a call (or chat) between the source device 110 and the service provider device 130. For example, a response may be generated by the one or more LLMs 122 based on one or more vectors in the vector DB 140. The response may include a product offering, a verification question, an informational notice, a chatbot response, a custom instruction, and the like. The response, which may be in the form of audio, text, images and/or video, may be output to at least one of a user interface 112 of the source device 110 and a user interface 132 of the service provider device 130. In some embodiments, the one or more LLMs 122 may generate a first response that is output on the user interface 112 of the source device 110 and a second response that is output on the user interface 132 of the service provider device 130, simultaneously with the output of the first response on the user interface 112 of the source device 110.

According to various embodiments, the one or more LLMs 122 may identify contextual attributes of a call or chat communication session between the source device 110 and the service provider device 130. As an example, the contextual attributes may include an item of interest being discussed (e.g., a new product, an existing product, an issue of a customer, feedback, and the like). The contextual attributes may include a mood of the user of the source device 110, based on a characteristic of speech, for example, such as a mood of the user (e.g., happy, angry, indifferent, optimistic, pessimistic, etc.) with respect to the item of interest, etc. As another example, the contextual attributes may include a tone of speech of the user during the call (e.g., loud, quiet, talkative, inquisitive, etc.). The contextual attributes may be based on any characteristic of speech that can be determined by one or more processors associated with the instant solution. The contextual attributes may be based on any characteristic of speech that can be determined by one or more processors associated with the instant solution. These characteristics of speech include articulation, intonation, pronunciation, speech pauses, speech pitch, speech rate, speech rhythm, and tone. The contextual attributes may also include a date/time of the conversation, a length of time of the conversation, a frequency of the conversation with respect to one or more previous conversations, and the like.

In some embodiments, contextual attributes may be identified using device data from the source device 110 such as a geographic location of the source device 110, whether the source device 110 is connected through a virtual private network (VPN) or not, an Internet Protocol (IP) address of the source device 110, a browsing history of the source device 110, and the like. The context may be identified from the interaction content itself, such as the date/time.

The contextual attributes may be identified directly within the data itself such as a date/time of the conversation, a length of time of the conversation, an IP address, etc. As another example, the contextual attributes may be identified using the one or more LLMs 122. For example, an LLM may be used to identify a mood of the user, an item of interest being discussed, a tone of the user during the conversation, and the like. The contextual attributes may be used as search criteria to retrieve a subset of vectors from the vector DB 140, which are then used to generate a response to the conversation. Here, the search criteria may include the contextual attributes themselves, for example, an identifier of the mood of the user, an identifier of an item being discussed during the conversation, and the like.

In some embodiments, the search criteria (e.g., the contextual attributes from the current call/conversation) may be provided to a retriever 123 which uses the search criteria to identify a subset of vectors within the vector DB 140 corresponding to previous conversations between the source device 110 and the service provider that satisfy the search criteria. Here, the retriever 123 may compare the search criteria to metadata tags added to the vectors within the vector DB 140. The metadata tags, also referred to as labels, may identify contextual attributes of the previous conversations represented by the vectors and/or may identify information related to the source device or the user such as an account name and balance, an identifier, etc. Thus, the retriever 123 can identify similar conversations that have previously occurred between the user and the service provider, and use an aggregation of previous conversations to generate a highly accurate and efficient response for the current conversation.

In the example of FIG. 1, the one or more LLMs 122 may generate vectors representing conversations between a user and a service provider over time. The vectors may be stored within a user-specific vector database which enables all previous conversations of the user to be stored and analyzed together. That is, rather than the LLM simply using text from a current conversation to generate a response, the example embodiments enable an LLM to use previous conversations between the user and the service provider to generate a more narrowly tailored and specific response that may be output on a screen of a contact center agent device or to a screen of the customer's device. The specific response may include narrowly tailored advice, product offerings, recommended account settings, or the like.

Figure 2A:
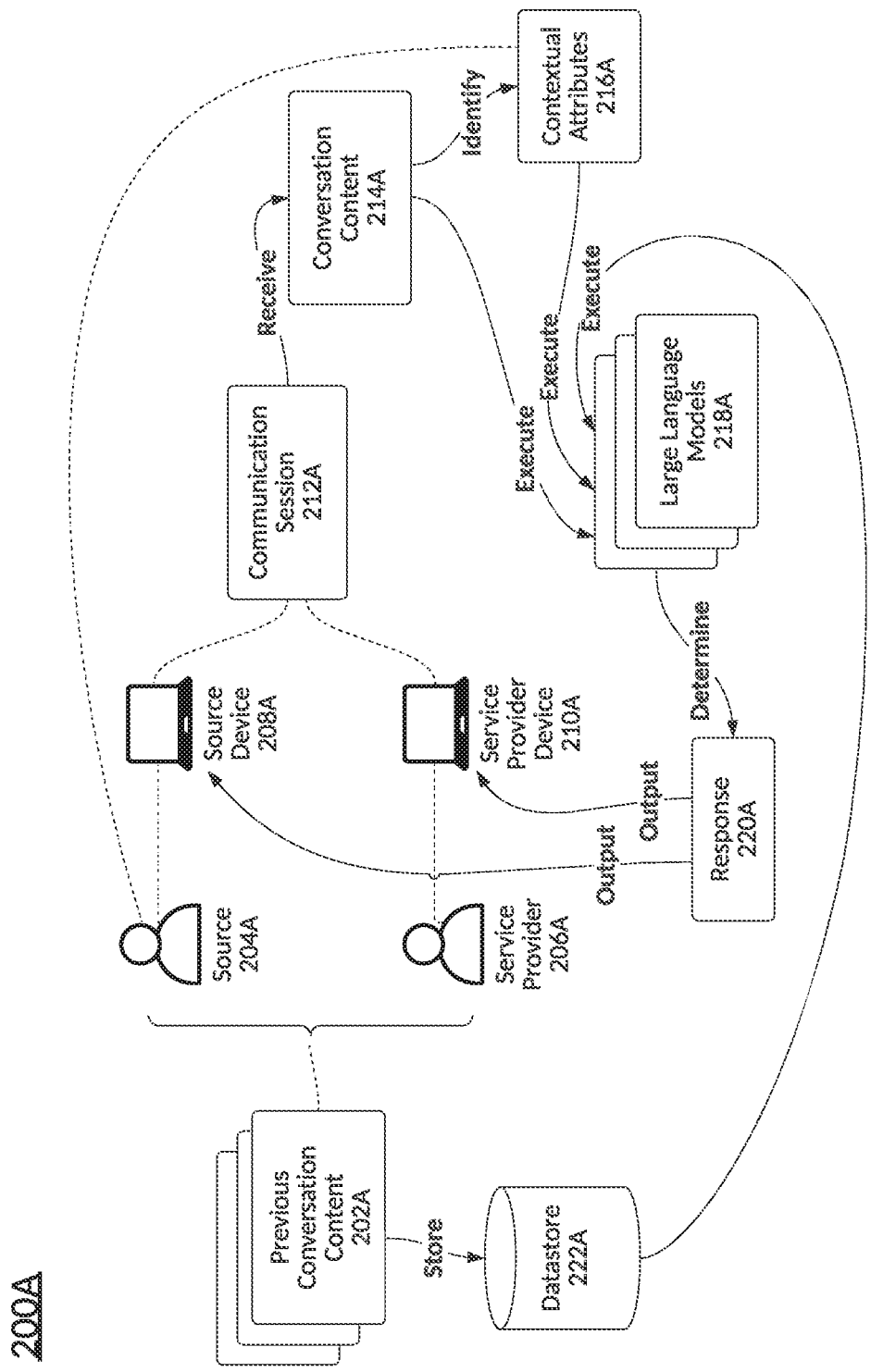
FIG. 2A is a diagram illustrating a process of generating a response based on conversation context and previous conversations according to example embodiments.

FIG. 2A illustrates a process 200A of generating a response based on conversation context and previous conversations according to example embodiments. Referring to FIG. 2A, previous interaction content 202A between a source 204A and a service provider 206A are stored in a datastore 222A. In one embodiment, the source 204A may be a user. Interaction content 214A is received from a communication session 212A between a source device 208A of the source 204A and a service provider device 210A of the service provider 206A. One or more contextual attributes 216A of the source 204A are identified from the interaction content 214A. One or more large language models 218A are executed on the interaction content 214A, the one or more contextual attributes 216A of the source 204A, and the previous interaction content 202A between the source 204A and the service provider 206A, and a response 220A is determined and then output to at least one of the source device 208A and the service provider device 210A during the communication session 212A. In one embodiment, the source device 208A may be a user device.

Figure 2B:
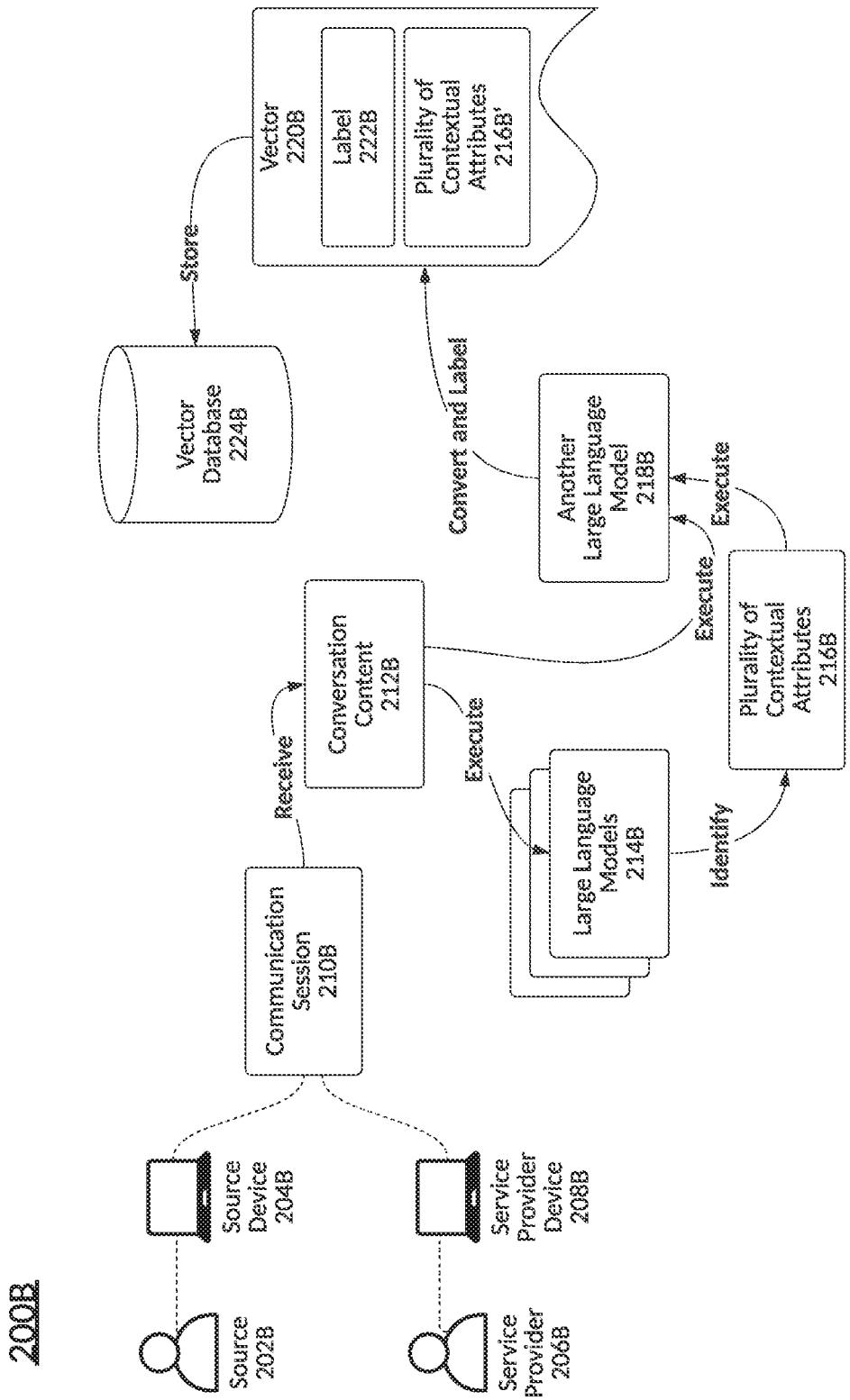
FIG. 2B is a diagram illustrating a process of storing contextual attributes for vectorized interaction content according to example embodiments.

FIG. 2B illustrates a process 200B of storing contextual attributes for vectorized interaction content according to example embodiments. Referring to FIG. 2B, interaction content 212B is received from a communication session 210B between a source device 204B of a source 202B and a service provider device 208B of a service provider 206B. In one embodiment, the source device 204B may be a user device. In another embodiment, the source 202B may be a user. Based on execution of one or more large language models 214B on the interaction content 212B, a plurality of contextual attributes 216B of the communication session 210B are identified. Executing another large language model 218B, the interaction content 212B and the plurality of contextual attributes 216B of the communication session 210B are converted into a vector 220B, which is labeled 222B with the plurality of contextual attributes 216B', and then the labeled vector 220B is stored within a vector database 224B against the source.

Figure 2C:
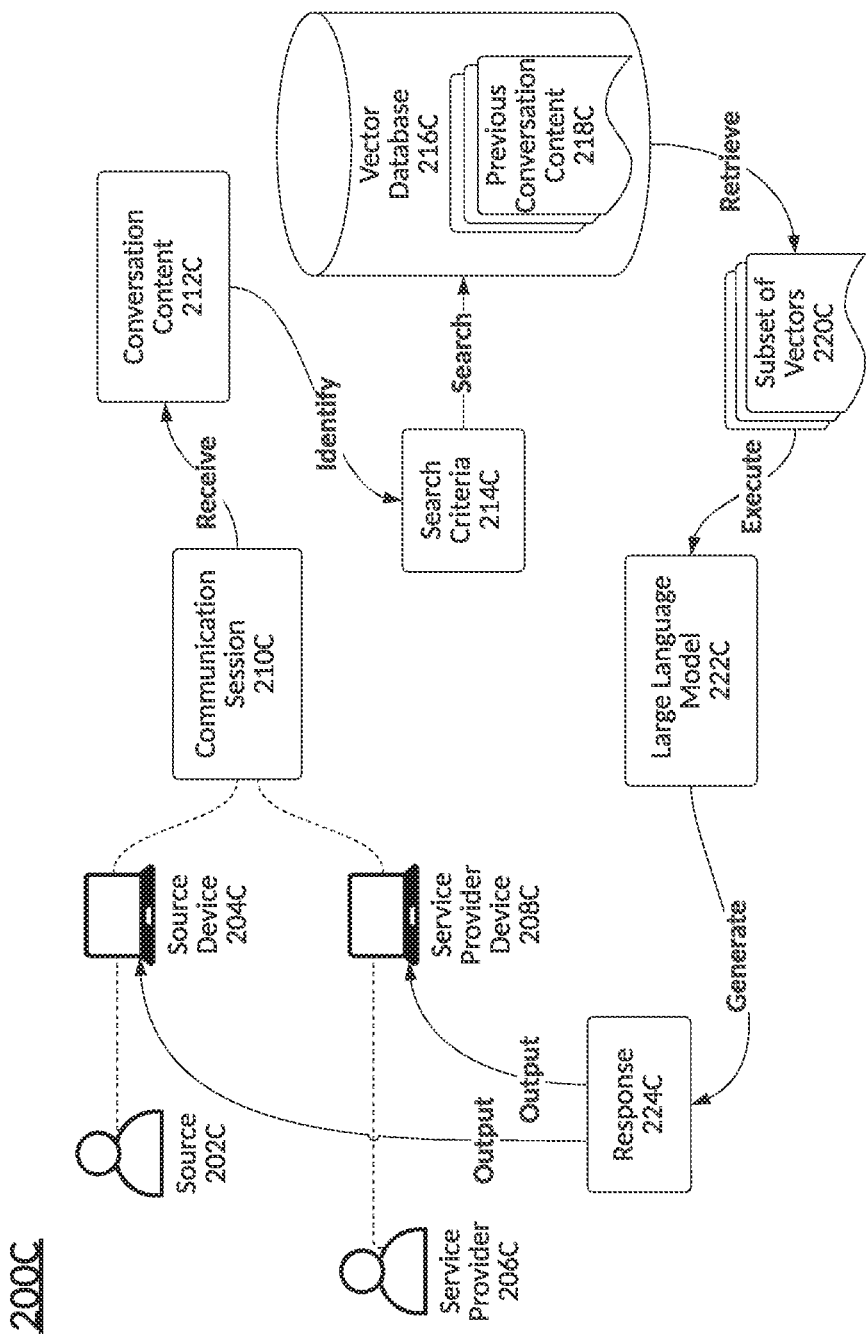
FIG. 2C is a diagram illustrating a process of generating interaction content using a retrieval augmented generation (RAG) architecture according to example embodiments.

FIG. 2C illustrates a process 200C of generating interaction content using a retrieval augmented generation (RAG) architecture according to example embodiments. Referring to FIG. 2C, interaction content 212C is received from a communication session 210C between a source device 204C of a source 202C and a service provider device 208C of a service provider 206C. In one embodiment, the source device 204C may be a user device. In another embodiment, the source 202C may be a user. A search criteria 214C is identified from the interaction content 212C. Based on the search criteria 214C of the interaction content 212C, a subset of vectors 220C is retrieved from a vector database 216C wherein the subset of vectors 220C comprise previous interaction content 218C between the source 202C and the service provider 206C. A large language model 222C is then executed on the subset of vectors 220C, and a response 224C is generated for the communication session 210C and output to at least one of the source device 204C and the service provider device 208C during the communication session 210C.

Figure 2D:
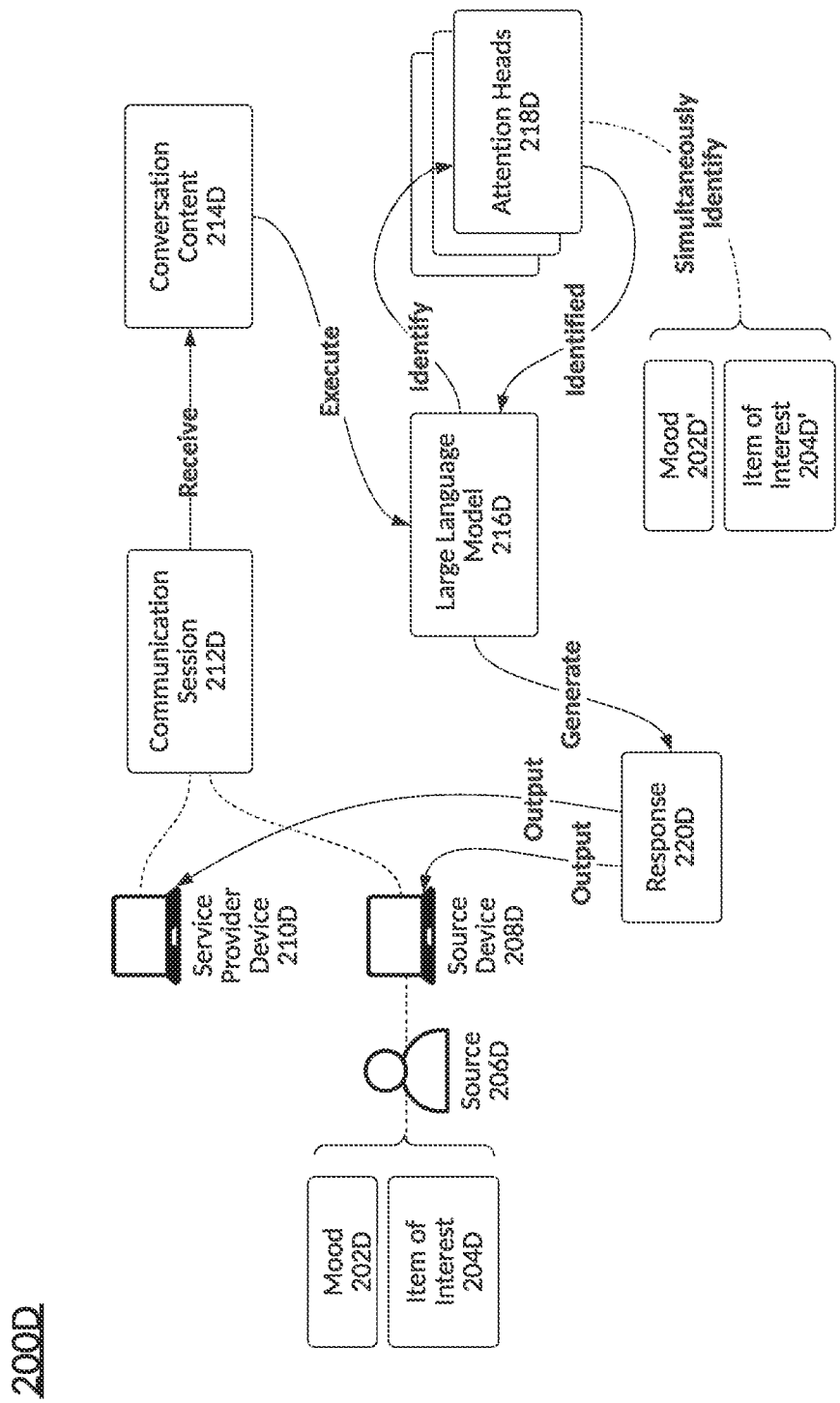
FIG. 2D is a diagram illustrating a process of generating interaction content using a parallelized attention head architecture according to example embodiments.

FIG. 2D illustrates a process 200D of generating interaction content using a parallelized attention head architecture according to example embodiments. Referring to FIG. 2D, interaction content 214D is received from a communication session 212D between a source 206D of a source device 208D and a service provider device 210D. In one embodiment, the source device 208D may be a user device. In another embodiment, the source 206D may be a user. A large language model 216D with a plurality of attention heads 218D is executed on the interaction content 214D, wherein the plurality of attention heads 218D are configured to simultaneously identify a mood 202D' of the source 206D and an item of interest 204D'. Based on the mood 202D' of the source 206D and the item of interest 204D', a response 220D to the interaction content 214D is generated. The response 220D is output to at least one of the source device 208D and the service provider device 210D during the communication session 212D.

Simultaneously may mean real-time (i.e., instantaneous) or near real-time (i.e., a slight delay).

Figure 2E:
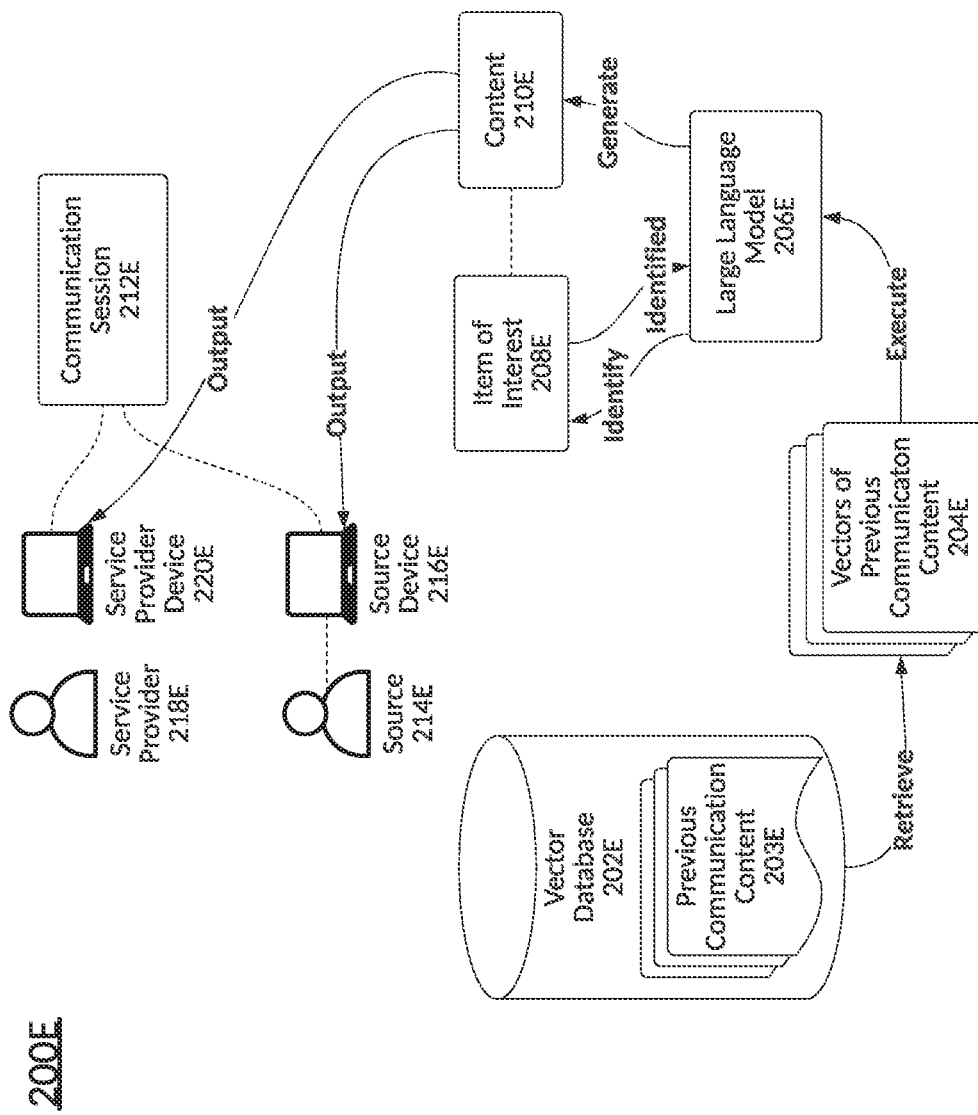
FIG. 2E is a diagram illustrating a process of identifying an item of interest that has not been discussed according to example embodiments.

FIG. 2E illustrates a process 200E of identifying an item of interest that has not been discussed according to example embodiments. Referring to FIG. 2E, vectors 204E are retrieved from a vector database 202E with previous communication content 203E, where the vectors include previous communication content between a source 214E and a service provider 218E. In one embodiment, the source 214E may be a user. By executing a large language model 206E on the vectors 204E, an item of interest 208E is identified for the source 214E that has not been discussed by the service provider 218E. Content 210E is then generated about the item of interest 208E for the source 214E, and the content 210E about the item of interest 208E for the source 214E is output on at least one of a source device 216E and a service provider device 220E during a communication session 212E between the source 214E and the service provider 218E. In one embodiment, the source device 216E may be a user device.

Technological advancements typically build upon the fundamentals of predecessor technologies; such is the case with artificial intelligence (AI) models. An AI classification system describes the stages of AI progression. The first classification is known as "reactive machines," followed by present-day AI classification "limited memory machines" (also known as "artificial narrow intelligence"), then progressing to "theory of mind" (also known as "artificial general intelligence"), and reaching the AI classification "self-aware" (also known as "artificial superintelligence"). Present-day limited memory machines are a growing group of AI models built upon the foundation of its predecessor, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate and predict data, and the like, while inheriting all the capabilities of reactive machines.

Examples of AI models classified as limited memory machines include, but are not limited to, chatbots, virtual assistants, machine learning (ML), deep learning (DL), natural language processing (NLP), generative AI (GenAI) models, and any future AI models that are yet to be developed possessing characteristics of limited memory machines. Generative AI models combine limited memory machine technologies, incorporating ML and DL, forming the foundational building blocks of future AI models. For example, theory of mind is the next progression of AI that may be able to perceive, connect, and react by generating appropriate reactions in response to an entity with which the AI model is interacting; all of these capabilities rely on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals of learning from experiences to generate and draw conclusions about itself and its surroundings. Generative AI models are integral and core to future artificial intelligence models. As described herein, generative AI refers to present-day generative AI models and future AI models.

Figure 3A:
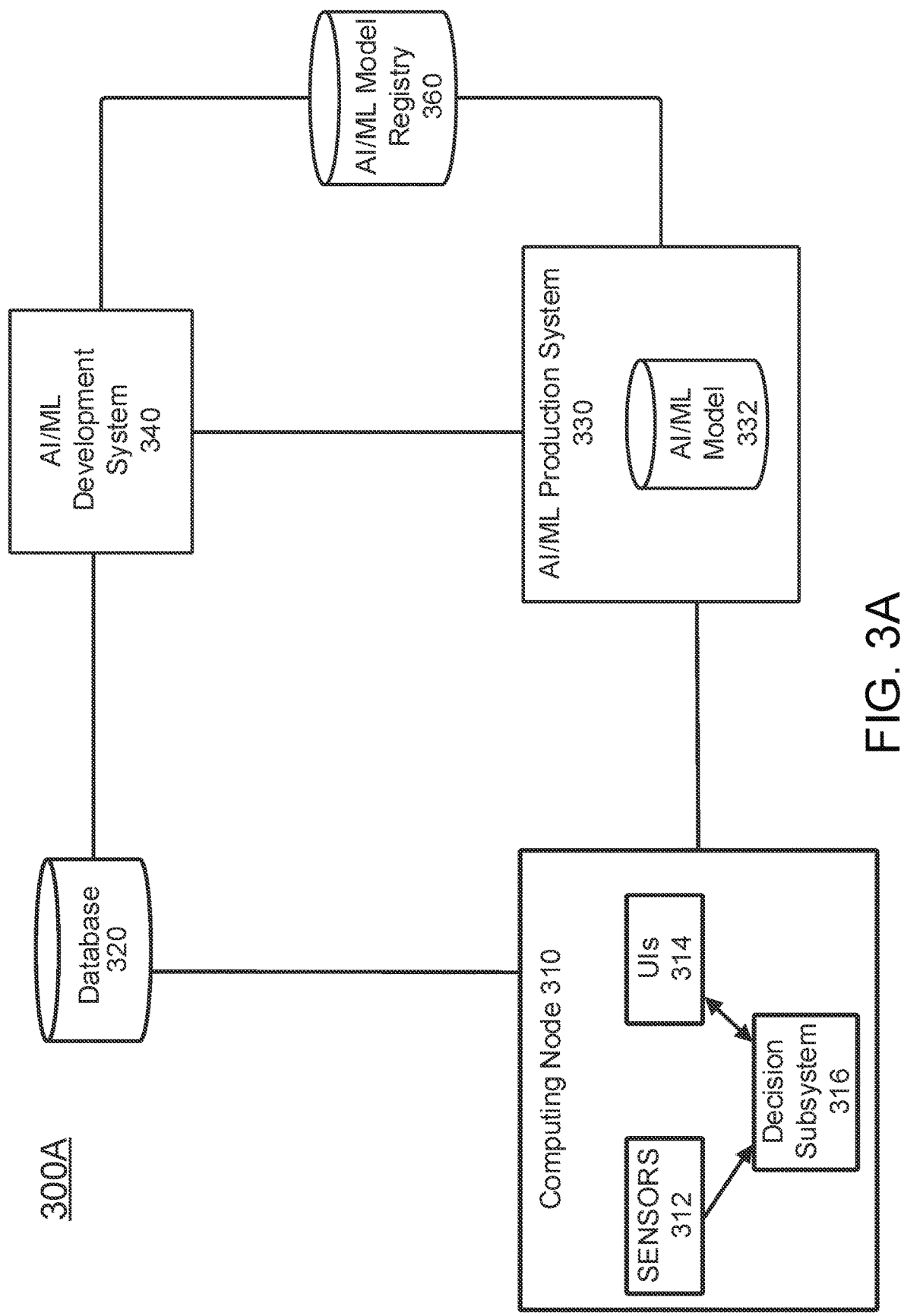
FIG. 3A is a diagram illustrating an artificial intelligence (AI)/machine learning (ML) network diagram for integrating an artificial intelligence (AI) model into any decision point according to the example embodiments.

FIG. 3A illustrates an AI/ML network diagram 300A that supports AI-assisted decision points on software executing on a computer. Other branches of AI, such as, but not limited to, computer vision, fuzzy logic, expert systems, neural networks/deep learning, generative AI, and natural language processing, may all be employed in developing the AI model shown in these embodiments. Further, the AI model included in these embodiments is not limited to particular AI algorithms. Any algorithm or combination of algorithms related to supervised, unsupervised, and reinforcement learning algorithms may be employed.

In one embodiment, generative AI (GenAI) may be used by the instant solution in the transformation of data. Computing nodes 310 may be equipped with diverse sensors that collect a vast array of data. However, raw data, once acquired, undergoes preprocessing that may involve normalization, anonymization, missing value imputation, or noise reduction to allow the data to be further used effectively.

The GenAI executes data augmentation following the preprocessing of the data. Due to the limitation of datasets in capturing the vast complexity of real-world scenarios, augmentation tools are employed to expand the dataset. This might involve image-specific transformations like rotations, translations, or brightness adjustments. For non-image data, techniques like jittering can be used to introduce synthetic noise, simulating a broader set of conditions.

In the instant solution, data generation is then performed on the data. Tools like generative adversarial networks (GANs) and variational autoencoders (VAEs) are trained on existing datasets to generate new, plausible data samples. For example, GANs might be tasked with crafting images showcasing situations in uncharted conditions or from unique perspectives. As another example, the synthesis of sensor data may be performed to model and create synthetic readings for such scenarios, enabling thorough system testing without actual physical encounters. Validation might include the output data being compared with real-world datasets or using specialized tools like a GAN discriminator to gauge the realism of the crafted samples.

Computing node 310 may include a plurality of sensors 312 that may include but are not limited to, light sensors, weight sensors, direction sensors, altimeter sensors, etc. In some embodiments, these sensors 312 send data to a database 320 that stores data about the computing node. In some embodiments, these sensors 312 send data to one or more decision subsystems 316 in computing node 310 to assist in decision-making.

Computing node 310 may include one or more user interfaces (UIs) 314, such as a graphical user interface (GUI) executing on the computing node 310. In some embodiments, these UIs 314 send data to a database 320 that stores event data about the UIs 314 that includes but is not limited to selection, state, and display data. In some embodiments, these UIs 314 send data to one or more decision subsystems 316 in computing node 310 to assist decision-making.

Computing node 310 may include one or more decision subsystems 316 that drive a decision-making process around, but are not limited to, a state of software executing on the computing node 310, a location of the computing node, a direction of movement of the computing node, etc. In some embodiments, the decision subsystems 316 gather data from one or more sensors 312 to aid in the decision-making process. In some embodiments, a decision subsystem 316 may gather data from one or more UIs 314 to aid in the decision-making process. In some embodiments, a decision subsystem 316 may provide feedback to a UI 314.

An AI/ML production system 330 may be used by a decision subsystem 316 in a computing node 310 to assist in its decision-making process. The AI/ML production system 330 includes one or more AI/ML models 332 that are executed to retrieve the needed data, such as, but not limited to, a prediction, a categorization, a UI prompt, etc. In some embodiments, an AI/ML production system 330 is hosted on a server. In some embodiments, the AI/ML production system 330 is cloud-hosted. In some embodiments, the AI/ML production system 330 is deployed in a distributed multi-node architecture. In some embodiments, the AI/ML production system resides in computing node 310.

An AI/ML development system 340 creates one or more AI/ML models 332. In some embodiments, the AI/ML development system 340 utilizes data in the database 320 to develop and train one or more AI models 332. In some embodiments, the AI/ML development system 340 utilizes feedback data from one or more AI/ML production systems 330 for new model development and/or existing model re-training. In an embodiment, the AI/ML development system 340 resides and executes on a server. In another embodiment the AI/ML development system 340 is cloud hosted. In a further embodiment, the AI/ML development system 340 utilizes a distributed data pipeline/analytics engine.

Once an AI/ML model 332 has been trained and validated in the AI/ML development system 340, it may be stored in an AI/ML model registry 360 for retrieval by either the AI/ML development system 340 or by one or more AI/ML production systems 330. The AI/ML model registry 360 resides in a dedicated server in one embodiment. In some embodiments, the AI/ML model registry 360 is cloud-hosted. The AI/ML model registry 360 is a distributed database in other embodiments. In further embodiments, the AI/ML model registry 360 resides in the AI/ML production system 330.

Figure 3B:
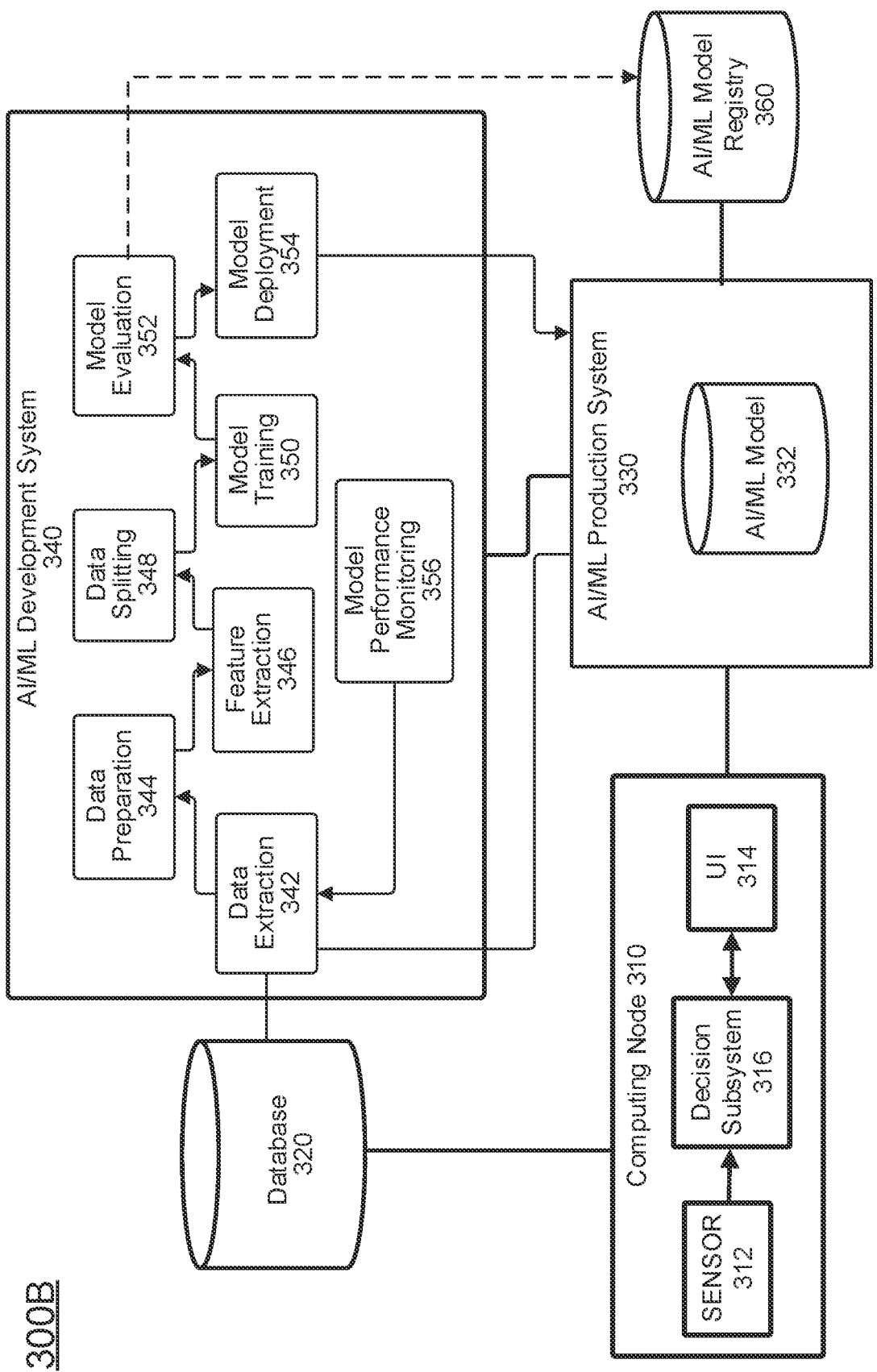
FIG. 3B is a diagram illustrating a process for developing an AI/ML model that supports AI-assisted computer decision points according to the example embodiments.

FIG. 3B illustrates a process 300B for developing one or more AI/ML models that support AI-assisted decision points. An AI/ML development system 340 executes steps to develop an AI/ML model 332 that begins with data extraction 342, in which data is loaded and ingested from one or more data sources. In some embodiments, computing node data and user data is extracted from a database 320. In some embodiments, model feedback data is extracted from one or more AI/ML production systems 330.

Once the required data has been extracted 342, it must be prepared 344 for model training. In some embodiments, this step involves statistical testing of the data to see how well it reflects real-world events, its distribution, the variety of data in the dataset, etc. In some embodiments, the results of this statistical testing may lead to one or more data transformations being employed to normalize one or more values in the dataset. In some embodiments, this step includes cleaning data deemed to be noisy. A noisy dataset includes values that do not contribute to the training, such as but are not limited to, null and long string values. Data preparation 344 may be a manual process or an automated process using at least one of the elements, functions described or depicted herein.

Features of the data are identified and extracted 346. In some embodiments, a feature of the data is internal to the prepared data from step 344. In other embodiments, a feature of the data requires a piece of prepared data from step 344 to be enriched by data from another data source to be useful in developing an AI/ML model 332. In some embodiments, identifying features is a manual process or an automated process using at least one of the elements, functions described or depicted herein. Once the features have been identified, the values of the features are collected into a dataset that will be used to develop the AI/ML model 332.

The dataset output from feature extraction step 346 is split 348 into a training and validation data set. The training data set is used to train the AI/ML model 332, and the validation data set is used to evaluate the performance of the AI/ML model 332 on unseen data.

The AI/ML model 332 is trained and tuned 350 using the training data set from the data splitting step 348. In this step, the training data set is fed into an AI/ML algorithm and an initial set of algorithm parameters. The performance of the AI/ML model 332 is then tested within the AI/ML development system 340 utilizing the validation data set from step 348. These steps may be repeated with adjustments to one or more algorithm parameters until the model's performance is acceptable based on various goals and/or results related to at least one of the actions described herein.

The AI/ML model 332 is evaluated 352 in a staging environment (not shown) that resembles the ultimate AI/ML production system 330. This evaluation uses a validation dataset to ensure the performance in an AI/ML production system 330 matches or exceeds expectations. In some embodiments, the validation dataset from step 348 is used. In other embodiments, one or more unseen validation datasets are used. In some embodiments, the staging environment is part of the AI/ML development system 340. In other embodiments, the staging environment is managed separately from the AI/ML development system 340. Once the AI/ML model 332 has been validated, it is stored in an AI/ML model registry 360, which can be retrieved for deployment and future updates. As before, in some embodiments, the model evaluation step 352 is a manual process or an automated process using at least one of the elements, functions described or depicted herein.

Once an AI/ML model 332 has been validated and published to an AI/ML model registry 360, it may be deployed 354 to one or more AI/ML production systems 330. In some embodiments, the performance of deployed AI/ML models 332 is monitored 356 by the AI/ML development system 340. In some embodiments, AI/ML model 332 feedback data is provided by the AI/ML production system 330 to enable model performance monitoring 356. In some embodiments, the AI/ML development system 340 periodically requests feedback data for model performance monitoring 356. In some embodiments, model performance monitoring includes one or more triggers that result in the AI/ML model 332 being updated by repeating steps 342-354 with updated data from one or more data sources.

Figure 3C:
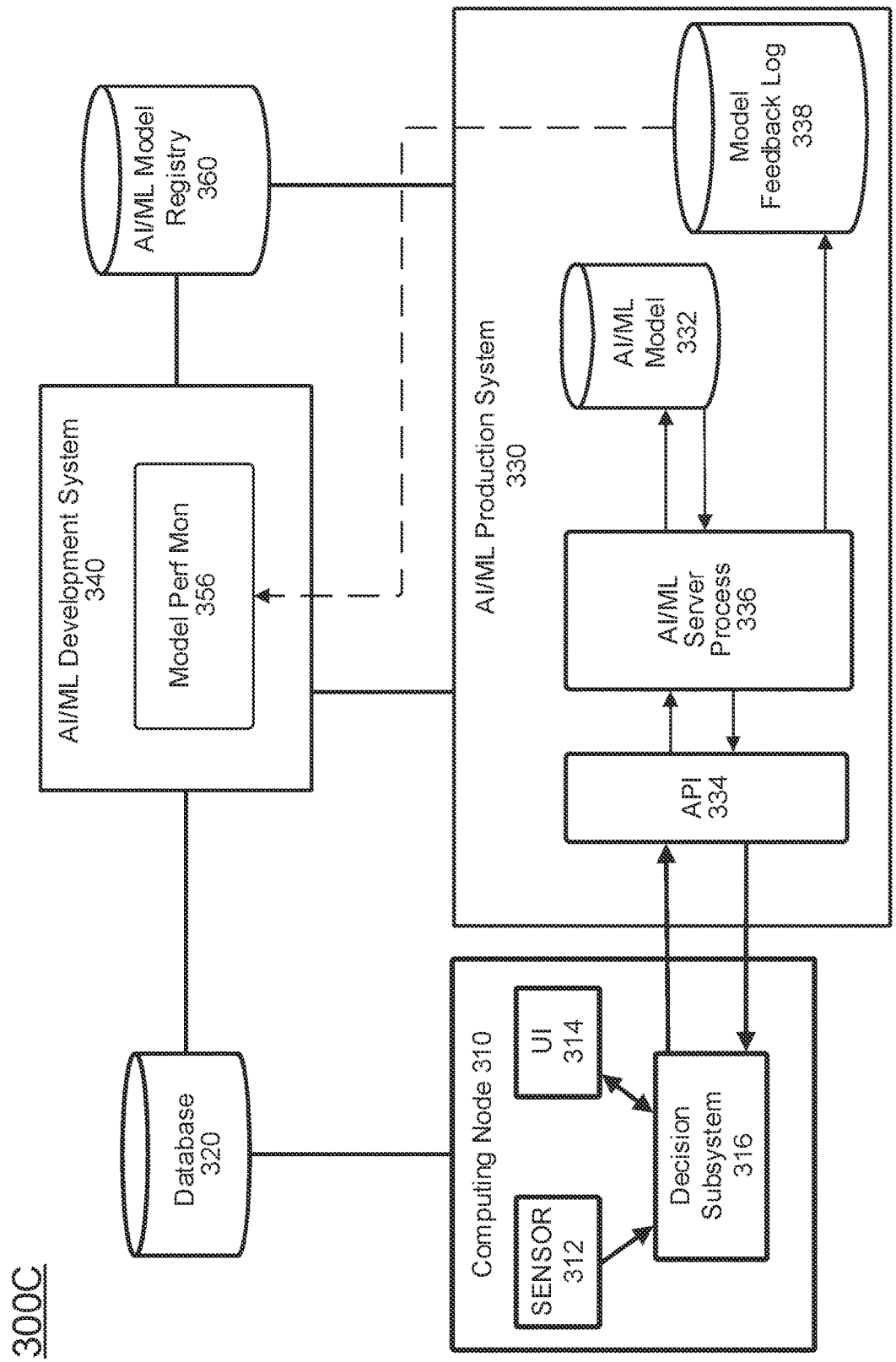
FIG. 3C illustrates another process for utilizing an AI/ML model that supports AI-assisted computer decision points according to example embodiments.

FIG. 3C illustrates a process 300C for utilizing an AI/ML model that supports AI-assisted decision points. As stated previously, the AI model utilization process depicted herein reflects ML, which is a particular branch of AI, but this instant solution is not limited to ML and is not limited to any AI algorithm or combination of algorithms.

Referring to FIG. 3C, an AI/ML production system 330 may be used by a decision subsystem 316 in computing node 310 to assist in its decision-making process. The AI/ML production system 330 provides an application programming interface (API) 334, executed by an AI/ML server process 336 through which requests can be made. In some embodiments, a request may include an AI/ML model 332 identifier to be executed. In some embodiments, the AI/ML model 332 to be executed is implicit based on the type of request. In some embodiments, a data payload (e.g., to be input to the model during execution) is included in the request. In some embodiments, the data payload includes sensor 312 data from computing node 310. In some embodiments, the data payload includes UI 314 data from computing node 310. In some embodiments, the data payload includes data from other computing node 310 subsystems (not shown), including but not limited to, occupant data subsystems. In an embodiment, one or more elements or nodes 320, 330, 340, or 360 may be located in the computing node 310.

Upon receiving the API 334 request, the AI/ML server process 336 may need to transform the data payload or portions of the data payload to be valid feature values into an AI/ML model 332. Data transformation may include but is not limited to combining data values, normalizing data values, and enriching the incoming data with data from other data sources. Once any required data transformation occurs, the AI/ML server process 336 executes the appropriate AI/ML model 332 using the transformed input data. Upon receiving the execution result, the AI/ML server process 336 responds to the API caller, which is a decision subsystem 316 of computing node 310. In some embodiments, the response may result in an update to a UI 314 in computing node 310. In some embodiments, the response includes a request identifier that can be used later by the decision subsystem 316 to provide feedback on the AI/ML model 332 performance. Further, in some embodiments, immediate performance feedback may be recorded into a model feedback log 338 by the AI/ML server process 336. In some embodiments, execution model failure is a reason for immediate feedback.

In some embodiments, the API 334 includes an interface to provide AI/ML model 332 feedback after an AI/ML model 332 execution response has been processed. This mechanism may be used to evaluate the performance of the AI/ML model 332 by enabling the API caller to provide feedback on the accuracy of the model results. In some embodiments, the feedback interface includes the identifier of the initial request so that it can be used to associate the feedback with the request. Upon receiving a call into the feedback interface of API 334, the AI/ML server process 336 records the feedback in the model feedback log 338. In some embodiments, the data in this model feedback log 338 is provided to model performance monitoring 356 in the AI/ML development system 340. This log data is streamed to the AI/ML development system 340 in one embodiment. In some embodiments, the log data is provided upon request.

Data associated with any of these steps/features, as well as any other features or functionality described or depicted herein, the AI/ML production system 330, as well as at least one of the other elements depicted in FIG. 3C may be used to process this data in a pre-transformation and/or post-transformation process.

Figure 4A:
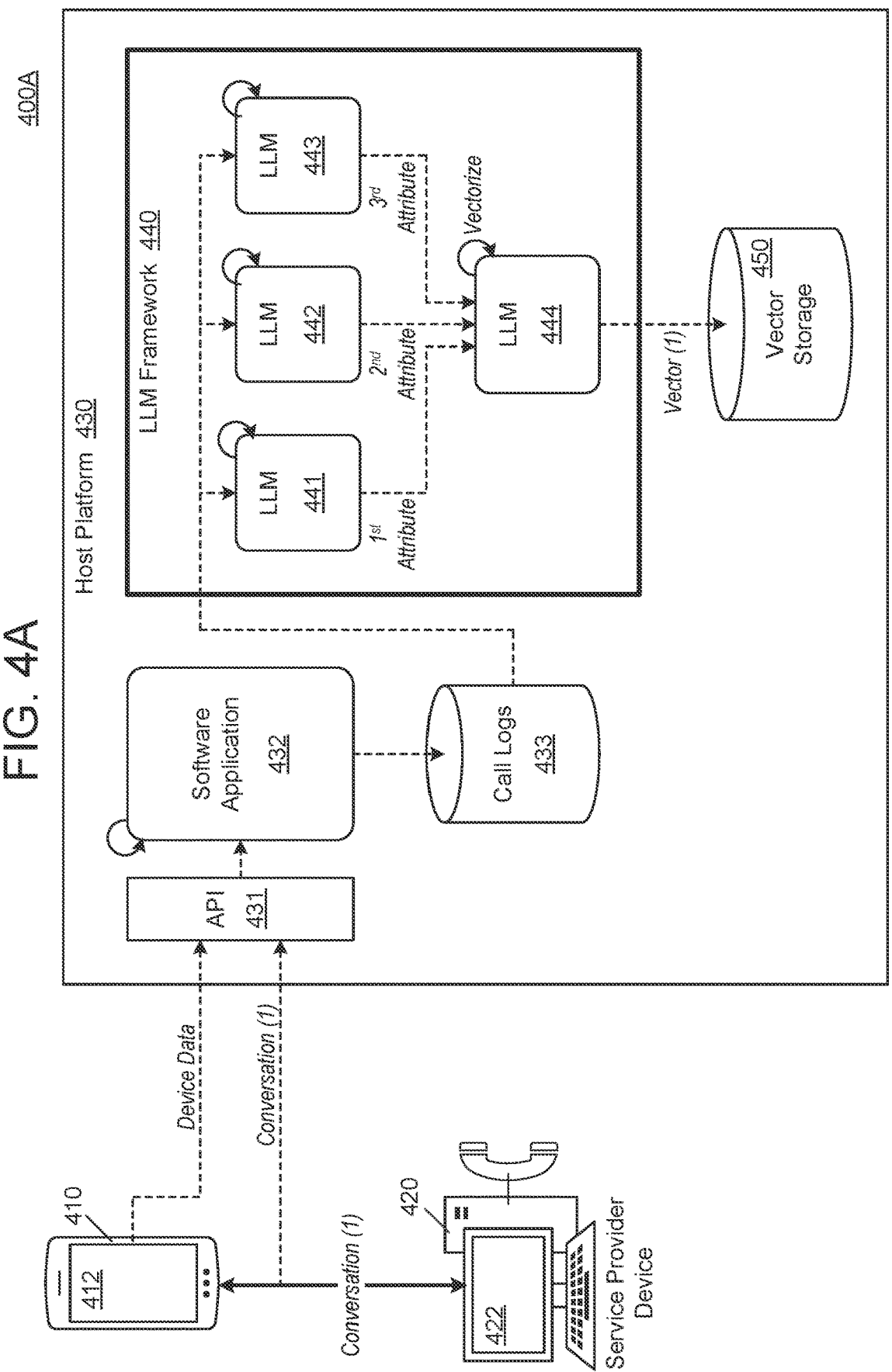
FIGS. 4A-4C are diagrams illustrating a process of identifying context from a conversation and generating a response based on the context which may be output during the conversation according to example embodiments.
Figure 4B:
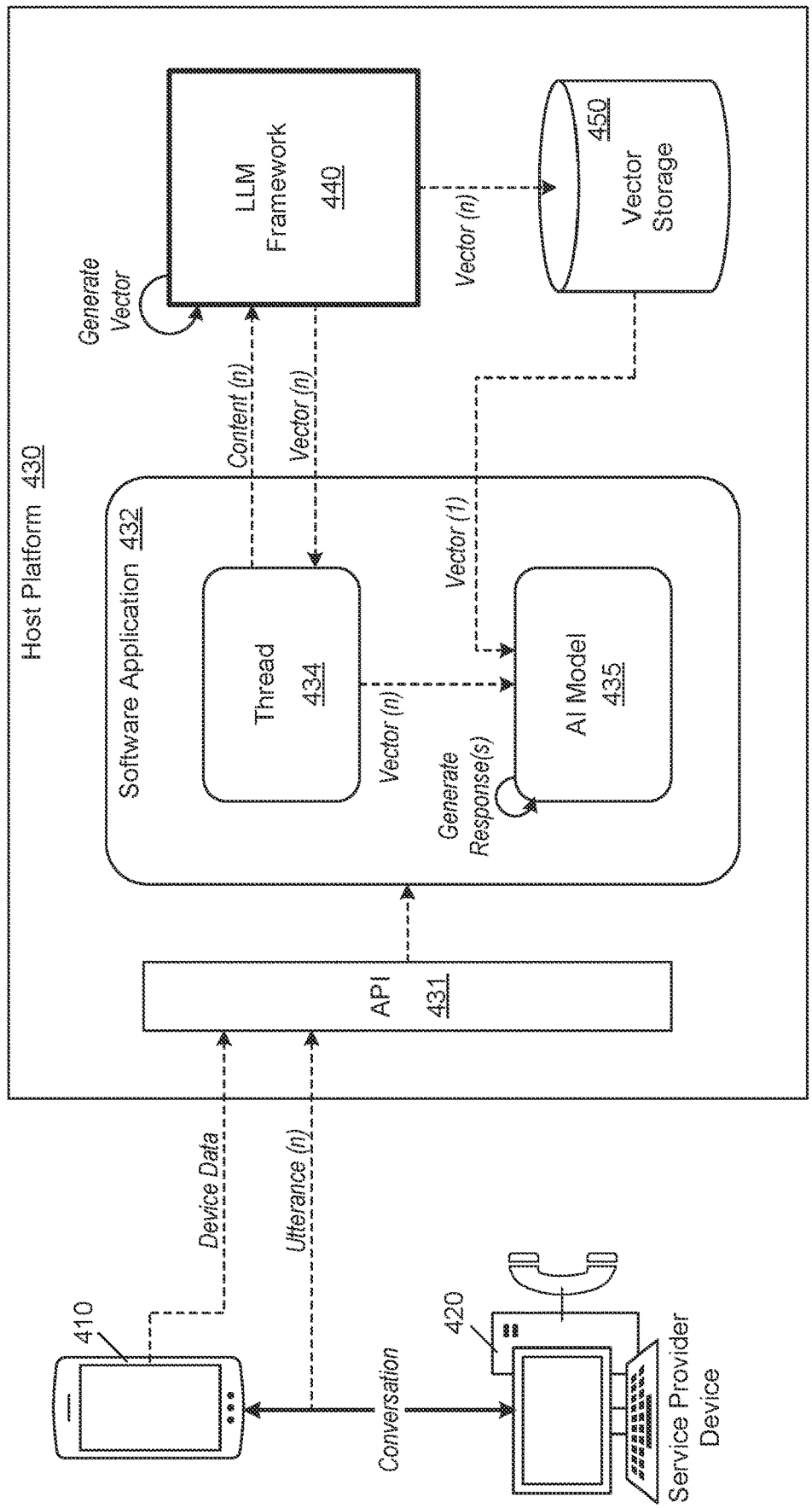
Figure 4C:
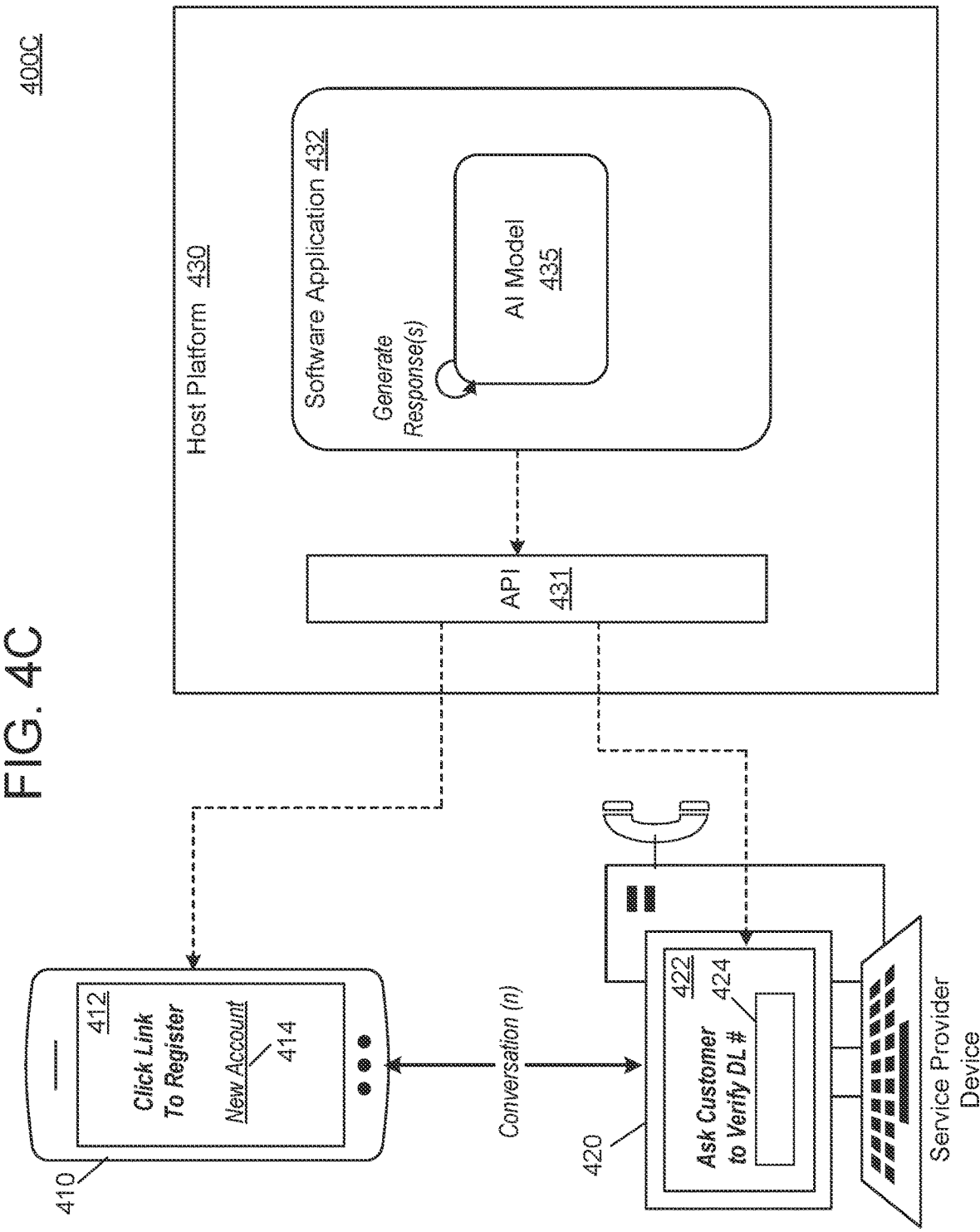

FIGS. 4A-4C are diagrams illustrating a process of identifying context from a conversation and generating a response based on the context which may be output during the conversation according to example embodiments. For example, FIG. 4A illustrates a process 400A of an LLM framework 440 identifying contextual attributes from a conversation between a source device 410 and a service provider device 420. In this example, the LLM framework 440 may refer to a multi-layered LLM framework because multiple LLMs work together to generate a response. Here, the source device 410 may be conducting a telephone call with a contact center representative of a service provider. The contact center representative may conduct the call using the service provider device 420. The conversation may flow through a software application 432 hosted by a host platform 430 such as a cloud platform, web server, etc. Each utterance on the contact between the source device 410 and the service provider device 420 may be provided to the software application 432, via an application programming interface (API) 431 of the software application 432.

The software application 432 may include a user interface/page that is displayed on the service provider device 420 which includes content, account details, transaction history, and the like, about a user of the source device 410. For example, when the source device 410 initially places a call with the contact center, the API 431 may receive information about the call from the host platform 430, the service provider device 420, the source device 410, or the like. Here, the software application 432 may detect an identifier of a user of the source device 410 based on the received information. For example, the identifier of the user may be included in the initial call signal transmitted from the source device 410. As another example, the service provider device 420 may provide an identifier of the user after the call has been connected. In addition, the software application 432 may also receive device data from the source device 410 such as Global Positioning System (GPS) coordinates, an IP address, a browsing history, browsing data (e.g., Hypertext Transfer Protocol (HTTP) cookies), and the like.

Interaction content from the call may be captured by the software application in the form of audio which is then converted to text by a word to text model, or the like. The text may be added to a call log of the conversation which is stored within a call logs data store 433. The content from an entire conversation may be aggregated together and stored within a call log within the call logs data store 433. The call log may then be converted into a vector via the LLM framework 440.

According to various embodiments, the LLM framework 440 may include a plurality of LLMs 441, 442, and 443 which operate in parallel on the call log data to identify a plurality of contextual attributes of the call. For example, the LLM 441 may identify one or more items of interest that are discussed during the call, the LLM 442 may identify a mood of the user during the call, and the LLM 443 may identify a tone of speech of the user during the call. In addition to identifying the contextual attributes, the LLMs may also identify timestamps or periods of time when the contextual attributes were present. For example, if a user had a pessimistic mood during a 30 second discussion of a product, the LLM 442 may generate an identifier of a pessimistic mood and a timestamp range that encompasses the 30 seconds of discussion.

The contextual attributes may be identified and used to annotate the interaction content. For example, an LLM 444 may receive interaction content/call log and annotate the conversation with the contextual attributes. Furthermore, the LLM 444 may convert the contextualized conversation into a vector that is stored within a vector storage 450. The annotation may include inserting labels (e.g., text values, timestamps, etc.) of the contextual attributes within the text of the conversation at temporally relevant locations to identify the context of the conversation at a particular point in time. For example, if a user had a loud tone of voice while speaking a sentence, the LLM 444 may add a label that identifies the tone as being "loud" with respect to the uttered sentence.

During the contact (such as a call), the software application 432 may display content about the user such as a name of the user, contact information, account number(s), reason for calling, transaction history, previous call content, and the like, on the user interface of the service provider device 420. In some embodiments, the software application 432 may also display a user interface or the like on the source device 410, however, this is not a requirement. In other embodiments, the software application 432 may provide audio services/call services without a user interface.

According to various embodiments, in addition to providing post-processing on call logs to generate vectors, as described in the example of FIG. 4A, the LLM framework 440 may also receive real-time interaction content from an active communication session between the source device 410 and the service provider device 420 and generate content which can be output during the communication session. For example, the LLM framework 440 may generate an instruction, a question, a query, a product offer, or the like, which can be displayed on the user interface 422 of the service provider device 420. As another example, the LLM framework 440 may generate a product offer, verification question, or the like, which can be displayed on the user interface 412 of the source device 410.

For example, FIG. 4B illustrates a process 400B of receiving real-time content from a conversation between a user of the source device 410 and a representative using the service provider device 420. Here, the real-time content includes a most-recent utterance from the conversation. The utterance is input to the software application 432 via the API 431. Here, the software application 432 may record a transcript of the conversation that is updated as each utterance is spoken. Furthermore, the software application 432 may also receive device data from the source device 410 such as geographic location, IP address, network connection type, and the like.

In some embodiments, the software application includes a main thread 434 configured to route the real-time interaction content to the LLM framework 440 along with content already spoken during the same conversation. In addition to forwarding the interaction content, the main thread 434 may also forward the device data from the source device, account information from a user of the source device, and the like. In response, the LLM framework 440 may generate a vector embedding of the content which is then provided back to the main thread 434. The main thread may execute an AI model 435 on the interaction content (vector) to determine a response that can be output during the conversation. The AI model 435 may be an LLM, a generative AI model, and the like. In addition, the AI model 435 may retrieve one or more other vectors of previous conversations between the user and the service provider from the vector storage 450 and use the previous conversations to generate the response.

FIG. 4C illustrates a process 400C of outputting a response to at least one of the source device 410 and the service provider device 420. According to various embodiments, different responses may be output to the source device 410 and the service provider device 420, by the software application 432 through the API 431 and based on the context of the conversation between the user of the source device 410 and the agent of the service provider device 420. Although not shown in FIG. 4C, it should also be appreciated that a response may only be output to the service provider device 420 or the source device 410.

In the example of FIG. 4C, a response 414, is generated by the AI model 435 for the source device 410 based on the context of the conversation, and the response 414 is displayed on the user interface 412 of the source device 410. Meanwhile, a response 424 is generated by the AI model 435 for the service provider based on the context of the conversation, and the response 424 is displayed on the user interface 422 of the service provider device 420. The response 414 and the response 424 may be output simultaneously on the user interface 412 and the user interface 422, respectively, however, embodiments are not limited thereto. In some embodiments, the response 424 may be output after the user has provided an input to the response 414 displayed on the source device 410.

In one embodiment, an apparatus identifies contextual attributes from a conversation and uses them to generate a real-time response. The apparatus includes a memory module to store previous interaction content with a service provider. This stored data serves as a repository of historical interactions between users and the service provider, enabling the system to reference past interactions, preferences, and customer issues. In one embodiment, the storing of previous interaction content could already be stored on the device of the service provider. The apparatus involves a processor, which receives interaction content from a communication session between a source device (such as a customer's device) and a service provider device. This communication occurs through various channels, including calls, chatbots, or web-based applications. The processor analyzes the real-time interaction content to identify contextual attributes associated with the source device. The attributes may include the products or services discussed, the user's sentiment towards them, and other relevant details that inform the response. The processor executes one or more LLMs on the interaction content and contextual attributes. The LLMs, trained on stored previous interaction content, understand, and generate human-like responses. By inputting the interaction content and contextual attributes and drawing from the stored previous interaction content, the LLMs generate a response tailored to the specific needs and context of the user. The apparatus outputs this real-time response to the source device and/or the service provider device, effectively closing the communication loop and ensuring the user receives a prompt and relevant response during the ongoing communication session.

In one embodiment, an apparatus employs a memory module to store previous interaction content with a service provider, forming a repository of historical interactions. The stored data serves as a reference point for understanding past interactions, preferences, and issues raised by customers. Additionally, the apparatus features a processor that receives interaction content from a communication session between a source device (such as a customer's device) and a service provider device. The processor analyzes the interaction content using one or more LLMs to identify a plurality of contextual attributes associated with the source device. The attributes encompass various factors such as products or services discussed, sentiment analysis, and other relevant details derived from the ongoing interaction. The processor then executes one or more LLMs on the plurality of contextual attributes associated with the source device to determine an appropriate response. By considering multiple contextual attributes simultaneously, the system generates a more nuanced and tailored response to effectively address the user's specific needs and context.

In one embodiment, an apparatus includes a memory module to store previous interaction content with a service provider, specifically focusing on recording audio from one or more previous contacts (such as calls). The stored audio data is valuable for understanding past interactions between users and service providers. The apparatus incorporates a processor for converting the recorded audio from one or more previous calls into a vector representation. The vectorization process transforms the audio data into a format that is effectively processed and analyzed by the system. The processor executes one or more LLMs on the vectorized audio data. The LLMs are trained on the vectorized audio data from previous calls, enabling them to understand the patterns, sentiments, and contextual cues in the conversations.

In one embodiment, an apparatus incorporates a memory module to store previous interaction content with a service provider, establishing a repository of historical interactions for reference. The stored data is valuable for understanding past interactions, preferences, and customer issues. The apparatus features a processor that receives real-time interaction content from the ongoing communication session between the source device (e.g., the customer's device) and the service provider device. The processor converts the received real-time interaction content into a vector representation, facilitating effective processing and analysis. The processor executes one or more LLMs on the vectorized real-time interaction content. The LLMs are trained on the vectorized conversation data from previous interactions, enabling them to understand patterns, sentiments, and contextual cues in the ongoing conversation.

In one embodiment, an apparatus utilizes a memory module to store previous interaction content with a service provider, forming a repository of historical interactions. The stored data serves as a reference point for understanding past interactions, preferences, and issues raised by customers. The apparatus features a processor that receives interaction content from the ongoing communication between the source device (e.g., the customer's device) and the service provider device. The processor executes one or more LLMs on the interaction content to identify an item of interest discussed during the session. This involves analyzing the conversation to identify keywords, phrases, or topics that indicate the subject matter under discussion. Furthermore, the processor determines the sentiment toward the identified item of interest based on the analysis performed by the LLMs. The sentiment analysis enables the system to gauge the user's attitude, opinion, or emotional response regarding the discussed item.

In one embodiment, an apparatus incorporates a memory module to store previous interaction content with a service provider, forming a repository of historical interactions. The stored data serves as a reference point for understanding past interactions, preferences, and issues raised by customers. The apparatus features a processor that receives device data from the source device, such as geographical location, IP address, and type of network connection. The device data provides additional context about the user's environment and circumstances during the communication session. The processor determines the response based on the execution of the received device data. The system tailors its responses by considering factors such as geographical location, IP address, and network connection type to better suit the user's specific situation or needs.

In one embodiment, an apparatus incorporates a memory module to store previous interaction content with a service provider, serving as a repository of historical interactions. The stored data provides valuable context for generating responses tailored to the user and the service provider. The apparatus features a processor that determines two responses based on the ongoing communication session. The first response is displayed on the source device, such as a customer's device, while the second is displayed on the service provider's device. The processor simultaneously outputs the first response to the source device and the second to the service provider device, ensuring both parties receive prompt and relevant responses during the ongoing communication session.

In one embodiment, the system analyzes real-time communication sessions between financial advisors and clients, enhancing the quality of investment advice provided. The communication session involves exchanges between a client seeking investment advice and a financial advisor providing guidance. The interactions occur through various channels such as phone calls, video conferences, emails, or instant messages. During the sessions, clients discuss their financial goals, risk tolerance, investment preferences, current portfolio holdings, market sentiments, and any queries or concerns regarding investment decisions. The system leverages LLMs to extract contextual attributes from the message content, including linguistic patterns, sentiment analysis, key terms, and conversational context. These attributes help understand the client's investment objectives, risk appetite, and market perceptions expressed during the conversation. Based on the identified contextual attributes, the platform generates personalized investment recommendations and risk management strategies tailored to the client's needs and the prevailing market conditions. These responses may include suggestions for asset allocation, portfolio diversification, investment products, and potential risks associated with different strategies. The responses are then communicated to the client through various devices.

In one embodiment, the system uses a chatbot to interact with customers seeking financial information and assistance. Message interaction occurs between users seeking financial information and assistance and the chatbot deployed on a digital platform. Users initiate conversations by sending queries or messages through the chat interface provided by the platform. Users may inquire about financial topics such as banking services, investment options, loan products, insurance policies, or general financial advice. The message content could include questions, requests for information, or specific queries regarding financial products or services. The chatbot utilizes LLM technology to extract contextual attributes from the message content. This includes analyzing the linguistic patterns, sentiment, key terms, and intent behind the user's queries to understand their financial needs, preferences, and the conversation context. The chatbot generates relevant and accurate responses to the user's queries based on the identified contextual attributes. It provides information, guidance, or assistance tailored to the user's specific financial situation, preferences, and conversation context. Responses may include explanations of financial products, comparisons of different options, procedural guidance, or links to relevant resources. Responses are communicated to the user through the chatbot user interface, a web-based chat window embedded in a website, a mobile messaging application, or a dedicated chatbot platform where users can send messages and receive responses.

In one embodiment, the system includes a virtual financial assistant. The system continuously monitors communication sessions across various channels, including emails, texts, and voice interactions. It captures valuable insights into users' financial behaviors, goals, and concerns through sophisticated algorithms. This comprehensive approach enables the system to understand each user's financial landscape deeply. Leveraging LLMs and advanced natural language processing techniques, the system interprets the contextual attributes extracted from communication sessions. It discerns nuances in language, identifies key financial indicators, and analyzes patterns in users' interactions to derive meaningful insights. The system utilizes the users' financial profiles to offer proactive financial suggestions and reminders tailored to individual needs. For instance, it reminds users of upcoming bill payment deadlines, provides budgeting tips based on spending patterns, and highlights investment opportunities aligned with their financial goals and risk tolerance. Through continuous learning and adaptation, the system refines its recommendations to suit each user's evolving financial circumstances better. By considering factors such as income fluctuations, expense trends, and life events, it delivers highly personalized guidance to promote financial well-being. The system is accessible through a user-friendly interface across multiple platforms, such as mobile apps, web browsers, and smart devices. Its intuitive design facilitates seamless interaction, allowing users to effortlessly access financial insights, set preferences, and receive timely notifications.

In one embodiment, the system detects fraud for financial institutions. The system continuously monitors various real-time communication channels, including emails, instant messages, and phone calls, between customers and representatives. This proactive approach enables prompt detection of suspicious activities as they occur. The system uses advanced LLM and natural language processing techniques to analyze linguistic patterns, sentiment, and contextual cues extracted from user interactions. LLMs enhance the system's comprehension and interpretation of complex language structures. The analysis identifies anomalies or deviations from typical communication patterns associated with fraudulent attempts. Based on linguistic analysis and contextual understanding, the system identifies suspicious activities or fraudulent attempts, such as phishing scams, social engineering tactics, or unauthorized transactions. It uses rule-based algorithms and machine-learning models to flag such activities for further investigation. Upon detecting suspicious behavior, the system promptly alerts relevant parties, including fraud detection teams and customers, via notifications or alerts. Simultaneously, it implements preventive measures such as transaction blocking, account freezing, or additional authentication steps to mitigate potential risks and prevent financial losses. The system incorporates mechanisms for continuous learning and adaptation to evolving fraud patterns and techniques. It utilizes feedback loops to update its algorithms and models based on new data and emerging threats, ensuring robust protection against sophisticated fraud schemes.

In one embodiment, the system analyzes communication patterns and behavioral cues within financial markets. It utilizes advanced linguistic models to analyze and interpret textual data, extracting valuable insights from various sources, including news articles, social media posts, and financial reports. The system extracts key information related to financial markets, companies, and economic indicators in real time. Utilizing LLMs identifies relevant keywords, sentiment indicators, and behavioral cues. The tool analyzes communication patterns and sentiment indicators and provides comprehensive insights into market sentiment. It identifies prevailing attitudes, emotions, and perceptions among investors, which can influence market dynamics and asset prices. It tracks investor sentiment by analyzing social media posts, forums, and other online discussions. It identifies emerging trends, hot topics, and investor sentiment shifts, allowing users to gauge market sentiment in real time. The tool uses machine learning algorithms to identify emerging trends and patterns within financial markets. It detects unusual market activity, significant news events, and changes in investor behavior, enabling users to stay ahead of market movements. The platform offers intuitive data visualization tools, allowing users to explore trends, patterns, and sentiment indicators visually. Users can gain deeper insights into market dynamics and investor behavior through interactive charts, graphs, and dashboards. Users can set up customizable alerts based on specific criteria, such as keyword mentions, sentiment shifts, or significant news events. This allows users to stay informed about relevant developments and take timely actions.

Figure 5A:
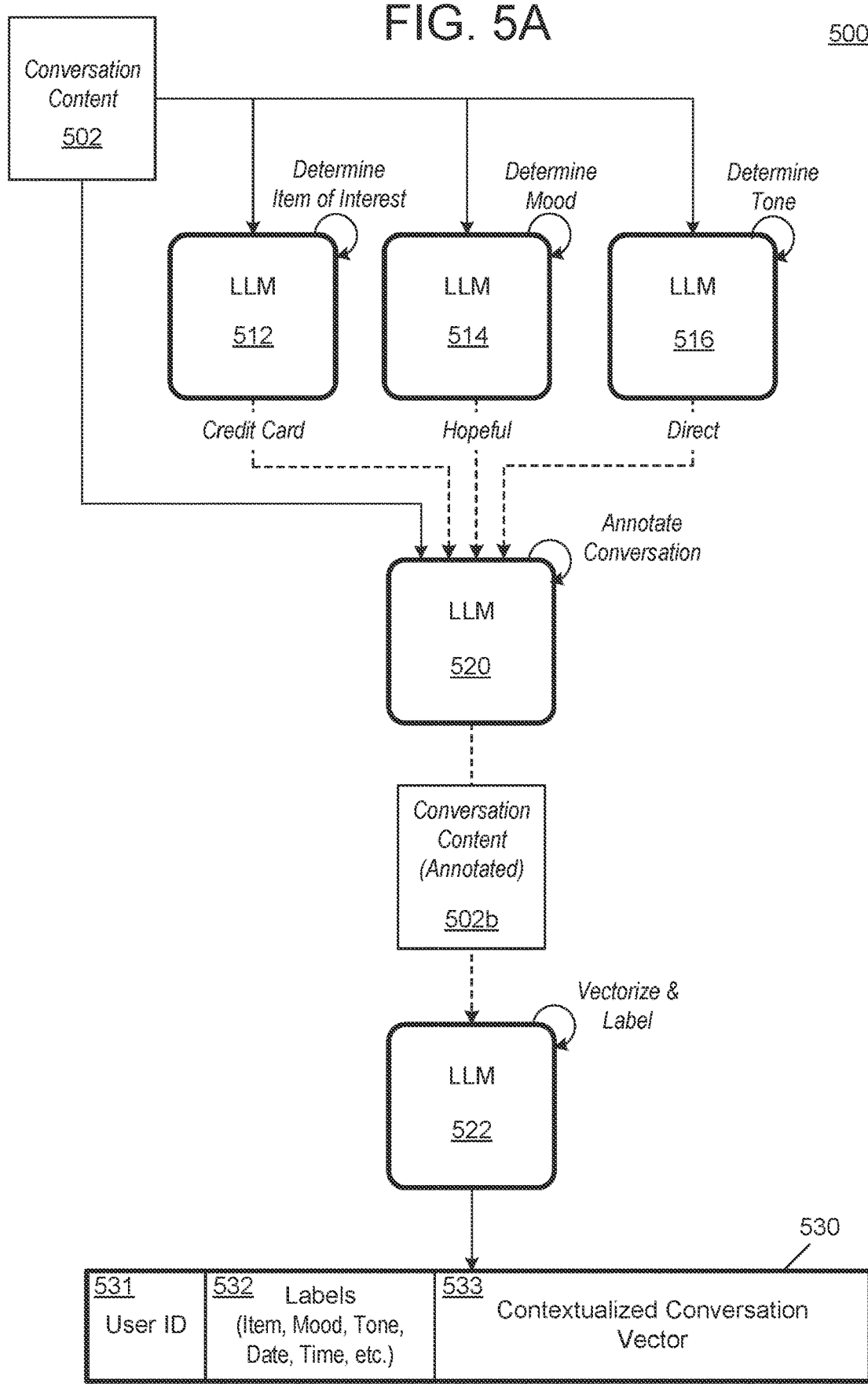
FIGS. 5A-5C are diagrams illustrating a process of generating vectorized interaction content that is labelled with context and managing a vector storage for the vectorized interaction content according to example embodiments.
Figure 5B:
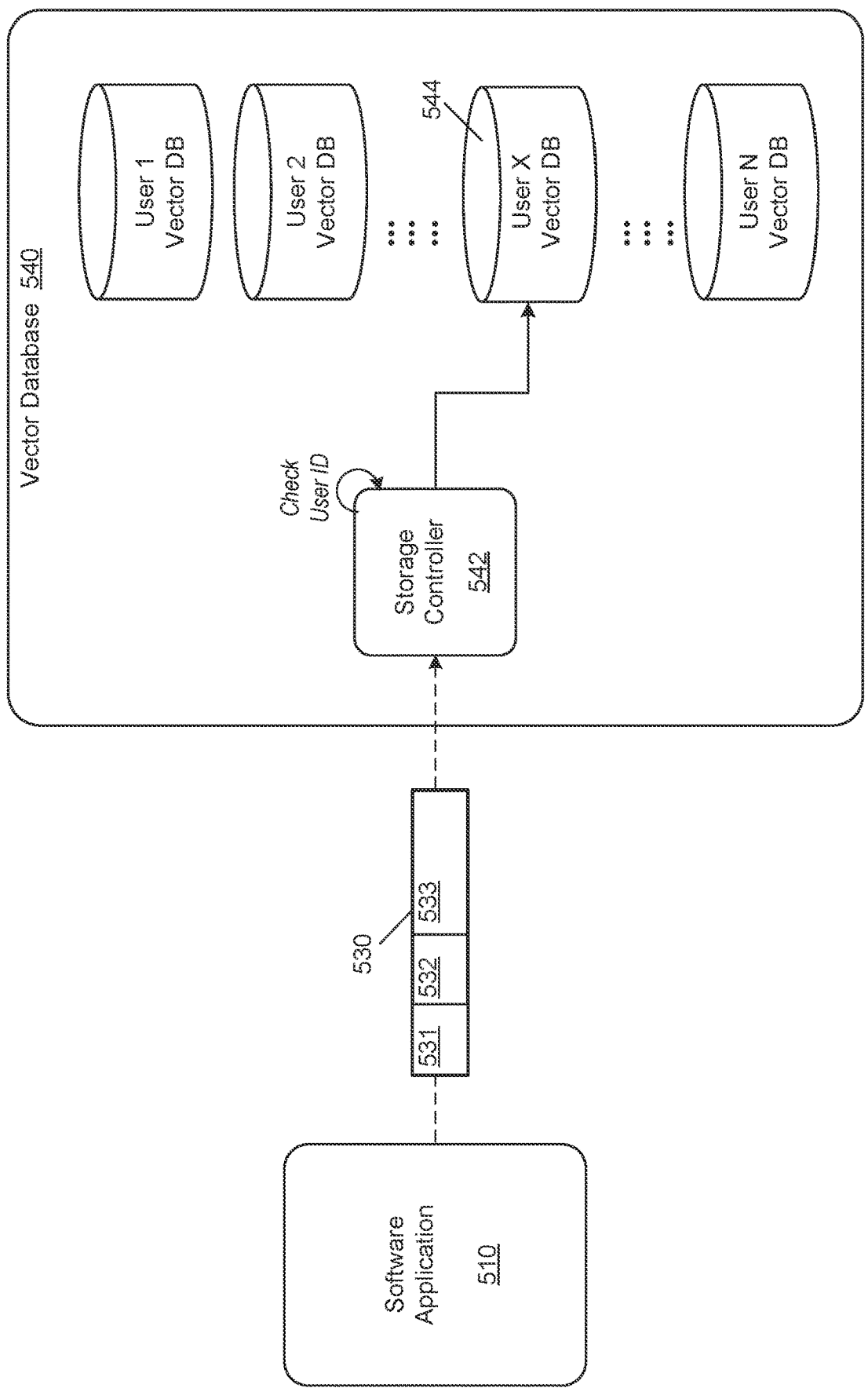
Figure 5C:
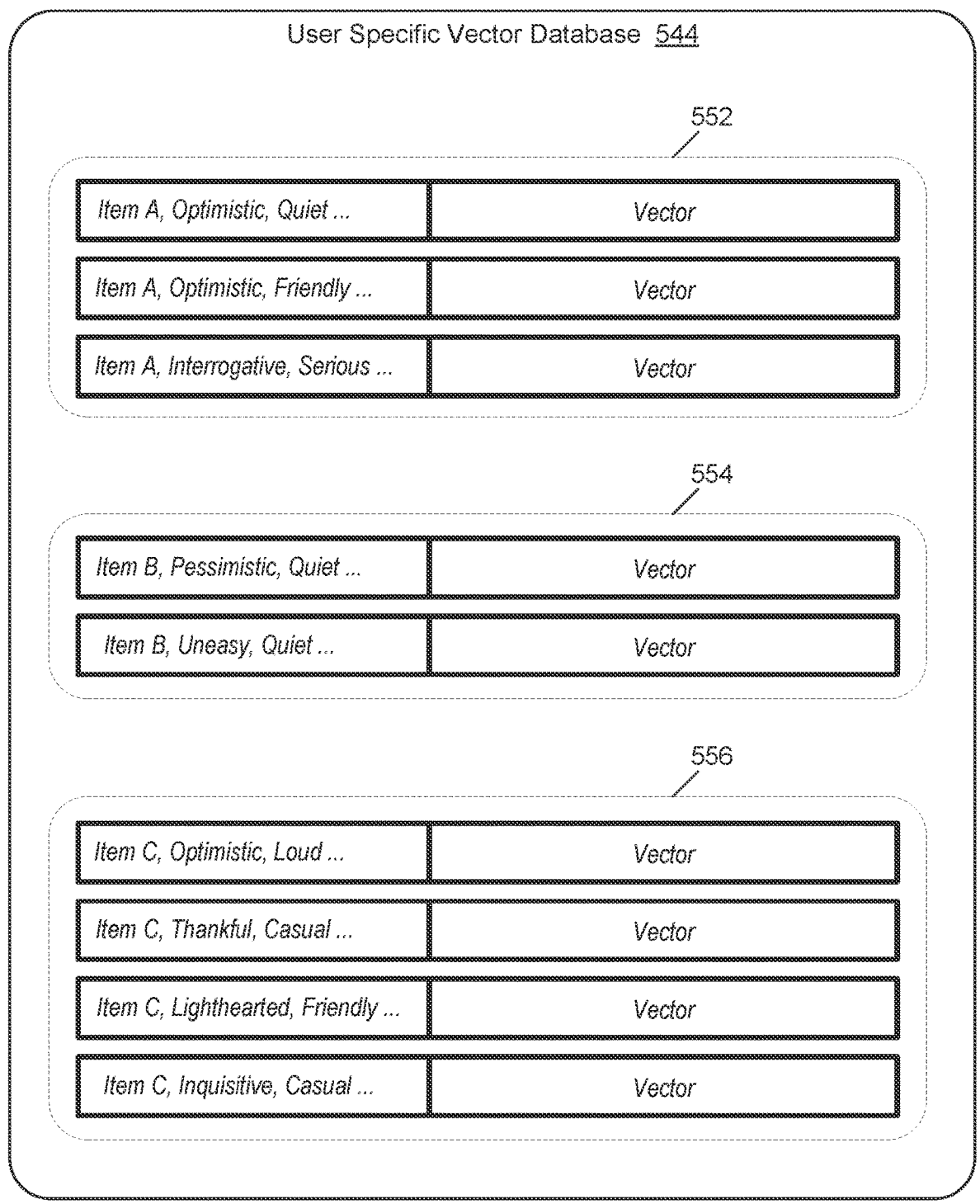

FIGS. 5A-5C illustrate a process of generating vectorized interaction content that is labelled with context and managing a vector storage for the vectorized interaction content according to example embodiments. As an example, the processes shown in FIGS. 5A-5C may be performed by the LLM framework 440 shown in FIG. 4A, however, embodiments are not limited thereto.

FIG. 5A illustrates a process 500A of generating a vector 530 from interaction content 502 according to example embodiments. Referring to FIG. 5A, the interaction content 502 may be taken from a previously recorded contact (such as a call), a live call, a chat session, or the like, between a user/customer and a representative of a service provider. The interaction content 502 may be input to LLMs, including an LLM 512, an LLM 514, and an LLM 516, which may run in parallel (simultaneously), in sequence, or the like.

In this example, the LLM 512 is configured to identify an item of interest included in the interaction content 502. Meanwhile, the LLM 514 is configured to identify a mood of a user within the interaction content 502, and the LLM 516 is used to identify a tone of the user within the interaction content 502. These contextual attributes may also include temporal values (e.g., timestamps, timestamp ranges) to indicate when they occurred during the call. The identified contextual attributes may be provided to an LLM 520 which can annotate the interaction content 502 based on the contextual attributes generated by the LLM 512, the LLM 514, and the LLM 516, resulting in annotated interaction content 502b. Furthermore, another LLM 522 may ingest the annotated interaction content 502b and generate the vector 530 by embedding the annotated interaction content into vector space.

According to various embodiments, the attributes of the user of the contact may be identified and stored with the vector 530, for example, in a header 531 of the vector 530. In addition, labels which identify the contextual attributes identified by the LLM 512, the LLM 514, and the LLM 516, may be stored within a metadata section 532 of the vector 530. Meanwhile, the vectorized interaction content may be stored within a section 533 of the vector 530. Although the LLM 520 annotates the interaction content and the LLM 522 vectorizes the annotated interaction content, it should also be appreciated that a single LLM may perform both functions, but they are shown separately for purposes of convenience in this example.

FIG. 5B illustrates a process 500B of storing the vector 530 generated in FIG. 5A, within a vector database 540. Referring to FIG. 5B, according to various embodiments, each user of a software application 510 (e.g., software application 121 shown in FIG. 1, software application 432 shown in FIG. 4A, etc.) may include their own user-specific vector storage area within the vector database 540. In this example, the vector 530 may be provided to a storage controller 542 of the vector database 540. Here, the storage controller 542 may analyze at least one of the user data within the header 531 to identify a user associated with the vector 530.

In this example, the storage controller 542 identifies a user-specific vector database 544, for example User X Vector DB in FIG. 5B, that corresponds to a user included in the interaction content 502 in FIG. 5A. Here, the user-specific vector database 544 may include one or more previous vectors of the user created from one or more previous conversations between the user and the service provider. In this example, the storage controller 542 stores the vector 530 within the user-specific vector database 544 thereby aggregating the vector 530 together with any other previous vectors of the user to create an aggregated vector storage for the particular user.

FIG. 5C illustrates a process 500C of arranging vectors (or rearranging vectors) within a user-specific vector database 544 such that related vectors are easier/quicker to identify and retrieve from the user-specific vector database 544. Referring to FIG. 5C, the storage controller 542 may use one or more contextual attributes added to the vectors to arrange them within the user-specific vector database 544. In the example of FIG. 5C, the storage controller 542 arranges the vectors into clusters based on an item of interest attribute that is added to the metadata labels of the vectors. For example, a subset of vectors 552 are clustered together because they each include an item A contextual label. Likewise, a subset of vectors 554 are clustered together because they each include an item B contextual label, and a subset of vectors 556 are clustered together because they each include an item C contextual label.

While FIG. 5C uses a contextual label of a product of interest to arrange the vectors, a different contextual attribute or attributes may be used. For example, a time/date attribute may be used to arrange the vectors in chronological order. As another example, all vectors where the user was happy, sad, optimistic, pessimistic, etc., may be segregated and stored together. By segregating the vectors into smaller clusters, an entire cluster of vectors can be retrieved and input to an LLM by simply providing an identifier of the contextual attribute to the storage controller 542.

According to various embodiments, the storage controller 542 may also identify older content within the user-specific vector database 544 and delete such older content when the content reaches a certain age, for example, 2 years, 3 years, 5 years, or the like. The storage controller 542 may periodically clean-up the user-specific vector database 544 based on the contents' age and remove vectors that are not relevant to the current state of mind of the user. As another example, the identification of older content by its age may be performed when an amount of vectors held within the user-specific vector database 544 exceeds a threshold. This process can create more available storage space within the user-specific vector database 544 by deleting vectors that are from older conversations which do not reflect the current interests of the user. For example, the storage controller 542 may detect a current age of a vector by reading a vector creation timestamp from a metadata tag/label added to the vector by the LLM framework described herein and compare the timestamp to a current time on a system clock of the vector database 540.

In one embodiment, the timestamp is when the interaction content and the plurality of contextual attributes of the communication session are converted into a vector. In one embodiment, the timestamp is the time the vector is labeled. In one embodiment, the timestamp is the time the vector is stored. In one embodiment, the timestamp is the time the vector is stored. Time and timestamp can be used interchangeably.

As described and depicted herein, the processor and memory may be directly coupled and/or may be communicatively coupled. In one embodiment, an apparatus comprises a memory and a processor coupled to the memory. The processor receives interaction content from a communication session between a source device and a service provider device. The interaction content could include text-based messages between a customer's device (the source device) and a bank's service provider device, such as messages regarding account inquiries or transactions. The processor identifies a plurality of contextual attributes of the communication session based on executing one or more LLMs on the interaction content. These contextual attributes encompass various details extracted from the conversation, such as the user's mood, discussed products or services, location, time of the interaction, and other relevant information. After identifying the contextual attributes, the processor converts the interaction content and the plurality of contextual attributes into a vector. The conversion is facilitated by executing an additional LLM, which transforms the textual interaction content and its associated contextual attributes into a numerical representation, effectively encoding the information into a vector format. The vector serves as a condensed representation of the conversation session, capturing both the content exchanged and the contextual nuances identified by the LLMs. Once the vector is generated, the processor labels the vector with identifiers corresponding to the plurality of contextual attributes identified earlier. These identifiers categorize and organize the vector data within a vector database, facilitating efficient storage and retrieval of conversational data. Additionally, the vector is stored within the vector database along with a timestamp, providing temporal information about when the communication session occurred.

In one embodiment, an apparatus comprising a memory and a processor, where the processor is configured to store vectors within a dedicated storage area of a vector database specifically allocated to the source device. The communication sessions and their corresponding vectors are organized and structured within the database, with each source device having its own storage area. For instance, communication sessions from different customers' devices, such as smartphones or computers, are segregated within the database to ensure data integrity and efficient retrieval. The storage area of the vector database contains not only the vector generated from the current communication session but also one or more other vectors associated with previous communication sessions between the same source device and the service provider device, enabling a comprehensive view of the user's interaction history with the service provider. Upon receiving interaction content and identifying contextual attributes, the processor generates a vector representation and labels it with identifiers based on the identified contextual attributes. The processor stores the labeled vector within the dedicated storage area of the vector database associated with the source device. When a new conversation session occurs with the same source device, the processor retrieves the existing vectors from the dedicated storage area, accumulating conversational data over multiple sessions, ensuring that historical conversation data is readily accessible for analysis and utilization.

In one embodiment, an apparatus is configured to annotate interaction content with identifiers of the plurality of contextual attributes. Following the identification of contextual attributes using one or more LLMs, the processor annotates the interaction content by associating each identified attribute with relevant segments of the text-based conversation. The annotations enhance the understanding of the interaction content by providing explicit markers for the identified contextual attributes. For example, if a conversation involves discussing a specific product or service, the processor annotates the corresponding segments of the conversation with identifiers indicating the discussed product or service, thereby creating a richer dataset for subsequent processing. The processor analyzes the interaction content, identifies contextual attributes using LLMs, and annotates the interaction content with relevant identifiers, ensuring that the identified attributes are explicitly linked to the corresponding parts of the conversation. After annotation, the processor converts the interaction content annotated with identifiers of the contextual attributes into a vector representation, encapsulating both the original interaction content and the associated contextual attributes.

In one embodiment, an apparatus is configured to identify an item of interest and a mood with respect to the item of interest from the interaction content and subsequently label the vector with identifiers of both the item of interest and the mood. Following the analysis of interaction content and identification of contextual attributes using one or more LLMs, the processor identifies an item of interest discussed during the conversation. This could include products, services, or any other entities relevant to the conversation context. The analysis uses semantic understanding and sentiment analysis techniques to extract relevant information from the conversation. Additionally, the processor discerns the mood associated with the item of interest, reflecting the emotional or attitudinal aspect of the conversation. Once the item of interest and mood are identified, the processor labels the vector representation of the conversation with identifiers corresponding to both the item of interest and the mood. The identifiers categorize the conversation data within the vector database, facilitating retrieval and analysis of conversations based on specific items of interest and associated moods. After labeling, the processor stores the vector in the vector database along with the identified contextual attributes and timestamp.

In one embodiment, an apparatus is configured to identify a date and time the communication session occurred and label the vector with identifiers of both the date and the time. Following the receipt of interaction content and the identification of contextual attributes using one or more LLMs, the processor proceeds to extract temporal information from the conversation. This involves identifying the specific date and time the communication session took place, providing temporal context to the conversation data. The processor analyzes the interaction content to identify temporal information, such as the date and time of the communication session. The analysis parses natural language text to extract temporal expressions and utilizes metadata associated with the conversation session. Once the date and time are identified, the processor labels the vector representation of the conversation with identifiers corresponding to both the date and the time. The identifiers categorize the conversation data within the vector database, enabling efficient retrieval and analysis based on chronological criteria. After labeling, the processor stores the vector in the vector database along with other contextual attributes and the timestamp. The labeled vector encapsulates the interaction content, identified contextual attributes, and the temporal information of the communication session.

In one embodiment, an apparatus is configured to receive a search query from a software application, identify one or more vectors within the vector database that correspond to the search query based on labels of the vectors, and transmit the one or more vectors to the software application. The functionality enables the apparatus to retrieve relevant conversation data from the vector database in response to search queries initiated by a software application. The software application sends a search query to the processor, specifying criteria or keywords for retrieving relevant conversation data. Upon receiving the search query, the processor utilizes the labels associated with vectors stored in the vector database to identify one or more vectors that match the search criteria by comparing the search query with the labels of stored vectors to determine relevance. Once the relevant vectors are identified, the processor transmits the vectors to the software application, enabling the application to access and utilize the corresponding conversation data. The data transmission can send the vectors directly to the software application or provide access to the vectors through an application programming interface (API).

In one embodiment, an apparatus is configured to add metadata to the vector, including identifiers of the plurality of contextual attributes, prior to storing the vector in the vector database. The communication between the components involves the processor processing interaction content and identifying contextual attributes using one or more LLMs. Once the contextual attributes are identified, the processor generates metadata consisting of these attributes and associates them with the corresponding vector. The metadata serves as descriptive information about the vector, providing insights into the context of the conversation represented by the vector. After adding metadata, the processor stores the vector in the vector database along with the associated metadata and timestamp. The metadata-enhanced vector encapsulates the interaction content, identified contextual attributes, and additional descriptive information.

In one embodiment, the system analyzes communication sessions between customers and banking representatives, extracting contextual attributes to provide tailored services and responses. When a customer interacts with a bank representative through various channels such as phone calls, chats, or emails, the system employs LLMs to identify critical contextual attributes. These attributes include the customer's sentiment, financial needs, product preferences, and any issues or concerns raised during the conversation. For instance, if a customer expresses interest in applying for a mortgage during a phone call with a bank representative, the system analyzes the conversation in real time to identify relevant contextual attributes, including the customer's preferred mortgage term, desired interest rate, and financial goals such as homeownership or investment. Based on this information, the system generates personalized recommendations and guidance tailored to the customer's situation. The system stores the conversation data and corresponding vectors containing contextual attributes in a secure database for future reference. This allows the bank to track customer interactions and gain insights into individual preferences and behavior patterns. The system can refine its responses and improve the overall customer service experience by continuously analyzing and learning from these interactions.

In one embodiment, the system implements credit card fraud detection and prevention services. The system is designed to analyze communication sessions between cardholders and the company's representatives, extracting contextual attributes to detect and prevent fraudulent activities effectively. When a cardholder contacts the credit card company to report a suspicious transaction or potential fraud, the system springs into action. It employs LLMs to analyze the conversation in real-time, extracting critical contextual attributes such as the transaction details, timing, location, and the cardholder's behavior patterns. For instance, if a cardholder reports a suspicious transaction made in a foreign country while they are known to be in their home country, the system flags this discrepancy as a potential fraud indicator. Additionally, if the cardholder's speech patterns or demeanor during the conversation raise further suspicion, such as nervousness or reluctance to provide certain information, these contextual attributes are also taken into account. Based on the identified contextual attributes, the system determines the appropriate response to mitigate the risk of fraud. This may include temporarily blocking the card, initiating a fraud investigation, or verifying the cardholder's identity through additional authentication measures. Furthermore, the system stores the conversation data along with the corresponding vectors containing contextual attributes in a secure database for future reference and analysis. This enables the credit card company to track fraudulent patterns and modus operandi over time, leading to more effective fraud detection and prevention strategies.

In one embodiment, the system generates personalized investment advice for individual investors. The system analyzes communication sessions between investors and financial advisors, extracting contextual attributes to gain insights into the investor's financial goals, risk tolerance, investment preferences, and market sentiments. The analysis is facilitated by LLMs capable of understanding and interpreting the nuances of investor conversations across various channels such as phone calls, emails, or online chats. For example, during a conversation with a financial advisor, an investor may want to prioritize long-term growth while minimizing risk exposure. The system's AI algorithms analyze the conversation in real time, identifying contextual attributes such as the investor's risk appetite, investment horizon, and specific asset classes of interest (e.g., stocks, bonds, real estate). The system generates personalized investment recommendations and strategies tailored to the investor's objectives based on these contextual attributes. These recommendations may include asset allocation suggestions, portfolio diversification strategies, and investment product recommendations aligned with the investor's risk profile and financial objectives. The system stores the conversation data along with the corresponding vectors containing contextual attributes in a secure database for ongoing analysis and model refinement, enabling the system to continuously learn from past interactions and improve the accuracy and relevance of its investment advice over time.

In one embodiment, the system optimizes insurance claim processing through intelligent automation and contextual analysis. The system streamlines insurance claims handling by leveraging advanced AI technology to analyze communication sessions between policyholders and claims representatives. When a policyholder submits a claim through various communication channels such as phone calls, emails, or online forms, the system employs LLMs to extract contextual attributes from the conversation, including details about the claim, policy coverage, urgency, and any relevant supporting documentation provided by the policyholder. For example, during a phone call with a claims representative, a policyholder may provide information about a car accident and submit photos of the damage. The system analyzes the conversation and accompanying documentation in real-time, identifying contextual attributes such as the nature of the claim, the damage extent, and urgency. Based on these contextual attributes, the system automates various aspects of the claims processing workflow. This includes categorizing claims based on severity, assigning appropriate adjusters or investigators, and expediting urgent or high-priority claims processing. The system stores the conversation data and the corresponding vectors containing contextual attributes in a secure database for historical analysis and model enhancement, allowing insurance companies to identify trends, patterns, and bottlenecks in the claims handling process, improving efficiency, accuracy, and customer satisfaction.

In one embodiment, the system targets millennial investors seeking financial advice and planning services. The system leverages a chatbot to engage users in conversational interactions and deliver customized recommendations based on their financial circumstances and goals. The chatbot operates through various communication channels, such as messaging apps, websites, or mobile platforms. When a millennial investor interacts with the chatbot, it employs LLMs to extract contextual attributes from the conversation, including the user's financial objectives, risk tolerance, income level, debt obligations, and life stage. For instance, during a chat session with the chatbot, a millennial investor may desire to save for a down payment on a home within the next five years while also planning for retirement. The chatbot analyzes the conversation in real time, identifying contextual attributes such as the user's short-term and long-term financial goals, investment horizon, and risk preferences. Based on these contextual attributes, the chatbot generates personalized financial guidance and investment recommendations tailored to the user's needs and circumstances. This may include suggestions for budgeting, saving strategies, investment allocation, retirement planning, and debt management. The chatbot stores the conversation data and corresponding vectors containing contextual attributes in a secure database for continuous learning and improvement, allowing it to refine its responses and recommendations over time based on user feedback, interactions, and evolving financial situations.

Figure 6A:
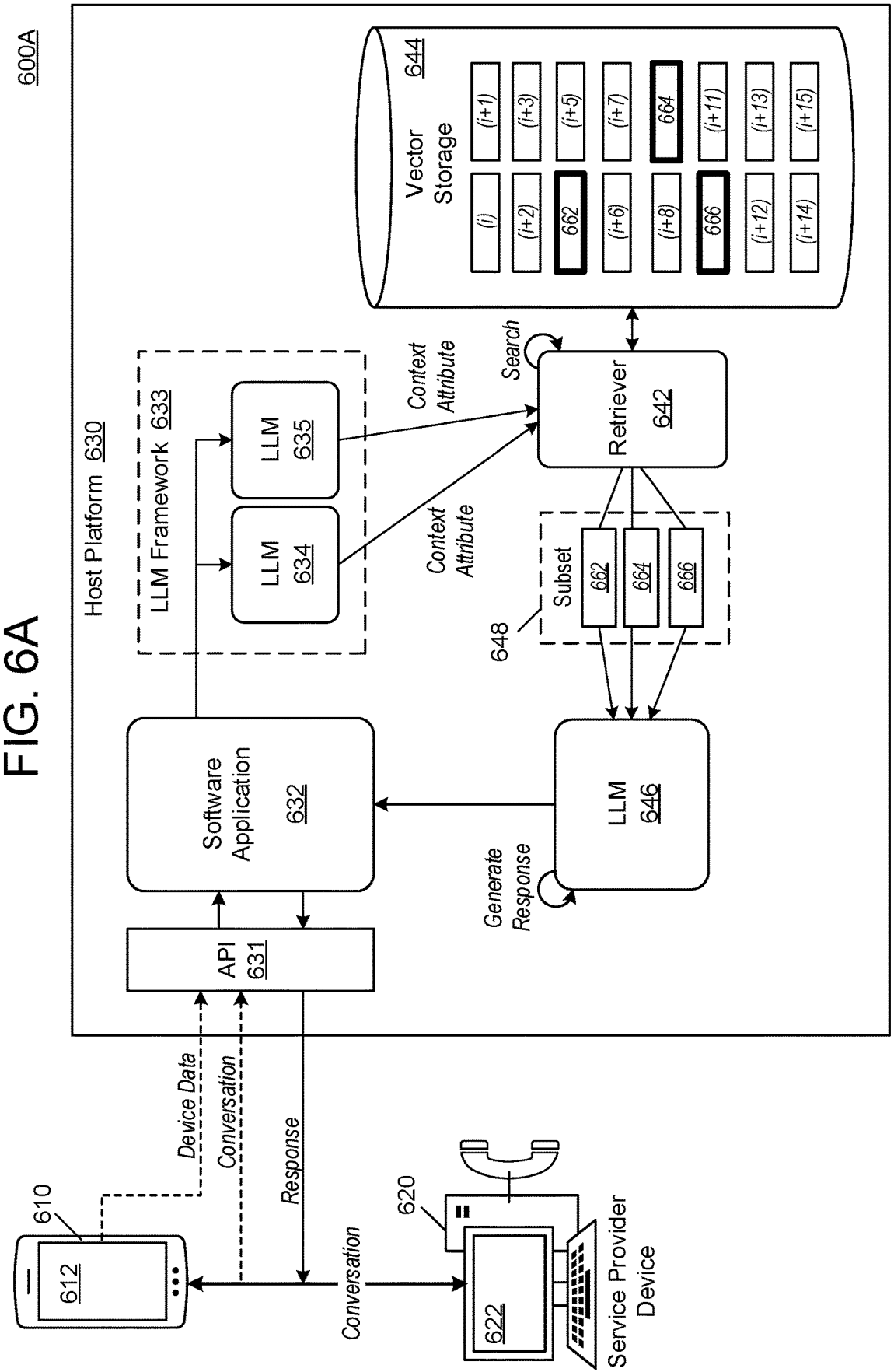
Figure 6B:
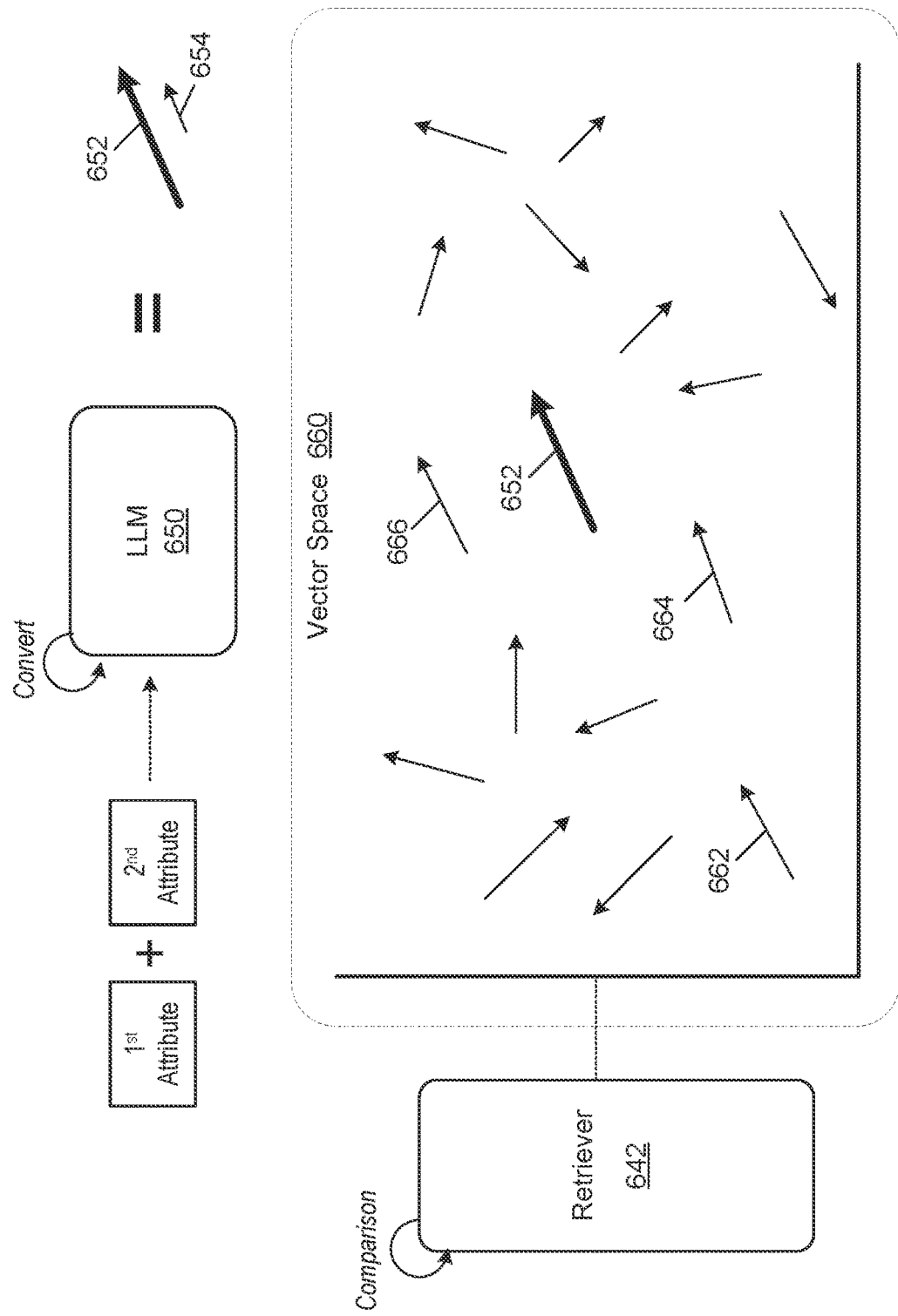

FIGS. 6A-6C illustrate a process of retrieval augmented generation (RAG) architecture for enhancing conversational responses generated by a LLM according to example embodiments. The example embodiments may rely on a RAG architecture to improve the efficacy of a LLM by leveraging custom data generated by one or more other LLMs. The custom data may refer to contextual attributes that are identified from a conversation. These contextual attributes may be used to "retrieve" previous conversations with similar context, such as previous conversations directed to the same item of interest, previous conversations that occurred near a same point in time, or the like.

Most LLMs are trained on a wide range of data such as publicly-available data. This gives the LLM broad knowledge but only enables the LLM to generate generalized responses. In the example embodiments, an LLM model may be enhanced through the use of a RAG-based architecture which can query and retrieve relevant data related to an input from a conversation between a source device and service provider. The relevant data may be retrieved from a vector storage, such as a vector database, and may be used to augment the input data to the LLM to create a response that is more narrowly tailored toward a particular context.

FIG. 6A illustrates a process 600A of a retriever 642 within a RAG-based architecture which can identify a subset of vectors within a vector storage 644 and augment an input to an LLM 646 with the subset 648 of vectors. The LLM 646 may generate a response that is based on both the general training it has received and the more-specific data within the subset 648 of vectors thereby fine-tuning the response generated by the LLM 646 in comparison to the typical generalized response created by the LLM 646.

Referring to FIG. 6A, a source device 610 and a service provider device 620 are conducting a communication session, such as a call, a chat, or the like. In this example, interaction content from the communication session and device data from the source device 610 may be transferred to a software application 632 hosted by a host platform 630, via an API 631 of the software application 632. Here, either the call content generated by the source device 610 and/or the service provider device 620 may be passed to the software application 632 from a front-end of the software application which may be installed on at least one of the source device 610 and the service provider device 620.

The device data may include files and data which show preferences of the user with respect to various items. As an example, the device data may include at least one of browsing history from a web browser installed on the source device 610, browsing data such as cookies stored within a browser or other application on the source device 610, a user profile from an account history or the like of the source device 610, and the like. The device data may also include a geographic location of the source device 610, an IP address of the source device 610, a network connection type of the source device 610, and the like.

The software application 632 may transfer the interaction content and the device data to an LLM framework 633. Here, the LLM framework 633 includes a plurality of LLMs including an LLM 634 configured to identify a first contextual attribute from the conversation and an LLM 635 configured to identify a second contextual attribute from the conversation. As an example, the LLM 634 may identify an item of interest that is discussed or otherwise mentioned during the call. As another example, the LLM 635 may identify a sentiment, a mood, a tone, etc., of a user of the source device 610 with respect to the item to interest.

According to various embodiments, the contextual attributes that are identified by the LLM 634 and the LLM 635 may be fed to the retriever 642 as search criteria. In this example, the retriever 642 may identify one or more vectors within the vector storage 644 that are similar to the search criteria (e.g., the item of interest, the sentiment, etc.) and retrieve these vectors from the vector storage 644. In the example of FIG. 6A, the retriever 642 identifies a subset 648 of vectors which are identified by comparing the search criteria to the vectors stored within the vector storage 644. For example, the search criteria may be converted into a vector and then compared to the vectors within the vector storage 644 to identify whether any matches exist.

As an example, the comparison may be performed based on a cosine similarity, or the like, within vector space. The cosine similarity may identify vectors that are pointed in the same direction (or roughly in the same direction). For example, referring to FIG. 6B, if a vector within the vector space 660 is pointing in a direction that is within a predetermined amount of degrees (e.g., +/−1 degrees) of the search criteria vector, it may be considered a match to the search criteria. FIG. 6B illustrates an example of a process 600B of the retriever 642 performing a comparison of the search criteria to the vectors in the vector space 660.

Referring to FIG. 6B, the attributes/search criteria may be identified as text values. The text values may be converted into a vector via execution of an LLM 650 or the like which embeds the text values into a vector 652. For example, the LLM 650 may be a transformer neural network with an encoder/decoder framework which can embed a block of text into a single vector. Here, the LLM 650 may convert a block of text, such as a sentence, phrase, combination of words, word, or the like, into a multi-dimensional vector. In this example, the vector 652 is pointing in a direction 654 within a vector space 660. The output of the LLM 650 may be transferred to the retriever 642. Next, the retriever 642 may compare the direction 654 of the vector 652 to the direction of other vectors from the vector storage 644 which are mapped into the vector space 660. For example, the retriever 642 may perform a cosine similarity analysis and identify a vector 662, a vector 664, and a vector 666 which are pointing in the same direction as the vector 652 (within the predetermined amount of degrees). As a result, the retriever 642 determines that the vector 662, the vector 664, and the vector 666 are each a match to the contextual attributes included in the search criteria.

Referring again to FIG. 6A, the retriever 642 may retrieve the vector 662, the vector 664, and the vector 666 from the vector storage 644 and forward the vectors to the LLM 646 for additional processing. Here, the LLM 646 may generate a response for the conversation between the source device 610 and the service provider device 620 and provide the response to the software application 632. Here, the software application 632 may output the response from the LLM 646 during a communication session between the source device 610 and the service provider device 620.

As an example, the retriever 642 may display the response on a user interface 612 of the source device 610, on a user interface 622 of the service provider device 620, or the like. In some embodiments, the LLM 646 may generate a first response for the source device 610 and a second response for the service provider device 620 which is different from the first response generated for the source device 610. Here, the software application 632 may output the different responses simultaneously, in sequence, or the like, to the source device 610 and the service provider device 620 during the active communication session.

FIG. 6C illustrates a process 600C of the retriever 642 generating a prompt 670 which includes the subset of vectors including the vector 662, the vector 664, and the vector 666. In addition, the prompt 670 includes the contextual attributes output by the LLM 634 and the LLM 635, and additional text 672 that may be predefined and may direct the LLM 646 to perform a specific task. For example, the additional text 672 may request the LLM 646 to "generate a product offer based on the item of interest and the user mood." In response, the LLM 646 may ingest the prompt 670 when generating the response(s) that is output during the active communication session between the source device 610 and the service provider device 620.

In some embodiments, a multi-layered LLM framework may be used to identify a plurality of contextual attributes of a conversation between a user of a source device and a service provider. As another example, the example embodiments may use a multi-head attention mechanism within a single LLM to identify a plurality of contextual attributes of a conversation at the same time (i.e., in parallel). The multi-head attention mechanism can reduce the number of executions of an LLM by identifying the plurality of contextual attributes during a single LLM execution while running parallelized attention heads.

In one embodiment, an apparatus comprising a memory and a processor coupled to the memory is configured to receive interaction content from a communication session between a source device and a service provider device of a service provider. Interaction content is transmitted between the user's device (the source device) and the service provider's device during a communication session between a user and a service provider. The communication content encompasses various forms of interaction, such as text-based chats or voice calls. Upon receiving the content, the processor identifies search criteria from the interaction content, including the user's location, products discussed, sentiment expressed, etc. Once the search criteria are identified, the processor retrieves a subset of vectors from a plurality of vectors stored in a vector database based on these criteria. The subset of vectors includes previous interaction content with the service provider, forming a personalized representation of the user's interaction history within the system. The processor executes a LLM on the subset of vectors obtained from the database and generates a response for the ongoing communication session. The response is outputted to at least one of the source and service provider devices during the communication session.

In one embodiment, an apparatus comprising a memory and a processor coupled to the memory is configured to generate a prompt that includes the subset of vectors and input the prompt to an LLM during its execution. Upon receiving interaction content from a communication session between a source device and a service provider device, the processor identifies specific search criteria from the content. The search criteria are the basis for selecting relevant vectors from a vector database and retrieving a subset of vectors comprising previous interaction content between the user and the service provider. The processor generates a prompt, including the subset of vectors, and inputs it to the LLM during its execution. Additionally, the processor may generate additional text based on the search criteria and add it as part of the prompt before inputting it to the LLM. The additional text further enhances the context provided to the LLM, improving the relevance and accuracy of the generated response. During the execution of the LLM, communication between the processor, memory, and the LLM occurs seamlessly, ensuring that the LLM has access to the necessary information to generate an appropriate response. The generated response is outputted to at least one of the source and service provider devices.

In one embodiment, an apparatus comprising a memory and a processor coupled to the memory is configured to generate a prompt that includes the subset of vectors and input the prompt to the LLM during its execution. The processor is configured to generate additional text based on the search criteria and add it as part of the prompt before inputting it to the LLM. Upon receiving interaction content from a communication session between a source device and a service provider device, the processor identifies specific search criteria from the content. The search criteria are then used to select relevant vectors from a vector database, retrieving a subset of vectors comprising previous interaction content between the user and the service provider. Following the retrieval of the subset of vectors, the processor generates a prompt that includes the subset of vectors. In addition to the subset of vectors, the processor generates additional text based on the identified search criteria, enriching the context provided to the LLM during its execution. The processor inputs the prompt, consisting of the subset of vectors and the additional text, to the LLM during its execution. The LLM executes the prompt to generate a response tailored to the conversation's specific context. The inclusion of the subset of vectors and additional text in the prompt aids the LLM in understanding the context of the communication session and generating a relevant and accurate response. The generated response is outputted to at least one of the source and service provider devices.

In one embodiment, an apparatus comprising a memory and a processor coupled to the memory is configured to convert search criteria into a search criteria vector and identify the subset of vectors based on comparing the search criteria vector and the plurality of vectors in vector space. Upon receiving interaction content from a communication session between a source device and a service provider device, the processor identifies specific search criteria from the content. The search criteria serve as the basis for selecting relevant vectors from a vector database, which comprises a plurality of vectors representing various aspects of previous interactions between users and the service provider. To convert the identified search criteria into a search criteria vector, the processor employs mathematical techniques to represent the search criteria in a vector format suitable for comparison with the vectors stored in the vector database. The conversion process ensures that the search criteria are represented in a manner consistent with the vectors in the database, facilitating effective comparison and retrieval of the subset of vectors. Once the search criteria vector is generated, the processor compares it with the plurality of vectors in vector space. The comparison identifies vectors in the database that closely match the search criteria vector, selecting a subset of vectors relevant to the current communication session. The processor retrieves the subset of vectors from the vector database, comprising previous interaction content between the user and the service provider. Following the retrieval of the vector subset, the processor executes a LLM on these vectors to generate a response for the ongoing communication session. The generated response is outputted to at least one of the source and service provider devices.

In one embodiment, an apparatus comprising a memory and a processor coupled to the memory is configured to identify contextual attributes of the communication session as the search criteria based on the execution of an additional LLM on the interaction content and retrieve the subset of vectors based on these contextual attributes. Interaction content is transmitted between the two parties during a communication session between a source device and a service provider device. The processor receives the interaction content, which employs an additional LLM to identify contextual attributes of the communication session. The additional LLM analyzes the interaction content to identify contextual attributes such as the topic of conversation, user preferences, sentiment, or any other relevant factors. Once the contextual attributes are identified, the processor utilizes them as search criteria for selecting relevant vectors from a vector database. These vectors represent various aspects of previous interactions between users and the service provider. The processor retrieves a subset of vectors from the vector database based on the identified contextual attributes. The subset comprises previous interaction content between the user and the service provider, forming a personalized representation of the user's interaction history within the system. The processor executes the primary LLM on this subset of vectors to generate a response for the ongoing communication session. The response generated by the LLM is tailored to the specific context of the conversation, enhancing its relevance and accuracy. The generated response is outputted to at least one of the source and service provider devices.

In one embodiment, an apparatus comprising a memory and a processor coupled to the memory is configured to identify contextual attributes of the communication session based on device data from the source device, including browsing history, a cookies file, and a profile, and identify the search criteria from the device data. Initially, during a communication session between a source device and a service provider device, device data from the source device is accessed by the processor. The device data includes browsing history, cookie files, and profile information, among other relevant data points. The processor analyzes the device data to identify contextual attributes of the communication session, extracting pertinent information from the browsing history, cookie files, and profile of the source device. Once the contextual attributes are identified, the processor utilizes them as search criteria for selecting relevant vectors from a vector database. The vectors represent various aspects of previous interactions between users and the service provider. The processor retrieves a subset of vectors from the vector database based on the identified contextual attributes derived from the device data. The subset comprises previous interaction content between the user and the service provider, forming a personalized representation of the user's interaction history within the system. The processor then executes the primary LLM on this subset of vectors to generate a response for the ongoing communication session. The response generated by the LLM is tailored to the specific context of the conversation, enhancing its relevance and accuracy. The generated response is outputted to at least one of the source and service provider devices.

In one embodiment, an apparatus comprising a memory and a processor coupled to the memory is configured to simultaneously perform the communication session and execute the LLM based on real-time interaction content from the communication session. Initially, interaction content is transmitted between the two parties in real time during a communication session between a source device and a service provider device. The processor and the memory simultaneously perform two essential functions: conducting the communication session and executing the LLM. This operation ensures the communication session progresses seamlessly while the LLM processes the real-time interaction content. The processor continuously receives and analyzes the interaction content as the communication session progresses. It identifies relevant contextual attributes and search criteria from the real-time interaction content. These attributes and criteria are the basis for selecting relevant vectors from a vector database, which comprises various aspects of previous interactions between users and the service provider. The processor retrieves a subset of vectors from the vector database based on the identified contextual attributes, forming a personalized representation of the user's interaction history. The processor then executes the LLM on the subset of vectors to generate a response for the ongoing communication session. The response generated by the LLM is tailored to the specific context of the conversation, enhancing its relevance and accuracy. The generated response is outputted to at least one of the source and service provider devices.

In one embodiment, the system consists of an automated investment advisory service. The system streamlines the investment process by leveraging advanced technologies to understand and cater to each investor's unique financial goals and risk preferences. Users engage with the system through various channels, such as a web platform, mobile application, or voice-enabled assistants. During the interaction, users provide information about their investment objectives, risk tolerance, time horizon, and other relevant financial preferences. The system analyzes the user's input and identifies contextual attributes from the communication session. These attributes encompass many factors, including the user's investment goals, risk appetite, financial constraints, market sentiments, and preferences for specific asset classes or investment strategies. Based on the identified contextual attributes, the system searches a vector database containing historical investment advice, market analyses, and performance data. The search retrieves a subset of vectors that closely match the user's unique context and requirements. These vectors serve as valuable insights and references for generating personalized investment recommendations. The retrieved subset of vectors is then fed into LLMs, which analyze the historical data and extract relevant patterns, trends, and insights related to investment strategies, asset allocations, risk management techniques, and market dynamics. Leveraging the insights from the LLM analysis, the system generates personalized investment recommendations tailored to the user's financial situation and objectives. These recommendations encompass asset allocation suggestions, portfolio diversification strategies, investment product recommendations, risk mitigation techniques, and long-term financial planning advice. The personalized investment recommendations are presented to the user through the chosen communication channel, be it a web interface, mobile app notification, email, or personalized report. The service offers additional features, including interactive visualization tools, scenario analysis, investment performance tracking, and periodic portfolio reviews to enhance user engagement and satisfaction.

In one embodiment, the system involves the development of an advanced customer support chatbot explicitly tailored for financial institutions. The chatbot is designed to engage with customers in real-time chat sessions to address their inquiries, resolve issues, and provide assistance with banking services. During the chat sessions, the chatbot employs natural language processing techniques to analyze the conversation and identify various contextual attributes, such as the nature of the customer's query, account history, recent transactions, and any previous interactions with the financial institution. Once identified, the contextual attributes serve as search criteria to retrieve relevant vectors from a comprehensive database containing past customer queries, banking transactions, and service resolutions. The database is populated with diverse historical data collected from previous customer interactions and engagements with the financial institution. After retrieving the subset of vectors relevant to the current conversation, the chatbot executes LLMs on the subset of vectors. The LLMs analyze the historical data to generate responses that are accurate and personalized to the individual customer's needs and circumstances. By leveraging the rich contextual information extracted from the conversation and historical data, the chatbot can provide tailored solutions, offer product recommendations, and address customer inquiries more effectively.

In one embodiment, the system entails the creation of a personalized financial planning platform. The system utilizes sophisticated algorithms and artificial intelligence to analyze a user's financial situation, including income, expenses, savings, debts, investment preferences, risk tolerance, and long-term financial goals. When users engage with the system, they provide input regarding their financial objectives, current financial status, and future aspirations. The system utilizes natural language processing techniques to analyze the inputs and identify relevant contextual attributes, such as the user's investment goals, risk appetite, and preferred investment strategies. The contextual attributes serve as search criteria to retrieve a subset of vectors from a comprehensive database containing historical financial plans, investment strategies, market analyses, and economic trends. The database is continually updated with real-time market data and curated financial insights to ensure the accuracy and relevance of the information. Once the subset of vectors is retrieved, the platform executes LLMs on this data to generate personalized financial plans and investment recommendations tailored to the user's specific circumstances and objectives. The system offers interactive features, including scenario analysis, goal tracking, and portfolio optimization, to empower users to make informed decisions and track their progress toward their financial goals.

In one embodiment, the system enhances security measures and prevents fraudulent activities by leveraging contextual attributes and historical data. The system operates in real-time, analyzing communication sessions between users and financial institutions during online transactions. Contextual attributes such as transaction history, user behavior patterns, device information, geographical location, and potential fraud indicators are identified during these sessions. These contextual attributes serve as search criteria to retrieve relevant vectors from a comprehensive database containing historical transaction data, known fraud patterns, and security measures. The database continuously updates new data and insights from past fraud incidents and security breaches. Once the subset of vectors relevant to the current transaction is retrieved, the fraud detection system executes LLMs on the subset. The LLMs analyze the historical data to generate responses that assess the transaction's risk level, identify potential fraudulent activities, and generate real-time alerts to flag suspicious transactions and implement appropriate security measures. These measures may include additional authentication steps, transaction monitoring, or temporary holds on suspicious transactions.

In one embodiment, the system optimizes the accuracy of credit risk assessments and minimizes default risks for financial institutions. The system engages with borrowers to gather relevant information and assess their creditworthiness during the loan application process. Contextual attributes such as credit history, income stability, employment status, loan purpose, and financial background are identified during these interactions. These contextual attributes serve as search criteria to retrieve relevant vectors from a comprehensive database containing historical credit assessments, risk profiles, lending histories, and repayment behaviors. The database includes data from past loan applications, repayment patterns, and credit performance metrics. Once the subset of vectors relevant to the current loan application is retrieved, the credit risk assessment tool executes LLMs on this subset. The LLMs analyze the historical data to generate responses that assess the credit risk level of the borrower and determine the likelihood of loan default. The credit risk assessment tool can generate personalized risk assessments and lending decisions by leveraging the rich contextual information extracted from the borrower's profile and historical data.

Figure 7A:
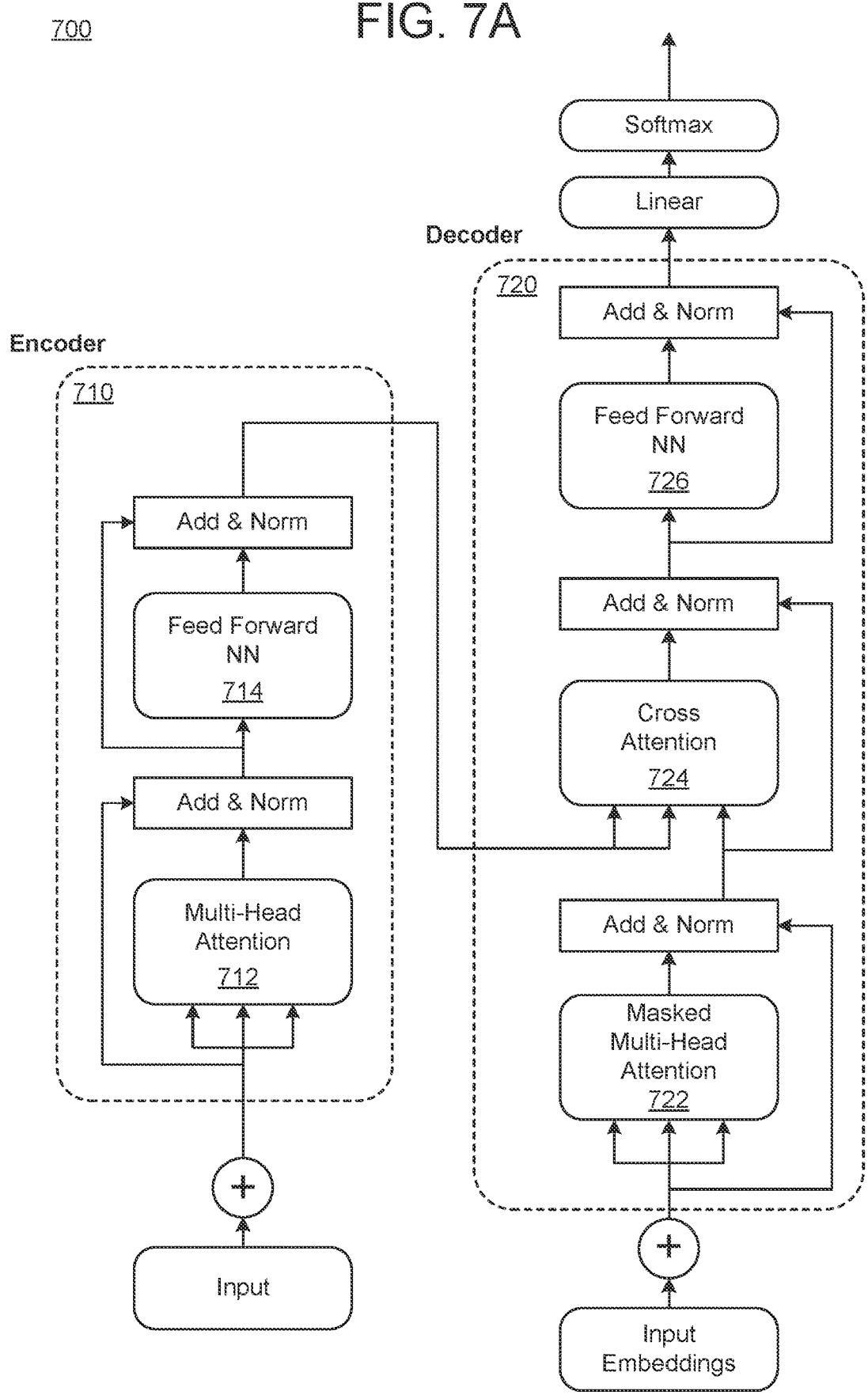
FIGS. 7A-7B are diagrams illustrating an example of a multi-head attention mechanism for a LLM according to example embodiments.
Figure 7B:
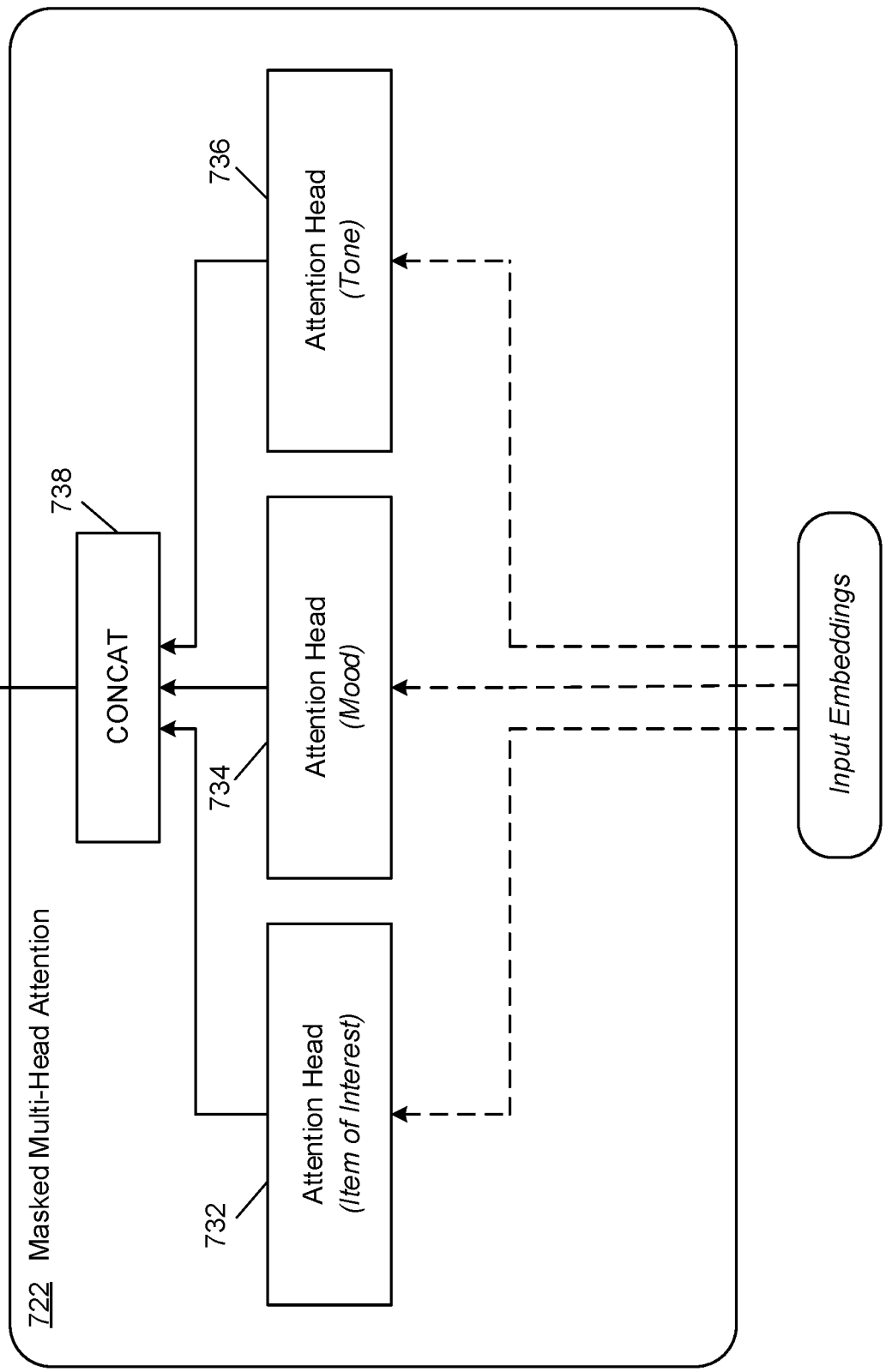

FIGS. 7A-7B illustrate an example of a multi-head attention mechanism for a LLM according to example embodiments. For example, the multi-head attention mechanism may be included within an LLM that is capable of simultaneously identifying a plurality of contextual attributes of a conversation. Here, each attention head may be associated with a contextual attribute. For example, a first attention head may be used to identify a first contextual attribute such as a mood of a user, and a second attention head may be used to identify a second contextual attribute such as an item of interest. The attention heads may use masking to mask different parts of the conversation being analyzed. Here, because the attention heads are interested in different contextual attributes, the masking process will be different for each. The attention heads may run in parallel/simultaneously during a single execution of the LLM thereby reducing the number of model executions necessary for identifying the contextual attributes in comparison to a framework that executes a plurality of LLMs on the same interaction content to identify a plurality of contextual attributes.

FIG. 7A illustrates an example of an architecture 700 of a transformer model with multiple attention heads according to example embodiments. The multiple attention heads may be used to evaluate multiple different contextual attributes such as mood of the user, tone of speech, customer interests (e.g., items of interest), customer needs, and the like. Referring to FIG. 7A, the transformer model includes an encoder 710 and a decoder 720. For example, the encoder 710 may convert input data (such as a block of text) into a format that is easier for the rest of the model to understand, such as a vector, number, etc. Here, each word in the input sequence is broken up into units (tokens) through tokenization. The tokens are transformed into vectors. The encoding process is referred to as input embedding. Meanwhile, the decoder 720 can convert the data generated by the rest of the model back into a format that is understandable to a human, such as a text-based description, sentence, or the like.

In this example, the encoder 710 receives a natural language input such as a previous interaction content between a user/source device and a service provider. The encoder 710 includes a multi-head attention module 712 and a feed forward neural network (NN) module 714, followed by a fully connected network. The encoder 710 also includes residual connections around the multi-head attention module 712 and the feed forward NN module 714. According to various embodiments, the multi-head attention module 712 may apply a self-attention mechanism that allows the model to associate words in the input embeddings to other words in the input embeddings. The multi-head attention module 712 may create different word associations for each attention head, resulting in identifying and/or masking different contextual attributes from the input embeddings. Meanwhile, the feed forward NN module 714 is trained to apply weights to the input sequence at token positions of the input sequence. The weights help the model capture feature representations, patterns, and relationships within the input data.

According to various embodiments, the multi-head attention module 712 enables the model to focus on the relevant parts of the input sequence when processing each token. This is achieved by calculating the attention weights between each token's query and key vectors in the sequence. The attention weights are then multiplied by the value vectors to obtain the context vector, which is the output of the attention layer. The output of the encoder 710 is input to the decoder 720. Here, the decoder 720 may augment the vectors to convey context. The vectors and/or input embeddings are fed into a masked multi-head attention module 722 which can learn from all of the previous words in the sentence. The encoder also includes modules that are around the multi-head attention module 712 and the feed forward NN module 714 and which provide residual connection and normalization.

According to various embodiments, the masked multi-head attention module 722 may run through an attention mechanism several times in parallel based on the contextual attributes associated with each of the heads. FIG. 7B illustrates a process 730 performed by the masked multi-head attention module 722 shown in FIG. 7A. Referring to FIG. 7B, the masked multi-head attention module has three attention heads, including an attention head 732 directed to an item of interest, an attention head 734 directed to a mood of a user, and an attention head 736 directed to a tone of speech of the user.

The input embeddings generated by the encoder 710 may be input to each of the different attention heads including the attention head 732, the attention head 734, and the attention head 736. In response, the attention head 732, the attention head 734, and the attention head 736 may run in parallel and/or in sequence and generate different outputs from the input embeddings by processing different parts of the input sequence using masking. In this example, the masking may mask out padding/irrelevant words that are unrelated to the particular contextual attribute. A concatenation module 738 takes the outputs from the different attention heads, concatenates them together, and sends the concatenated output to the next model.

Referring again to FIG. 7A, the masked multi-head attention module 722 may output to a cross-attention module 724 which is used to calculate attention weights between the encoder and decoder sequences. This gives the decoder 720 the ability to check the input embeddings input to the decoder 720 while generating the output, thereby ensuring the response makes sense. The output of the cross attention module 724 is input to a feed forward NN module 726 which transforms the data into a more suitable form for the task at hand. The data is then fed through a linear layer and a softmax layer to complete the predicted response. As is the case in the encoder 710, the decoder 720 includes modules that are around the masked multi-head attention module 722, the cross attention module 724, and the feed forward NN module 726 and which provide residual connection and normalization.

In one embodiment, an apparatus comprising a processor and a memory receives interaction content from a communication session between a source device and a service provider device. The interaction content includes text-based dialogue between a user and a service provider, such as a customer support representative or a chatbot. The processor then executes a LLM on the interaction content. The LLM is equipped with a plurality of attention heads configured to simultaneously identify a mood and an item of interest from the interaction content. The attention heads function as specialized modules within the neural network, each focusing on different aspects of the conversation. As the conversation unfolds, the processor feeds the interaction content into the LLM, and each attention head independently analyzes distinct contextual attributes, such as mood and item of interest. Once the analysis is complete, the processor generates a response to the interaction content based on the identified mood and item of interest. The response can include personalized recommendations, assistance, and information tailored to the user's mood and preferences. The processor outputs the response to at least one of the source devices and the service provider device during the ongoing communication session, allowing for seamless integration of the generated response into the conversation flow between the user and the service provider. Additionally, the apparatus can adapt to the evolving nature of the conversation by continuously analyzing and processing new interaction content as it becomes available during the communication session.

In one embodiment, an apparatus comprising a processor and a memory is responsible for executing a LLM with multiple attention heads. The model incorporates an attention head explicitly associated with the mood aspect of the interaction content. As the interaction content is received from the communication session between the source device and the service provider device, this dedicated attention head focuses on identifying and analyzing the mood expressed by the user. The processor is configured to mask content included in the interaction content that is unrelated to the mood based on the output of this attention head, ensuring that only the relevant parts of the interaction content about the user's mood are considered during the subsequent analysis and response generation stages. The apparatus continues to leverage the capabilities of the remaining attention heads to analyze other aspects of the interaction content, such as identifying items of interest or detecting shifts in tone. This parallelized processing enables a comprehensive understanding of the conversation context while focusing on the user's mood. Consequently, the generated response is not only based on the identified mood but also considers other relevant contextual factors, resulting in a more nuanced and tailored interaction experience for the user.

In one embodiment, an apparatus includes functionality to analyze the tone of the interaction content, thereby further enhancing the understanding of the user's communication. The processor, coupled with memory and responsible for executing the LLM with multiple attention heads, incorporates an attention head dedicated explicitly to assessing the tone of the interaction content. As interaction content is received from the ongoing communication session between the source device and the service provider device, this specialized attention head focuses on parsing and analyzing the text to identify the emotional or tonal attributes expressed by the user. Simultaneously, the processor is configured to mask content included in the interaction content, which is unrelated to the identified tone based on the output of this attention head. This masking operation ensures that only the relevant parts of the interaction content about the identified tone are considered during subsequent processing stages, enhancing the accuracy and depth of understanding of the user's emotional state or communication style. While the attention head associated with tone assessment is active, the other attention heads continue their parallelized analysis of the interaction content, focusing on aspects such as mood or item identification. The parallel processing allows for a comprehensive understanding of the conversation context while targeting tone assessment. Consequently, the generated response considers not only the user's mood and identified items of interest, as described in previous claims, but also the user's emotional nuances or communication style.

In one embodiment, an apparatus includes functionality to incorporate previous interaction content into the analysis process, thereby enabling a historical perspective on the user's interactions. The processor, which is coupled to a memory and responsible for executing the LLM with multiple attention heads, is configured to receive not only the interaction content from the ongoing communication session between the source device and the service provider device but also previous interaction content from one or more previous communication sessions. Upon receiving the previous interaction content, the processor aggregates it with the current interaction content to generate aggregated interaction content. The aggregated content provides a broader context by incorporating historical interactions and user preferences. The processor then executes the LLM with multiple attention heads on the aggregated interaction content, leveraging the capabilities of each attention head to analyze different aspects of the conversation, including mood, item identification, and tone assessment. The processor is configured to identify an aggregated mood over time concerning the item of interest based on the execution of the LLM with the plurality of attention heads on the aggregated interaction content. This analysis allows the apparatus to discern patterns and trends in the user's mood and preferences over multiple interactions, providing valuable insights for generating more personalized and relevant responses. Throughout the process, the apparatus maintains a parallelized analysis of the interaction content, with each attention head focusing on its assigned attribute while collaborating with others to ensure a comprehensive understanding of the conversation context.

In one embodiment, an apparatus tracks and analyzes the user's aggregated mood over time concerning the item of interest. The processor, coupled with memory and responsible for executing the LLM with multiple attention heads, aggregates previous interaction content from one or more previous communication sessions with the current interaction content to generate aggregated interaction content. Once the aggregated interaction content is generated, the processor executes the LLM with multiple attention heads on the data, including an attention head specifically dedicated to identifying the aggregated mood concerning the item of interest over time. Through parallelized analysis, each attention head independently extracts relevant information from the interaction content, with the aggregated mood attention head focusing on discerning patterns and trends in the user's mood over multiple interactions related to the item of interest. Additionally, the processor is configured to generate the response based on the identified aggregated mood concerning the item of interest over time.

This response considers the user's current mood and preferences, as analyzed from the ongoing communication session, and the historical mood trends related to the item of interest. Incorporating this longitudinal perspective, the apparatus can tailor its responses more effectively to align with the user's evolving preferences and mood variations, leading to more personalized and engaging interactions. Throughout the process, the apparatus maintains a synchronized analysis of current and historical interaction content, ensuring continuity and coherence in understanding the user's preferences and mood dynamics.

In one embodiment, an apparatus includes functionality to facilitate continuous improvement and refinement of the apparatus's performance based on feedback received during communication sessions. The processor, coupled with memory and responsible for executing the LLM with multiple attention heads, is configured to receive feedback about the response generated during the communication session from one or more source devices and the service provider device. Upon receiving feedback, the processor leverages the feedback to retrain the LLM based on a combination of the response and the feedback about the response. The retraining process allows the apparatus to adapt and refine its response generation capabilities over time, improving the relevance and effectiveness of the generated responses in subsequent communication sessions. Furthermore, the processor utilizes the feedback to update the attention weight parameters within the LLM, optimizing its performance based on the specific needs and preferences of the users. By incorporating feedback-driven retraining into its operation, the apparatus enhances its ability to learn from user interactions and adjust its response generation strategies accordingly, leading to more personalized and satisfying user experiences. The apparatus maintains seamless communication with both the source device and the service provider device, ensuring timely receipt and integration of feedback into its learning mechanism, continuously iterating, and refining its response generation capabilities based on user feedback.

In one embodiment, the system assesses the creditworthiness of a loan applicant. An applicant engages in communication sessions with the system through various channels such as phone calls, online chats, or mobile applications. During the sessions, the applicant discusses their financial needs, background information, loan requirements, and other relevant details. The system uses one or more LLMs with multiple attention heads to analyze the interaction content and extract valuable insights. Specifically, they identify the applicant's mood, financial circumstances, items of interest (such as loan terms or repayment plans), and any concerns or questions raised during the discussion. Based on the analysis of the interaction content, combined with other data sources such as credit reports, income statements, and employment history, the system generates a comprehensive credit assessment for the applicant. This assessment includes a risk profile, credit score, and recommendations regarding the feasibility of the loan request. The system also provides personalized financial guidance to the applicant, including suggestions for improving credit scores, optimizing debt-to-income ratios, or addressing any red flags identified during the assessment process. The credit assessment generated by the system serves as a decision-support tool for loan officers and underwriters. It helps them make informed decisions regarding loan approvals, interest rates, and terms and conditions based on a holistic understanding of each applicant's financial situation and creditworthiness. The system continuously learns and adapts based on feedback and outcomes. It monitors the performance of approved loans, tracks repayment behaviors, and incorporates this data into its algorithms to refine future credit assessments and improve predictive accuracy.

In one embodiment, the instant solution introduces a virtual financial wellness coach. Users engage in communication sessions with the system through intuitive interfaces, such as chatbots or voice assistants, discussing various aspects of their financial well-being, including budgeting, saving, investing, and debt management. LLMs with multiple attention heads analyze the interaction content in real time, identifying the user's mood, financial priorities, and items of interest. For instance, during a conversation session, the system can recognize if a user expresses concerns about debt repayment, interest in investment opportunities, or seeks advice on creating a savings plan for a specific goal. Leveraging the insight, the system provides personalized guidance, educational resources, and actionable steps to improve the user's financial well-being, fostering long-term financial health and stability. The system delivers personalized financial advice based on the user's unique circumstances, preferences, and goals. Whether users want to reduce debt, build savings, or invest for the future, the coach offers tailored strategies and actionable steps to help them achieve their objectives. Users can set financial goals, such as saving for a down payment, paying off credit card debt, or planning for retirement, and track their progress over time. The system provides guidance on goal setting, budgeting strategies, and milestone achievements to keep users motivated and on track toward financial success.

In one embodiment, the instant solution employs behavioral biometrics authentication as a security measure. The system analyzes various behavioral biometrics, including voice modulation, typing patterns, navigation gestures, and linguistic styles exhibited by users during communication sessions. Through continuous monitoring, the system establishes baseline behavioral profiles for individual users, encompassing typical communication patterns and interactions. Using LLMs with multiple attention heads, the system scrutinizes interaction content to identify deviations from established behavioral norms or suspicious linguistic cues. For instance, abrupt changes in tone, unusual speech patterns, or unfamiliar topics may trigger alerts indicative of potential security threats or fraudulent activities. By integrating contextual understanding capabilities, the system contextualizes behavioral biometrics within the broader context of users' interactions and transactional activities. This contextual awareness enables the system to distinguish between legitimate user behaviors and malicious activities, such as social engineering attacks or account takeover attempts. Upon detecting anomalies or suspicious behaviors, the system initiates real-time response mechanisms, such as additional authentication challenges, transaction verification prompts, or account lockdown procedures. These proactive measures help mitigate security risks and prevent unauthorized access to sensitive financial information or assets. The system employs machine learning algorithms to adapt and refine its behavioral biometrics models over time based on evolving user behaviors and emerging security threats. By continuously learning from user interactions and security incidents, the system enhances its accuracy and effectiveness in detecting and mitigating fraudulent activities. Despite the stringent security measures, the system prioritizes user experience by minimizing friction during authentication processes. Seamless integration with existing banking applications or financial platforms ensures users can authenticate themselves effortlessly while enjoying a seamless and intuitive user experience.

In one embodiment, the system introduces an emotionally intelligent chatbot designed for financial counseling purposes. Using advanced natural language processing (NLP) techniques and sentiment analysis algorithms, the chatbot accurately discerns users' emotional states and mood indicators during communication sessions. The chatbot can detect emotions such as stress, anxiety, optimism, or frustration by analyzing linguistic cues, tone of voice, and contextual information. Leveraging its understanding of users' emotions, the chatbot delivers empathetic and supportive responses tailored to users' emotional needs. The chatbot provides personalized financial guidance and advice based on users' emotional states, financial goals, and life circumstances. Whether users are navigating debt management, budgeting strategies, investment decisions, or retirement planning, the chatbot offers tailored recommendations and actionable insights aligned with users' emotional well-being and financial objectives. Additionally, the chatbot serves as a behavioral coach, helping users develop positive financial habits and attitudes. By reinforcing desirable behaviors, encouraging goal-setting, and providing motivational support, the chatbot empowers users to take control of their financial lives and make informed decisions that align with their long-term goals. The chatbot facilitates interactive learning experiences through quizzes, educational content, and interactive exercises designed to enhance users' financial literacy and skills. The chatbot leverages machine learning algorithms to continuously improve its understanding of users' emotional states, preferences, and conversational patterns. By learning from user interactions, feedback, and real-world experiences, the chatbot adapts and evolves its responses to better meet users' needs and deliver more effective support and guidance.

In one embodiment, the system employs sentiment analysis algorithms to analyze customers' communication content, including text messages, emails, social media interactions, and phone calls. By understanding customers' emotional tone, attitudes, and sentiments, the platform categorizes interactions into positive, neutral, or negative sentiment categories. Leveraging LLMs with multiple attention heads, the system dynamically adjusts its real-time engagement strategies based on customers' sentiments and preferences. For instance, during a conversation session with a customer, the system analyzes the sentiment of the interaction and tailors its responses, offers, or recommendations accordingly to align with the customer's emotional state and needs. Drawing insights from sentiment analysis and contextual understanding, the system delivers personalized product recommendations, promotional offers, and service suggestions tailored to customers' preferences and sentiments. By recommending relevant solutions and offerings, the system enhances the customer experience and drives engagement and satisfaction. The system identifies and addresses customer concerns, issues, or complaints based on sentiment analysis. For instance, if a customer expresses dissatisfaction or frustration during an interaction, the platform escalates the issue to a customer support representative for immediate assistance, ensuring prompt resolution and mitigating potential escalations. The system monitors customers' sentiments and engagement levels over time, identifying at-risk customers or those showing signs of disengagement. Through targeted outreach initiatives, such as personalized offers, loyalty rewards, or proactive follow-ups, the system aims to re-engage customers, strengthen relationships, and prevent churn. The system integrates with various communication channels, including mobile apps, websites, email, SMS, social media platforms, and contact centers.

One of the current limitations of contact center representatives, chatbots, and the like, is their inability to access a user's history with a company's products or services. Without this context, a contact center representative may struggle to understand the user's needs or provide personalized assistance. The representative may repeat information previously conveyed to the user, causing frustration. However, having access to the communication contents of a user's historical interactions is only one piece of the solution, as the service provider must still interpret and utilize the data. In the example embodiments, an LLM can combine historical content with a current communication session to gain a holistic overview of a user's context on a given topic. The LLM can analyze past conversations and transactions to gain a deeper understanding of the user's current query or issue and predict future needs or preferences.

For example, based on past transaction patterns, the LLM can proactively suggest relevant products or services of the service provider that the user might be interested in and align with the user's goals. The LLM can also identify recurring issues and offer proactive solutions. This instant solution retrieves vectors from a vector database for previous communication content between a user and a service provider. Next, the solution executes an LLM on the vectors to identify an item of interest to the user not previously discussed by the service provider and generate content about the item of interest for the user. Finally, the solution outputs the content about the item of interest to the user during a communication session between the user and the service provider.

Figure 8B:
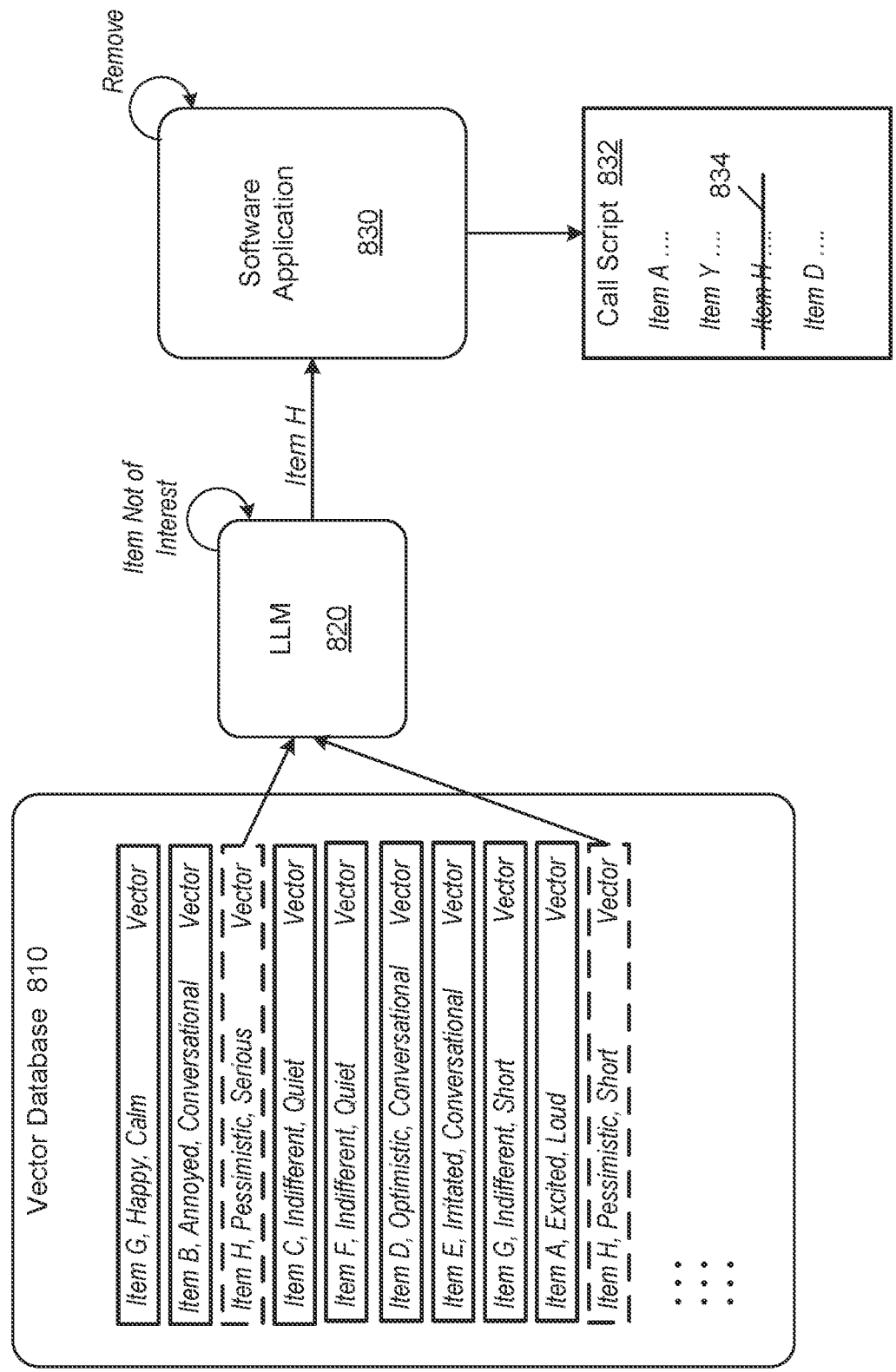
Figure 8C:
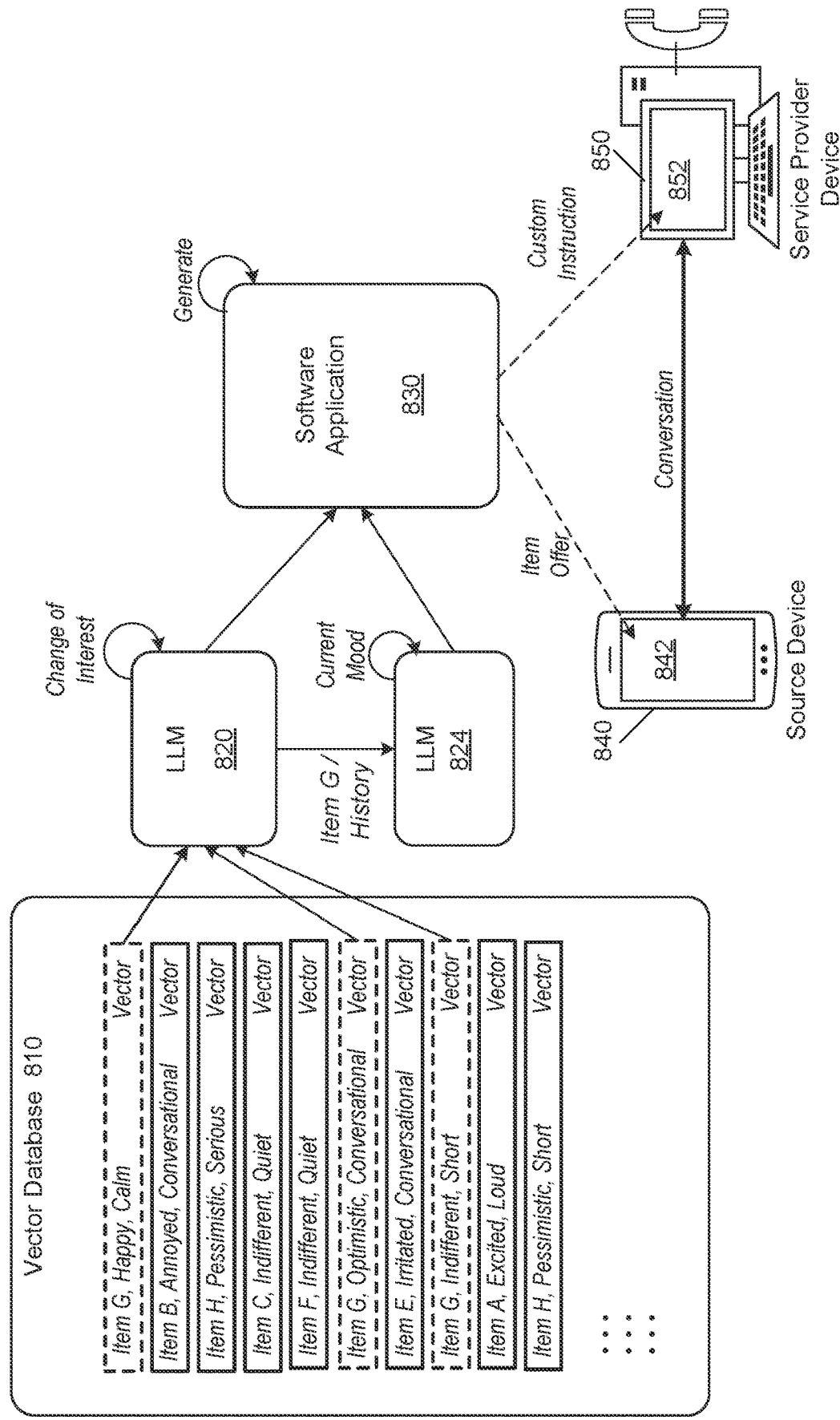

FIGS. 8A-8C illustrates a process of identifying items of interest from previous conversations and using the items of interest to modify future conversations according to example embodiments. For example, FIG. 8A illustrates a process 800A of identifying an item of interest to a user which a service provider has failed to discuss with the user and generating content about the item of interest which is output during a communication session between the user and a service provider. Referring to FIG. 8A, a user's historical communications/contact with a service provider, such as calls, chats, and the like, may be converted into vector form and stored within a vector database 810. Each vector may represent a previous conversation of the user with respect to the service provider.

According to various embodiments, one or more LLMs may be executed on the vectors within the vector database 810 to identify any items of interest that have raised a question, concern, query, or the like, from the user, but which were never addressed by the service provider. For example, a contact center representative may be discussing a product offering to the user, and the user may mention, albeit briefly, an interest in a separate product that the contact center representative does not pick up on, or which gets forgotten about. Furthermore, analysis of subsequent conversations between the service provider and the user may reveal that the separate product was never mentioned again. The system may use an aggregated conversation history between the user and the service provider to have a fuller understanding of what has transpired and what has been missed/forgotten.

In the example of FIG. 8A, an LLM 820 may retrieve vectors from the vector database 810 using the mechanisms described herein and identify items of interest. Here, the LLM 820 may include a multi-head attention mechanism such as described with respect to FIGS. 7A and 7B, but embodiments are not limited thereto, which are capable of identifying contextual attributes from the previous conversations. The vectors may represent an aggregated conversation history between the user and the service provider. The LLM 820 may also ingest transaction history data from a transaction history database 822. The transaction history data may include financial transactions (or other transactions) of the user with respect to the service provider. Transactions may include payments, sales, investments, loans, and the like. The history may include history over time, thereby providing insight into the purchases, interests, preferences, and the like of the user.

According to various embodiments, the LLM 820 may ingest an aggregated conversation history about all items of interest, as shown in FIG. 8A, and detect an item of interest that is of interest to the user, but which has not been discussed with the user by the service provider from the aggregated conversation history. For example, the LLM 820 may identify a phrase, context, sentences, text, etc. that was mentioned by the user about a particular item of interest, for example, "item X". Here, the LLM 820 may also identify a mood of the user, a sentiment of the user, a tone of the user, or the like, when the user mentions the item of interest. A happy mood may indicate strong interest in such an item. However, a review of the aggregated conversation history may not reveal any discussions by the service provider about "item X". As another example, the LLM 820 may identify a need for "item X" from the transaction history of the user. As an example, "item X" may correspond to a checking account that can save the user in fees and other penalties based on how the user transacts.

According to various embodiments, the LLM 820 may generate content that can be output during an active communication session between a source device 840 of the user and a service provider device 850 of the service provider which is hosted by a software application 830. The analysis by the LLM 820 may be performed in advance and added to a call script or the like, where it can be accessed by a service provider representative during a subsequent communication session via the software application 830. As another example, the analysis by the LLM 820 may be performed in real-time, in response to the communication session happening in real-time between the source device 840 and the service provider device 850.

For example, the LLM 820 may identify an item of interest and notify the software application 830 to generate an item offer for a new product, such as a new credit card, a new checking account, a new loan offer, or the like, and output content on a user interface 842 of the source device 840. Here the software application 830 may generate a clickable link which when clicked automatically registers the source device 840 with a service corresponding to the item of interest and output the clickable link on the user interface 842 of the source device 840 during the active communication session. Thus, the item offer can be displayed on a display screen of the source device 840 while the source device 840 is being used by the user to conduct a call or chat with the service provider device 850. As another example, the software application 830 may generate a custom instruction for discussion during the active communication session and output a display of the custom instruction via a user interface 852 of the service provider device 850. The custom instruction may include specific details about the item of interest which may provide necessary information to the user about the item enabling the user to take steps to register for the item, obtain the item, download the item, and the like.

FIG. 8B illustrates a process 800B of detecting an item that is not of interest to the user of the source device 840 from the aggregated conversation history of the user which is stored in the vector database 810. In this example, the LLM 820 may ingest an aggregated conversation history of the user and identify an item that the user has not shown interest from the utterances of the user in the previous conversations, chat messages, and the like. As an example, the user may indicate that the product is not of interest at a first point in time and continue to show that same lack of interest at a subsequent time or times. As another example, the user may decline to be provided information about a current product. As another example, the user may raise their voice (tone) and show a lack of interest at the same time. Here, the user may also include a pessimistic mood, an indifferent mood, or the like.

In FIG. 8B, the LLM 820 detects that an "item H" is not of interest to the user based on multiple conversations that mention "item H" and which the user shows both a lack of interest and a pessimistic or indifferent mood. The LLM 820 may provide an identifier of "item H" to the software application 830. In response, the software application 830 may identify one or more call scripts that are prepared for the user for a future conversation with the user and delete any content about "item H" from such call scripts. For example, the software application 830 may delete content 834 from a call script 832 which is going to be discussed with the user in a future call between the service provider/contact center representative and the user. The software application 830 may not delete any other content from the call script 832 other than the content about the particular item that is not of interest. Thus, the future conversations with the user can be improved through the use of this analysis.

FIG. 8C illustrates a process 800C identifying an item which the user has a changed interest over time and generating content about the item based on the change in interest. Referring to FIG. 8C, the LLM 820 may identify an aggregate of vectors about an item such as "item G". The LLM 820 may detect a "change" in interest with respect to the item that happens over time based on the contextual attributes within the vectors. Here, the user has changed their mind with respect to "item G". The LLM 820 may provide the vectors associated therewith to a second LLM 824, which can determine a current mood of the user with respect to "item G". However, a second LLM 824 is not the only example. As another example, the LLM 820 may use a different attention head to identify the current mood.

Here, the second LLM 824 ingests the aggregated conversation history and determines how the user's mood has changed over time with respect to "item G". In this case, the second LLM 824 determines that the user has changed their opinion over time from a lack of interest to having some interest. In this example, the second LLM 824 may provide an indication of the change in mood to the software application 830. In response, the software application 830 may generate content about the item and display the content on the user interface 842 of the source device 840, on the user interface 852 of the service provider device 850, or the like, during an active communication session between the source device 840 and the service provider device 850.

The change in interest by the user may be identifiable from the contextual attributes that are stored within the vectors of the vector database 810. As the user's mood changes over time, the system can identify such changes and find an ideal time to make a recommendation about the item to the user. For example, the recommendation may come when the user's most recent conversation showed a favorable mood to the item, etc.

In one embodiment, an apparatus encompasses a memory component and a processor component coupled to the memory. The processor retrieves vectors from a designated vector database. The vectors represent historical communication content exchanged between a source device and a service provider device, serving as a repository of past interactions. The processor employs a LLM to analyze the vectors and identify an item of interest that has yet to be previously discussed in the historical communication content. This identification process is crucial for understanding the user's current needs or preferences, as it allows the system to discern topics that may be relevant but have not yet been addressed. Upon identifying the item of interest, the processor generates tailored content, leveraging the insights gained from the historical communication data. Finally, the generated content is outputted to at least one of the source devices and the service provider device during an active communication session between them, ensuring that the user receives relevant information precisely when needed and enhancing the effectiveness of the communication process.

In one embodiment, an apparatus incorporates additional features related to mood analysis and content generation. The apparatus comprises a memory component and a processor component coupled to the memory. The apparatus is further configured to determine a historical mood with respect to the identified item of interest. The determination is based on the execution of a second LLM on the vectors retrieved from the vector database. The system gains deeper insights into the user's preferences and sentiments regarding specific products or services by analyzing the historical mood associated with the item of interest. Subsequently, the processor generates content about the item of interest based on this historical mood analysis. The process ensures that the information presented to the user during the active communication session aligns with their current query and with their past sentiments and preferences. By considering the content of past interactions and the associated mood, the apparatus enables more nuanced and personalized communication between users and service providers in real-time.

In one embodiment, an apparatus identifies items of interest based on user queries that remain unanswered by the service provider device. The apparatus comprises a memory component and a processor component coupled to the memory. The processor is configured to identify items of interest based on one or more queries from the source device, which are included in the previous communication content but were not addressed by the service provider device. This enables the system to recognize topics or questions raised by the user that may require further attention or clarification. By leveraging the capabilities of a LLM, the processor analyzes these unanswered queries to identify potential items of interest that have not been discussed during the ongoing communication session. This ensures the system can address user inquiries comprehensively and in real-time, minimizing overlooked or unresolved issues.

In one embodiment, an apparatus optimizes future communication sessions based on insights gained from ongoing interactions. The apparatus comprises a memory component and a processor component coupled to the memory. The processor is further configured to identify a mood with respect to a different item of interest based on the execution of a LLM on interaction content from the active communication session. The mood analysis allows the system to dynamically adjust communication scripts or guidelines for future interactions with the source device. By recognizing the user's mood or sentiment during the current communication session, the processor can identify items of interest that may not be suitable for discussion in future sessions. Subsequently, the processor removes these different items of interest from call scripts or communication guidelines, ensuring that the service provider device avoids topics or products that may elicit negative reactions from the user. This proactive approach enhances the system's ability to tailor communication strategies to align with the user's preferences and mood, ultimately improving user satisfaction and engagement. By integrating mood analysis into the identification process, the apparatus enhances its effectiveness in facilitating productive and positive interactions between users and service providers.

In one embodiment, an apparatus enhances user engagement and facilitates seamless access to relevant services or information. The apparatus comprises a memory component and a processor component coupled to the memory. The processor is further configured to generate a user interface with a clickable link during an active communication session between the source device and the service provider device. The user interface facilitates direct registration of the source device with a service corresponding to the identified item of interest. Through clickable links incorporated into the user interface, the system streamlines the process of accessing relevant services or information, reducing user effort, and enhancing the overall user experience. The processor outputs the user interface on a display screen of the source device, ensuring that the user can easily interact with and act upon the provided information in real-time, improving user engagement and facilitating efficient access to desired services or products during the communication session.

In one embodiment, an apparatus enhances communication between users and service providers through customized instructions. The apparatus comprises a memory component and a processor component coupled to the memory. The processor is further configured to generate a custom instruction for discussion during an active communication session and output a display of the custom instruction via a user interface of the service provider device. The custom instruction is tailored to the specific needs or preferences of the user and guides the communication process towards more effective and satisfactory outcomes. By outputting the instructions via the user interface of the service provider device, the system facilitates seamless integration of the instructions into the ongoing communication session, ensuring that service providers have clear guidance on how to interact with the user.

In one embodiment, an apparatus leverages transaction history data to enhance user interactions. The apparatus comprises a memory component and a processor component coupled to the memory. The processor is further configured to retrieve a transaction history associated with the source device from a data store. The transaction history represents past interactions and transactions between the user and the service provider, providing valuable insights into the user's preferences and behavior. By retrieving this transaction history, the system can identify items of interest based on the execution of a LLM on the transaction history associated with the source device. The analysis enables the system to understand the user's past interactions with the service provider and tailor its responses accordingly. Additionally, by incorporating transaction history data into the identification process, the system can provide more personalized recommendations and solutions to the user's queries or concerns, improving the efficiency of the communication process by anticipating the user's needs and preferences.

In one embodiment, the system utilizes social media platforms as a source of valuable insights into users' financial needs and interests. The system uses tools to gather data from platforms like Twitter, Facebook, and LinkedIn. These tools are programmed to retrieve vectors representing previous communication content between users and financial service providers, including mentions, comments, direct messages, and interactions with relevant posts or ads. Once the vectors are collected, they are processed by a sophisticated LLM, trained to analyze text data, and extract meaningful insights. The LLM is specifically tasked with identifying topics related to financial products, services, or general financial discussions that users have engaged in on social media but may have yet to address directly with the financial services firm. The LLM analyzes the vectors to detect patterns, keywords, sentiments, and contextual cues that indicate users' interests, preferences, or needs regarding financial matters. For example, it may identify conversations where users' express concerns about retirement planning, interest in investing in specific asset classes, or discussions about saving for major life events like buying a house or starting a family. Based on the insights gathered from the LLM analysis, the system generates personalized content tailored to each user's identified financial interests or needs. This content includes targeted advertisements, sponsored posts, informative articles, or promotional offers related to the firm's relevant financial products or services. During users' active sessions on social media platforms, they are presented with personalized content in their newsfeeds, timelines, or as sponsored recommendations. For instance, a user discussing interest in sustainable investing may see sponsored posts from the financial services firm promoting its socially responsible investment options.

In one embodiment, the system integrates voice assistant technology into its mobile banking app or website. The system utilizes voice assistant technology to understand and respond to users' voice commands or text inputs related to banking activities. Users can initiate interactions with the voice assistant by activating a voice command or tapping a designated button within the bank's app or website. Once engaged, the voice assistant retrieves vectors representing previous communication content between users and the bank, including call transcripts, chat logs, transaction histories, and support ticket details. These vectors serve as valuable data sources for understanding users' banking behaviors, preferences, and needs. The retrieved vectors are processed by a sophisticated LLM integrated into the voice assistant system. The LLM is trained to analyze text data and extract relevant information, such as users' inquiries, requests, or concerns regarding their accounts, transactions, products, or services the bank offers. Using natural language understanding capabilities, the voice assistant interprets users' queries and contextually relevant information from the vectors to provide accurate and personalized responses or actions. For example, a user may ask the voice assistant to check their account balance, transfer funds between accounts, pay bills or inquire about loan options. Based on the LLM analysis of the retrieved vectors, the voice assistant can also anticipate users' needs or preferences and proactively offer relevant banking recommendations, such as suggesting suitable savings accounts, credit cards, investment opportunities, or financial management tips. During active sessions on the bank's app or website, users interact with the voice assistant to perform various banking tasks, receive real-time account updates, or obtain personalized financial advice. For instance, a user may ask the voice assistant for budgeting tips, and it may respond with tailored recommendations based on the user's spending patterns and financial goals.

In one embodiment, the system leverages email marketing campaigns to engage with users and provide them with personalized investment recommendations. The investment platform collaborates with marketing analytics companies or utilizes its data analytics tools to gather and analyze communication vectors representing users' previous interactions with the platform. These vectors include email exchanges, engagement metrics (e.g., open rates, click-through rates), user feedback, and transaction histories. Once the communication vectors are collected, they are processed by a sophisticated LLM integrated into the email marketing automation system. The LLM is trained to analyze text data and extract meaningful insights, such as users' investment preferences, risk tolerance levels, financial goals, and past engagement patterns with email content. Using natural language processing capabilities, the LLM interprets users' communication history to identify recurring themes, topics of interest, and contextual cues that indicate users' investment needs or preferences. For example, it may detect discussions about retirement planning, interest in specific asset classes (e.g., stocks, bonds, real estate), or inquiries about investment strategies. Based on the analysis of communication vectors by the LLM, the system generates personalized email content tailored to each user's investment profile and preferences. This content may include targeted investment recommendations, educational articles, market insights, or promotional offers related to the platform's relevant investment products or services. During users' active email sessions, they receive these personalized email communications from the system, designed to capture their attention, provide valuable insights, and encourage further engagement with the platform's investment offerings. For instance, a user who has previously shown interest in sustainable investing may receive emails highlighting environmentally friendly investment opportunities.

In one embodiment, the system uses an in-app chatbot to assist users with insurance-related inquiries and policy management tasks. The chatbot can understand natural language inputs and respond to users' queries conversationally. The chatbot is integrated directly into the company's mobile app, accessible through a designated chat interface. Upon activation, the chatbot retrieves communication vectors representing users' previous interactions, including chat transcripts, support ticket histories, policy details, and claims information. These vectors serve as valuable data sources for understanding users' insurance needs, preferences, and past inquiries. The retrieved communication vectors are processed by a sophisticated LLM embedded within the chatbot system. The LLM is trained to analyze text data and extract relevant insights, such as users' insurance coverage, policy details, claim status, and questions or concerns expressed in previous interactions. Using natural language understanding capabilities, the chatbot interprets users' inquiries and contextual information from the communication vectors to provide accurate and personalized responses or assistance. For example, a user may inquire about policy coverage for a specific type of damage, report a claim, or request information about premium payments. Based on the analysis of communication vectors by the LLM, the chatbot can anticipate users' needs and proactively offer relevant insurance advice, guidance, or recommendations. For instance, it may suggest additional coverage options based on the user's current policy, provide tips for filing claims efficiently, or offer assistance with policy renewal. During users' active sessions within the system, they can engage with the chatbot to obtain instant support, receive answers to their questions, or complete insurance-related tasks seamlessly. For example, a user may chat with the bot to update their contact information, request a quote for a new policy, or inquire about discounts or special offers.

In one embodiment, the system integrates a virtual assistant to provide personalized financial advice and portfolio management assistance. The virtual assistant understands natural language inputs and can respond to real-time client queries. The virtual assistant is seamlessly integrated into the firm's client portal, accessible to clients through voice commands or text inputs. Upon activation, the virtual assistant retrieves communication vectors representing clients' previous interactions with the system, including meeting transcripts, email exchanges, notes from financial advisors, investment histories, and portfolio performance data. These vectors serve as rich sources of information for understanding clients' financial goals, risk tolerance levels, investment preferences, and past discussions. The retrieved communication vectors are processed by a LLM embedded within the virtual assistant system. The LLM is trained to analyze text data and extract relevant insights, such as clients' financial objectives, investment strategies, asset allocations, and concerns expressed in previous interactions. The virtual assistant interprets clients' inquiries and contextual information from the communication vectors using advanced natural language processing capabilities to provide tailored and actionable responses or recommendations. For example, a client may inquire about investment opportunities, request performance updates for their portfolio, or seek guidance on retirement planning. Based on the analysis of communication vectors by the LLM, the virtual assistant can anticipate clients' needs and proactively offer personalized financial advice, investment strategies, or portfolio adjustments. For instance, it may suggest diversification strategies, tax-efficient investment options, or wealth preservation techniques based on the client's financial profile and objectives. During clients' active sessions with the system, they can engage with the virtual assistant to receive timely support, obtain investment insights, or execute financial transactions seamlessly. For example, a client may ask the virtual assistant to rebalance their portfolio, set up automated contributions to their investment accounts, or request educational resources on financial planning topics.

Figure 9A:
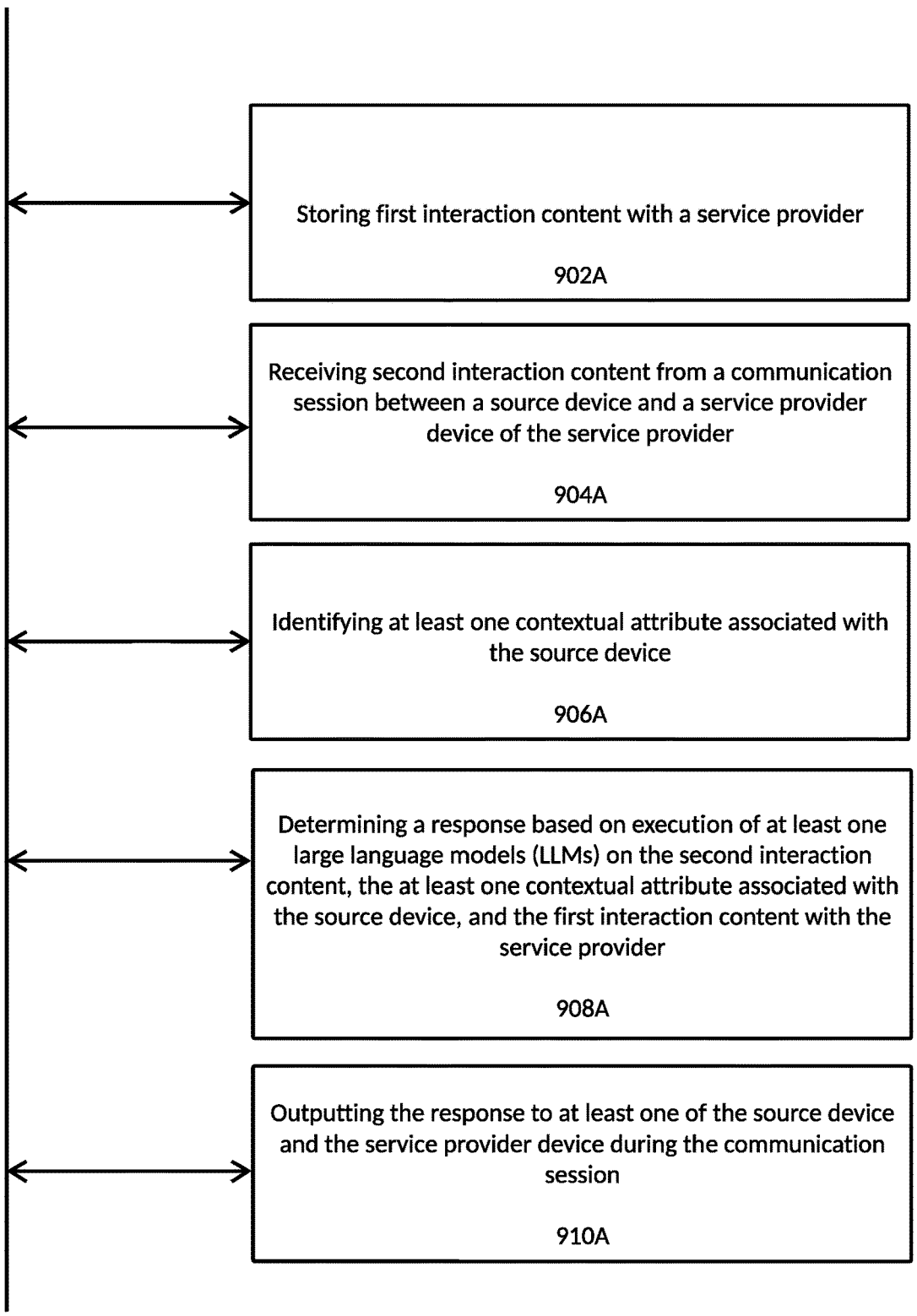
FIGS. 9A and 9F are diagrams illustrating a method of generating a response based on conversation context and previous conversations according to example embodiments.

FIG. 9A illustrates a method 900A of determining a response based on contextual attributes and previous conversation context according to example embodiments. As an example, the method 900A may be performed by a computing system, a software application, a server, a cloud platform, a combination of systems, and the like. Referring to FIG. 9A, in 902A, the method may include storing first interaction content with a service provider. In 904A, the method may include receiving second interaction content from a communication session between a source device and a service provider device of the service provider. In method 906A, the method may include identifying at least one contextual attribute associated with the source device. In 908A, the method may include determining a response based on execution of at least one large language models (LLMs) on the second interaction content, the at least one contextual attribute associated with the source device, and the first interaction content with the service provider. In 910A, the method may include outputting the response to at least one of the source device and the service provider device during the communication session.

Figure 9B:
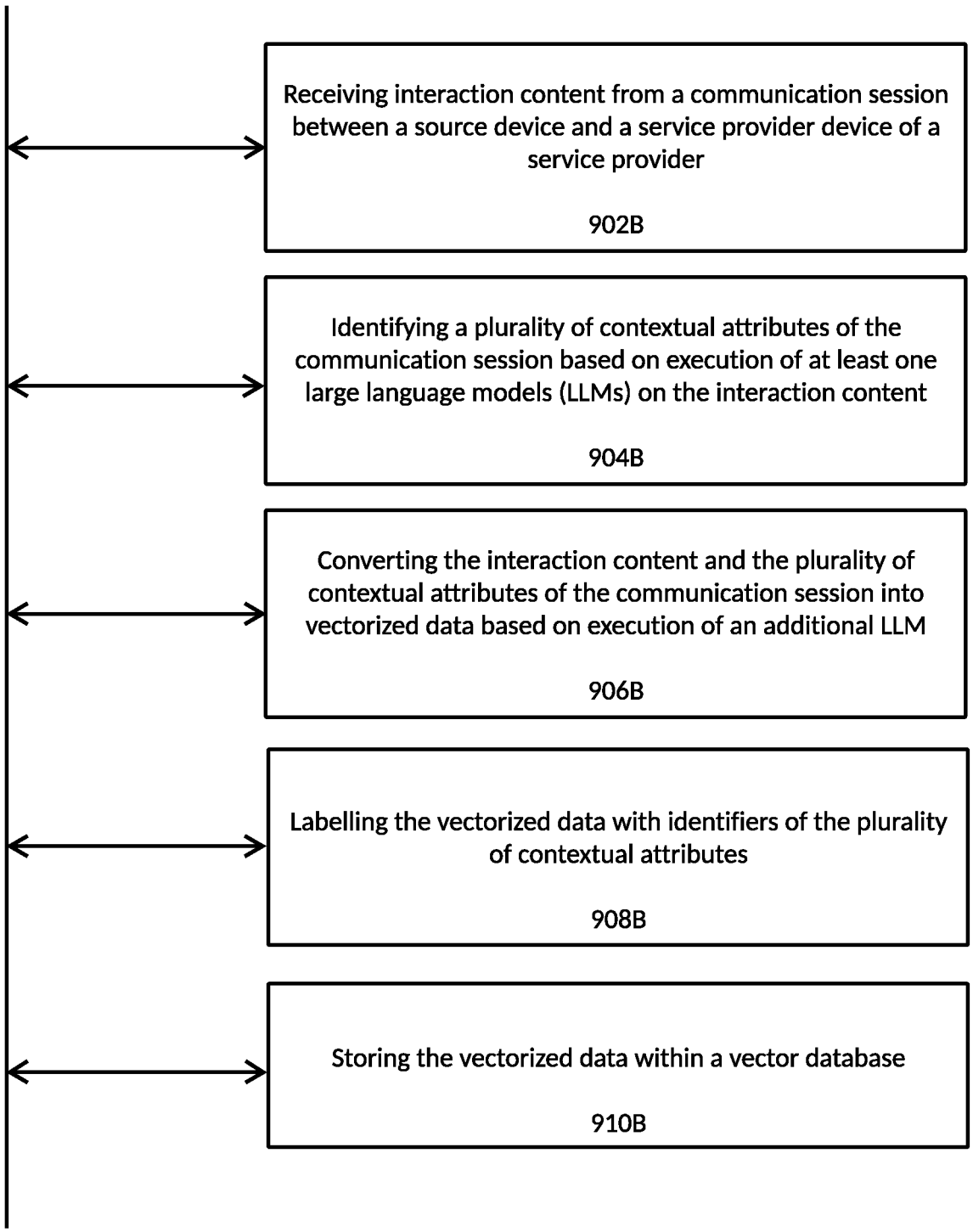
FIGS. 9B and 9G are diagrams illustrating a method of storing contextual interaction content according to example embodiments.

FIG. 9B illustrates a method 900B of storing contextualized attributes for vectorized data according to example embodiments. As an example, the method 900B may be performed by a computing system, a software application, a server, a cloud platform, a combination of systems, and the like. Referring to FIG. 9B, in 902B, the method may include receiving interaction content from a communication session between a source device and a service provider device of a service provider. In 904B, the method may include identifying a plurality of contextual attributes of the communication session based on execution of at least one large language models (LLMs) on the interaction content. In method 906B, the method may include converting the interaction content and the plurality of contextual attributes of the communication session into vectorized data based on execution of an additional LLM. In 908B, the method may include labelling the vectorized data with identifiers of the plurality of contextual attributes. In 910B, the method may include storing the vectorized data within a vector database.

Figure 9C:
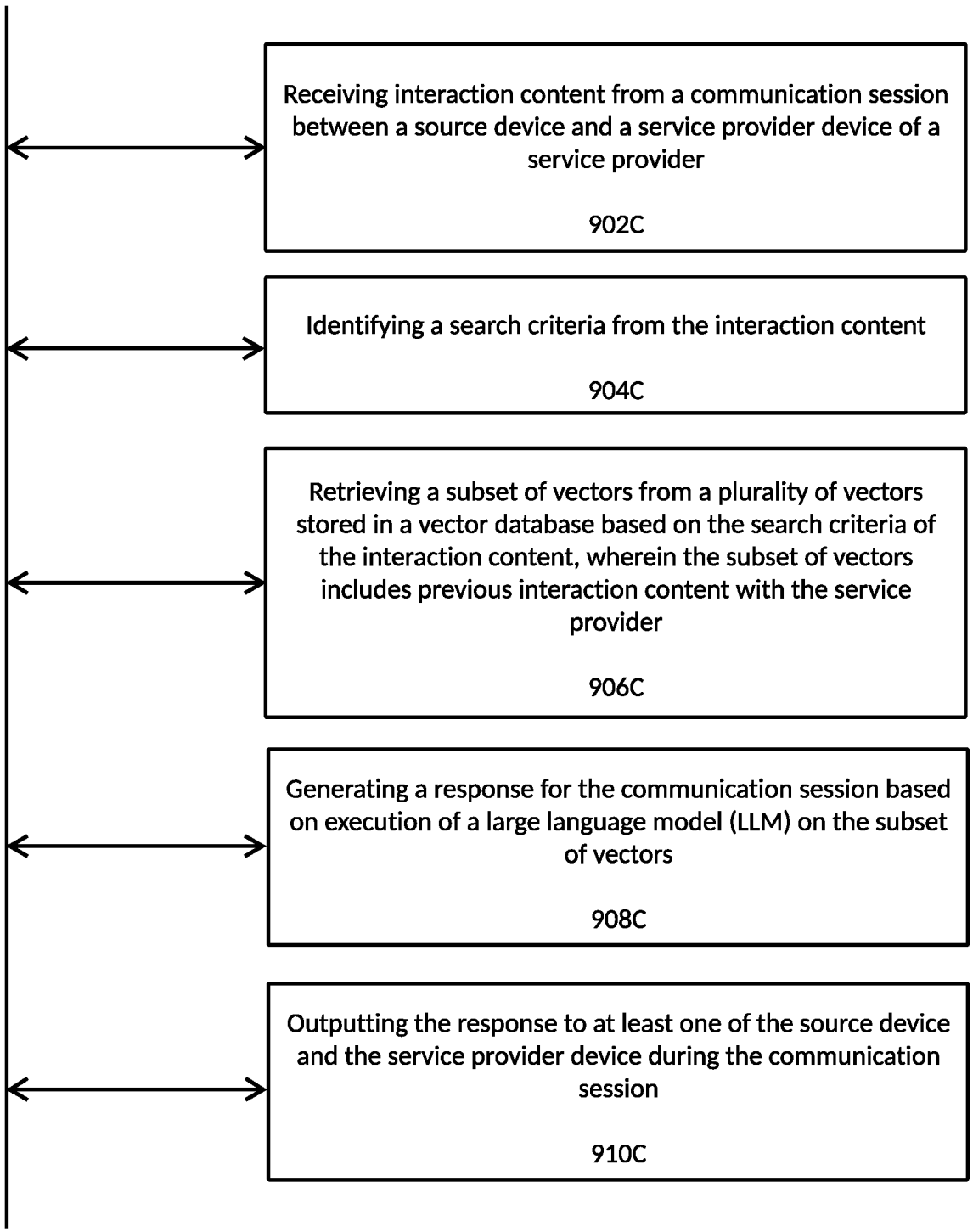
FIGS. 9C and 9H are diagrams illustrating a method of generating interaction content using a RAG architecture according to example embodiments.

FIG. 9C illustrates a method 900C of generating a response for a communication session based on previous conversation content according to example embodiments. As an example, the method 900C may be performed by a computing system, a software application, a server, a cloud platform, a combination of systems, and the like. Referring to FIG. 9C, in 902C, the method may include receiving interaction content from a communication session between a source device and a service provider device of a service provider. In 904C, the method may include identifying a search criteria from the interaction content. In method 906C, the method may include retrieving a subset of vectors from a plurality of vectors stored in a vector database based on the search criteria of the interaction content, wherein the subset of vectors includes previous interaction content with the service provider. In 908C, the method may include generating a response for the communication session based on execution of a large language model (LLM) on the subset of vectors. In 910C, the method may include outputting the response to at least one of the source device and the service provider device during the communication session.

Figure 9D:
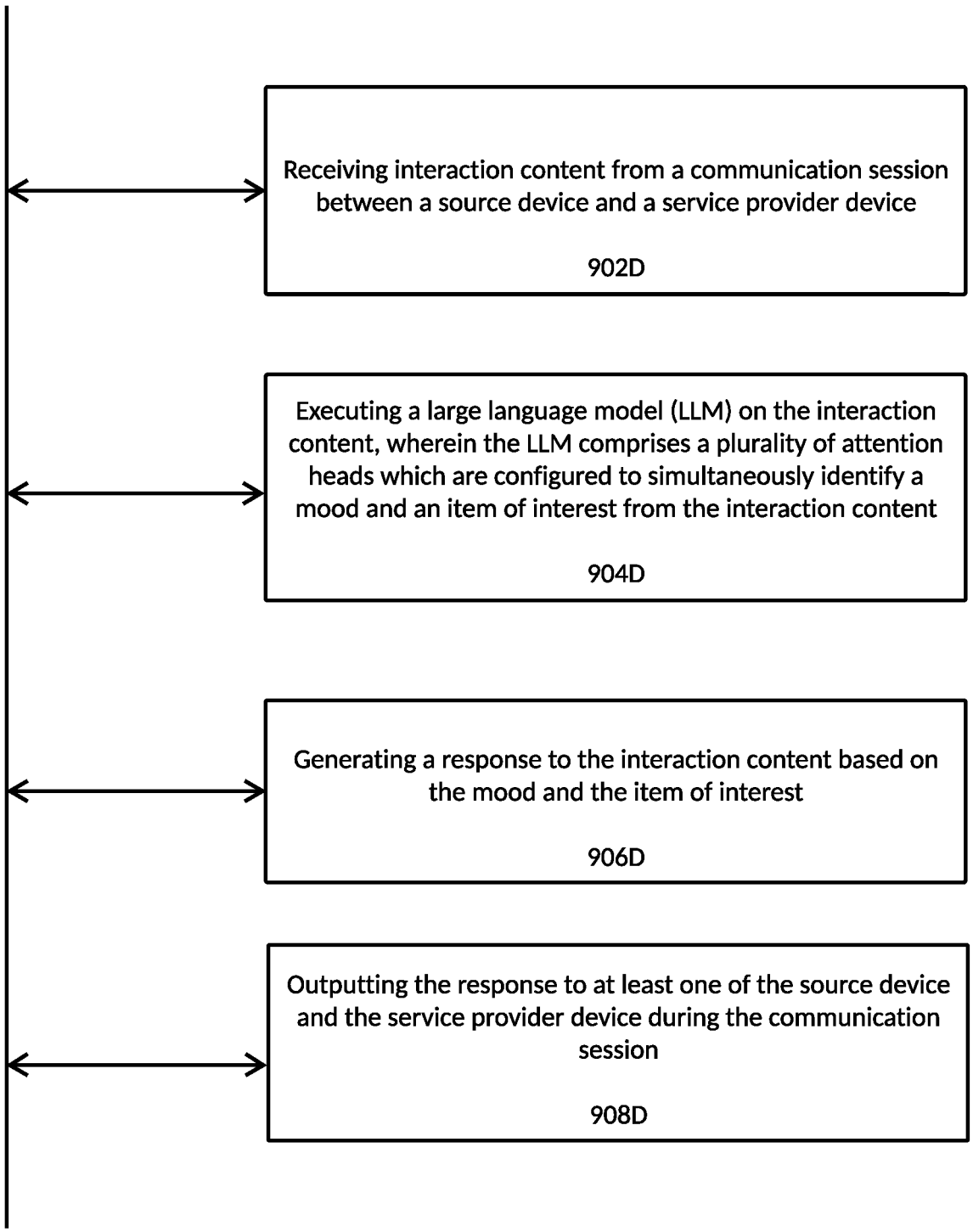
FIGS. 9D and 9I are diagrams illustrating a method of generating interaction content using a parallelized attention head architecture according to example embodiments.

FIG. 9D illustrates a method 900D of generating a conversational mood with parallelized attention head architecture according to example embodiments. As an example, the method 900D may be performed by a computing system, a software application, a server, a cloud platform, a combination of systems, and the like. Referring to FIG. 9D, in 902D, the method may include receiving interaction content from a communication session between a source device and a service provider device. In 904D, the method may include executing a large language model (LLM) on the interaction content, wherein the LLM comprises a plurality of attention heads which are configured to simultaneously identify a mood and an item of interest from the interaction content. In method 906D, the method may include generating a response to the interaction content based on the mood and the item of interest. In 908D, the method may include outputting the response to at least one of the source device and the service provider device during the communication session.

Figure 9E:
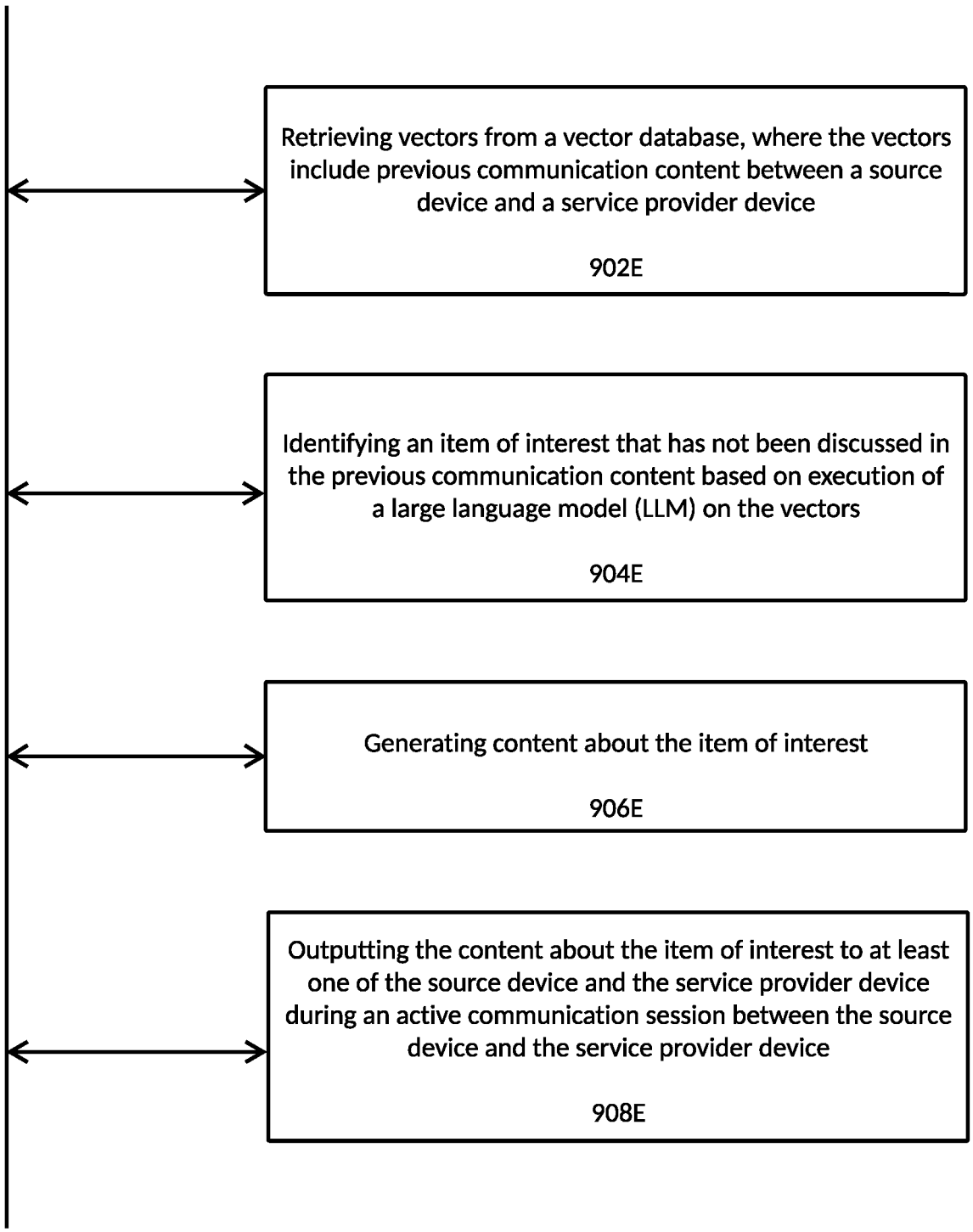
FIGS. 9E and 9J are diagrams illustrating a method of generating content about an item of interest that has not been discussed according to example embodiments.

FIG. 9E illustrates a method 900E of identifying an item of interest in communication content according to example embodiments. As an example, the method 900E may be performed by a computing system, a software application, a server, a cloud platform, a combination of systems, and the like. Referring to FIG. 9E, in 902E, the method may include retrieving vectors from a vector database, where the vectors include previous communication content between a source device and a service provider device. In 904E, the method may include identifying an item of interest that has not been discussed in the previous communication content based on execution of a large language model (LLM) on the vectors. In method 906E, the method may include generating content about the item of interest. In 908E, the method may include outputting the content about the item of interest to at least one of the source device and the service provider device during an active communication session between the source device and the service provider device.

Figure 9F:
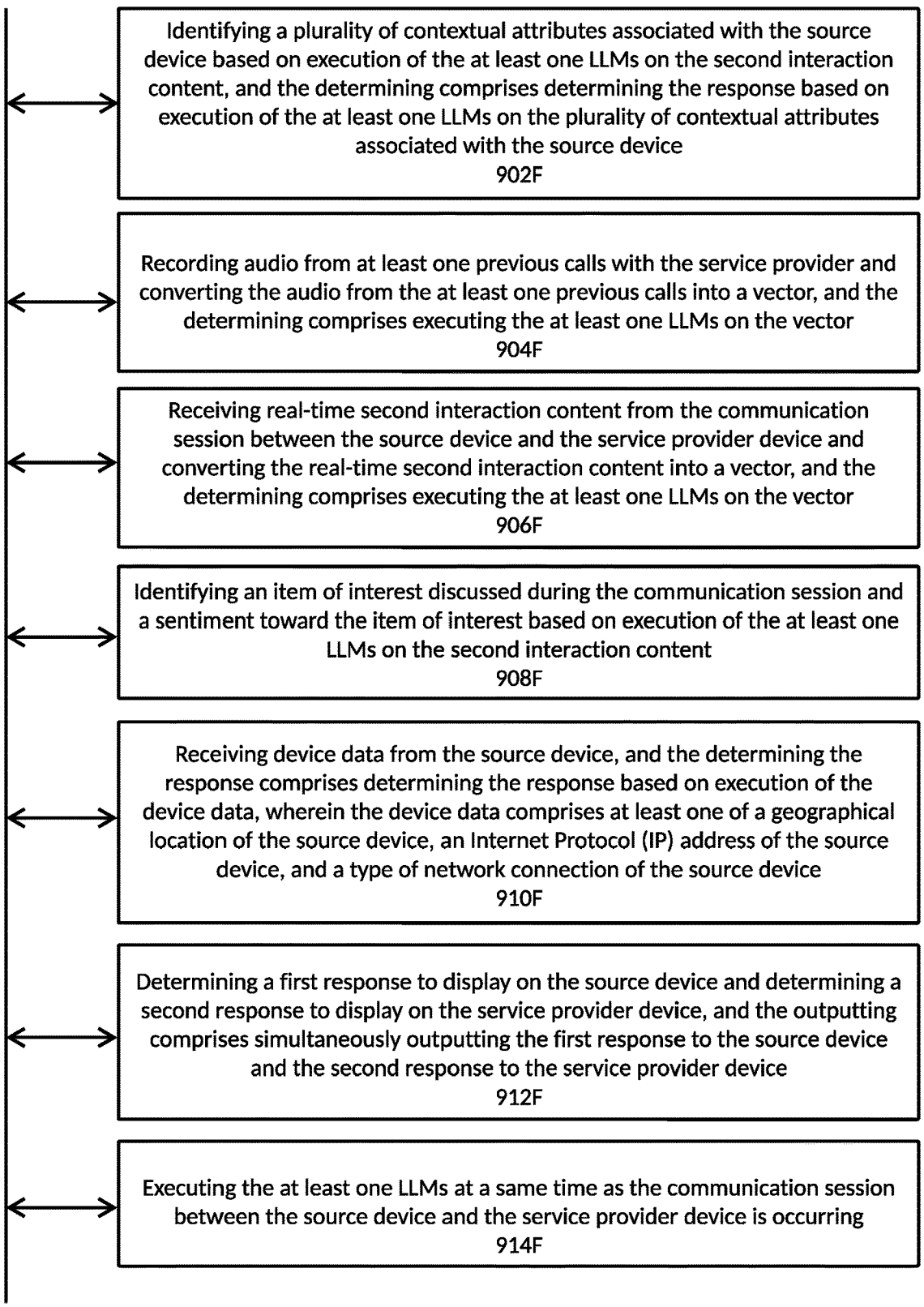

FIG. 9F illustrates an example flow diagram according to example embodiments. As an example, the method 900F may be performed by a computing system, a software application, a server, a cloud platform, a combination of systems, and the like. Referring to FIG. 9F, in 902F, the method may include identifying a plurality of contextual attributes associated with the source device based on execution of the at least one LLMs on the second interaction content, and the determining comprises determining the response based on execution of the at least one LLMs on the plurality of contextual attributes associated with the source device. In 904F, the method may include recording audio from at least one previous calls with the service provider and converting the audio from the at least one previous calls into a vector, and the determining comprises executing the at least one LLMs on the vector. In 906F, the method may include receiving real-time second interaction content from the communication session between the source device and the service provider device and converting the real-time second interaction content into a vector, and the determining comprises executing the at least one LLMs on the vector. In 908F, the method may include identifying an item of interest discussed during the communication session and a sentiment toward the item of interest based on execution of the at least one LLMs on the second interaction content. In 910F, the method may include receiving device data from the source device, and the determining the response comprises determining the response based on execution of the device data, wherein the device data comprises at least one of a geographical location of the source device, an Internet Protocol (IP) address of the source device, and a type of network connection of the source device. In 912F, the method may include determining a first response to display on the source device and determining a second response to display on the service provider device, and the outputting comprises simultaneously outputting the first response to the source device and the second response to the service provider device. In 914F, the method may include executing the at least one LLMs at a same time as the communication session between the source device and the service provider device is occurring.

In one embodiment, the execution of the device data is the execution of the one or more LLMs on the device data.

In one embodiment, the plurality of contextual attributes associated with the source device based on the execution of one or more LLMs on the conversation that are identified could be different contextual attributes previously identified or the same contextual attributes.

Figure 9G:
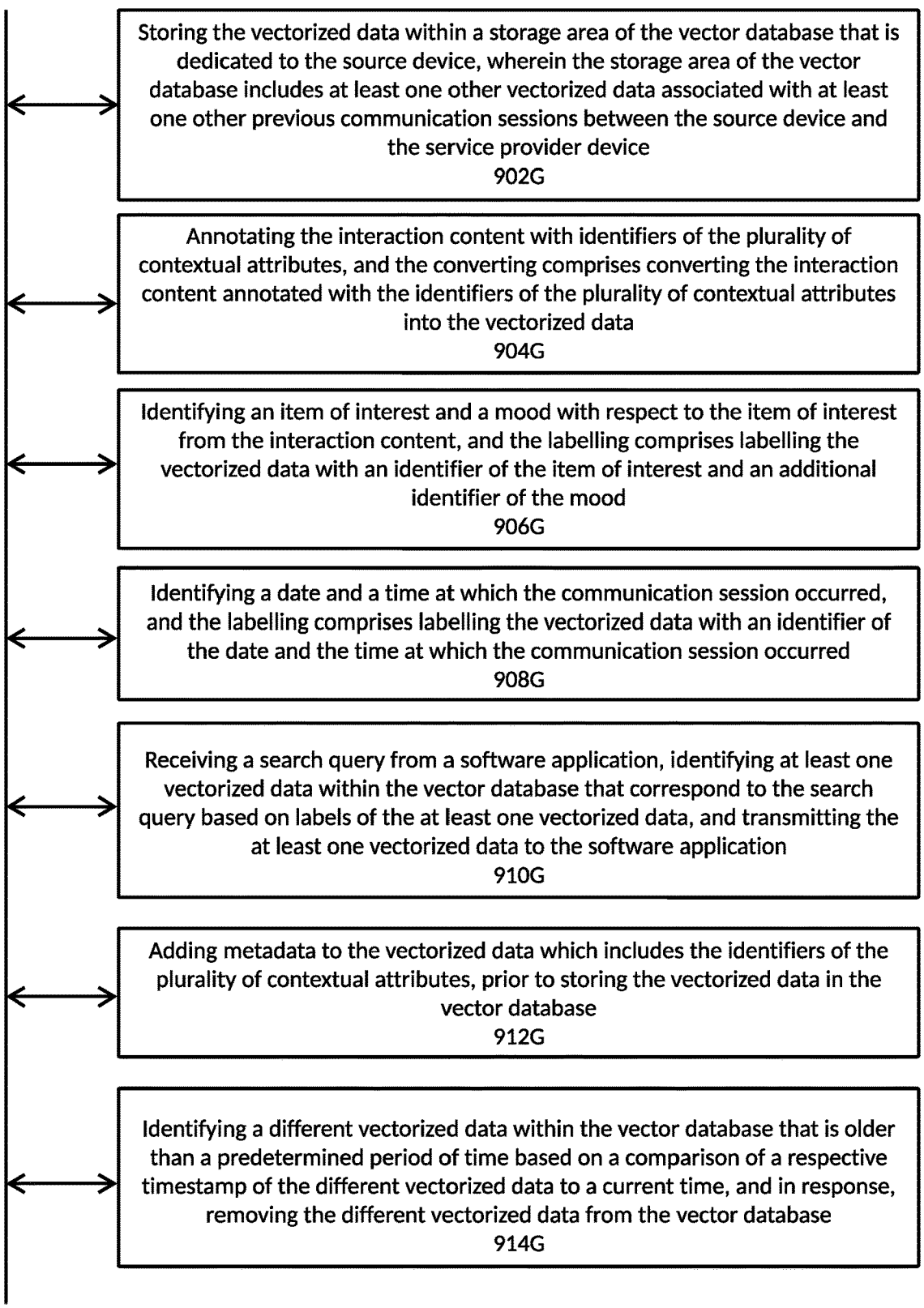

FIG. 9G illustrates an example flow diagram according to example embodiments. As an example, the method 900G may be performed by a computing system, a software application, a server, a cloud platform, a combination of systems, and the like. Referring to FIG. 9G, in 902G, the method may include storing the vectorized data within a storage area of the vector database that is dedicated to the source device, wherein the storage area of the vector database includes at least one other vectorized data associated with at least one other previous communication sessions between the source device and the service provider device. In 904G, the method may include annotating the interaction content with identifiers of the plurality of contextual attributes, and the converting comprises converting the interaction content annotated with the identifiers of the plurality of contextual attributes into the vectorized data. In 906G, the method may include identifying an item of interest and a mood with respect to the item of interest from the interaction content, and the labelling comprises labelling the vectorized data with an identifier of the item of interest and an additional identifier of the mood. In 908G, the method may include identifying a date and a time at which the communication session occurred, and the labelling comprises labelling the vectorized data with an identifier of the date and the time at which the communication session occurred. In 910G, the method may include receiving a search query from a software application, identifying at least one vectorized data within the vector database that correspond to the search query based on labels of the at least one vectorized data, and transmitting the at least one vectorized data to the software application. In 912G, the method may include adding metadata to the vectorized data which includes the identifiers of the plurality of contextual attributes, prior to storing the vectorized data in the vector database. In 914G, the method may include identifying a different vectorized data within the vector database that is older than a predetermined period of time based on a comparison of a respective timestamp of the different vectorized data to a current time, and in response, removing the different vectorized data from the vector database.

Figure 9H:
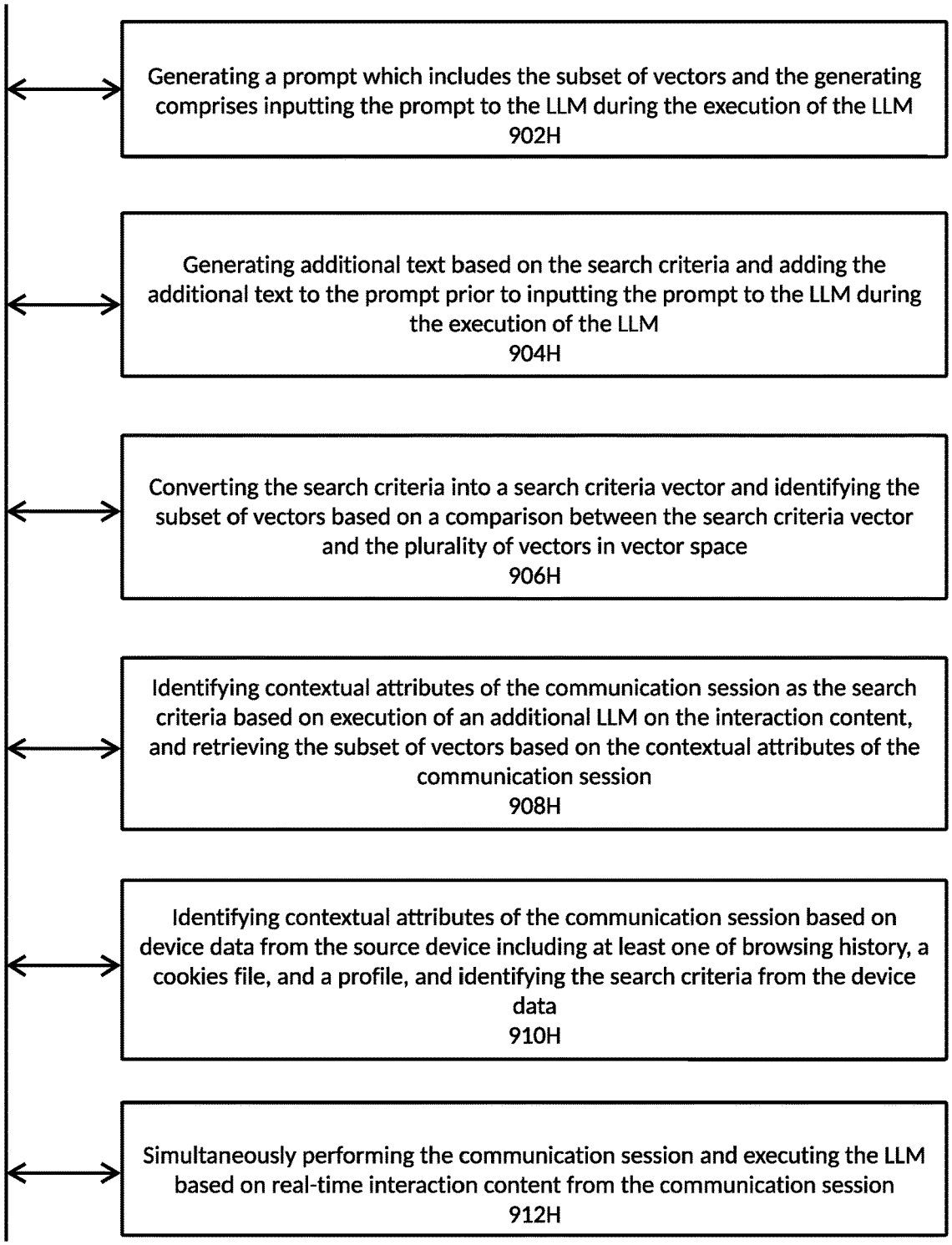

FIG. 9H illustrates an example flow diagram according to example embodiments. As an example, the method 900H may be performed by a computing system, a software application, a server, a cloud platform, a combination of systems, and the like. Referring to FIG. 9H, in 902H, the method may include generating a prompt which includes the subset of vectors and the generating comprises inputting the prompt to the LLM during the execution of the LLM. In 904H, the method may include generating additional text based on the search criteria and adding the additional text to the prompt prior to inputting the prompt to the LLM during the execution of the LLM. In 906H, the method may include converting the search criteria into a search criteria vector and identifying the subset of vectors based on a comparison between the search criteria vector and the plurality of vectors in vector space. In 908H, the method may include identifying contextual attributes of the communication session as the search criteria based on execution of an additional LLM on the interaction content, and retrieving the subset of vectors based on the contextual attributes of the communication session. In 910H, the method may include identifying contextual attributes of the communication session based on device data from the source device including at least one of browsing history, a cookies file, and a profile, and identifying the search criteria from the device data. In 912H, the method may include simultaneously performing the communication session and executing the LLM based on real-time interaction content from the communication session.

Figure 9I:
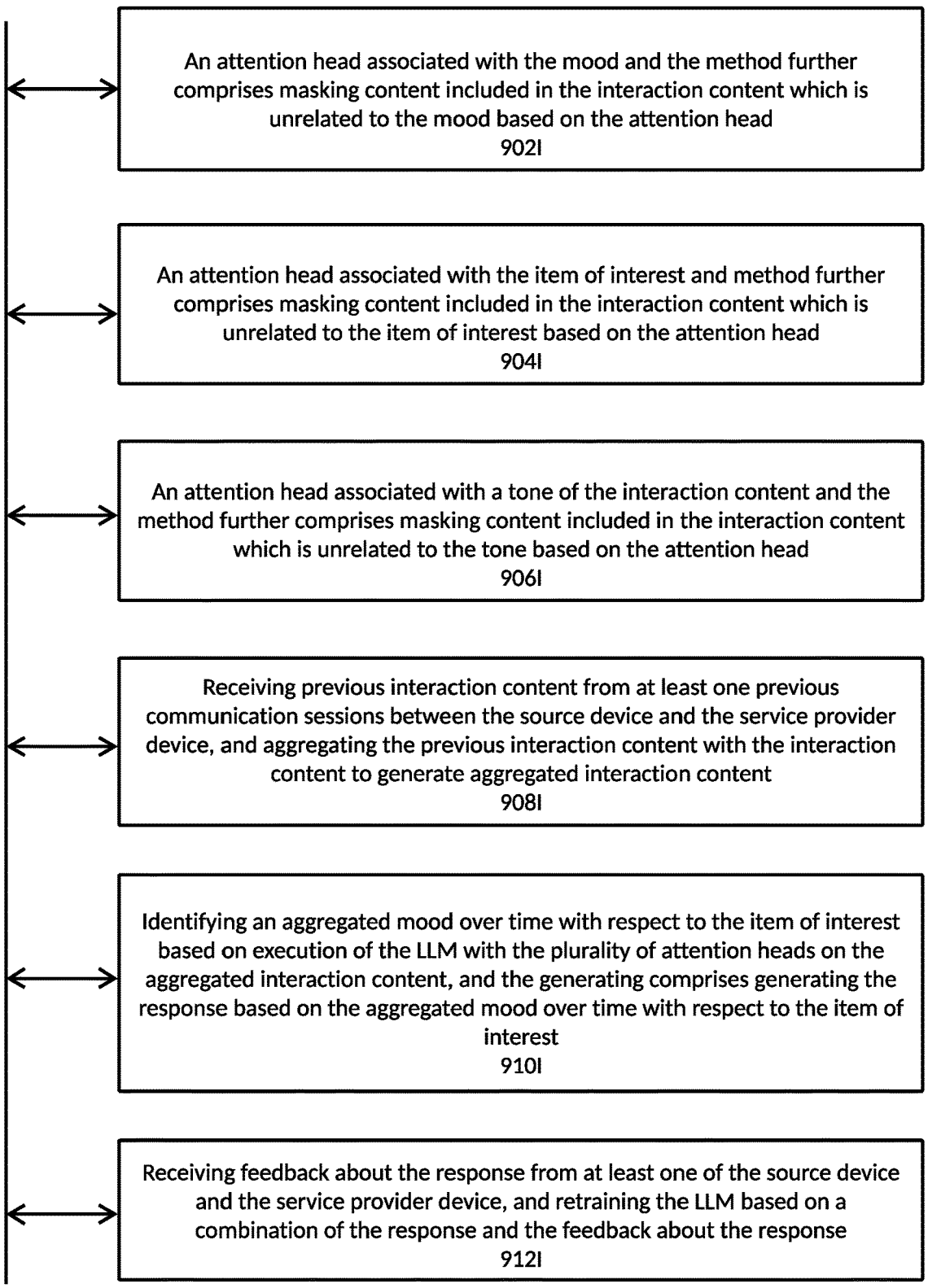

FIG. 9I illustrates an example flow diagram according to example embodiments. As an example, the method 900I may be performed by a computing system, a software application, a server, a cloud platform, a combination of systems, and the like. Referring to FIG. 9I, in 902I, the method may include an attention head associated with the mood and the method further comprises masking content included in the interaction content which is unrelated to the mood based on the attention head. In 904I, the method may include an attention head associated with the item of interest and method further comprises masking content included in the interaction content which is unrelated to the item of interest based on the attention head. In 906I, the method may include an attention head associated with a tone of the interaction content and the method further comprises masking content included in the interaction content which is unrelated to the tone based on the attention head. In 908I, the method may include receiving previous interaction content from at least one previous communication sessions between the source device and the service provider device, and aggregating the previous interaction content with the interaction content to generate aggregated interaction content. In 910I, the method may include identifying an aggregated mood over time with respect to the item of interest based on execution of the LLM with the plurality of attention heads on the aggregated interaction content, and the generating comprises generating the response based on the aggregated mood over time with respect to the item of interest. In 912I, the method may include receiving feedback about the response from at least one of the source device and the service provider device, and retraining the LLM based on a combination of the response and the feedback about the response.

Figure 9J:
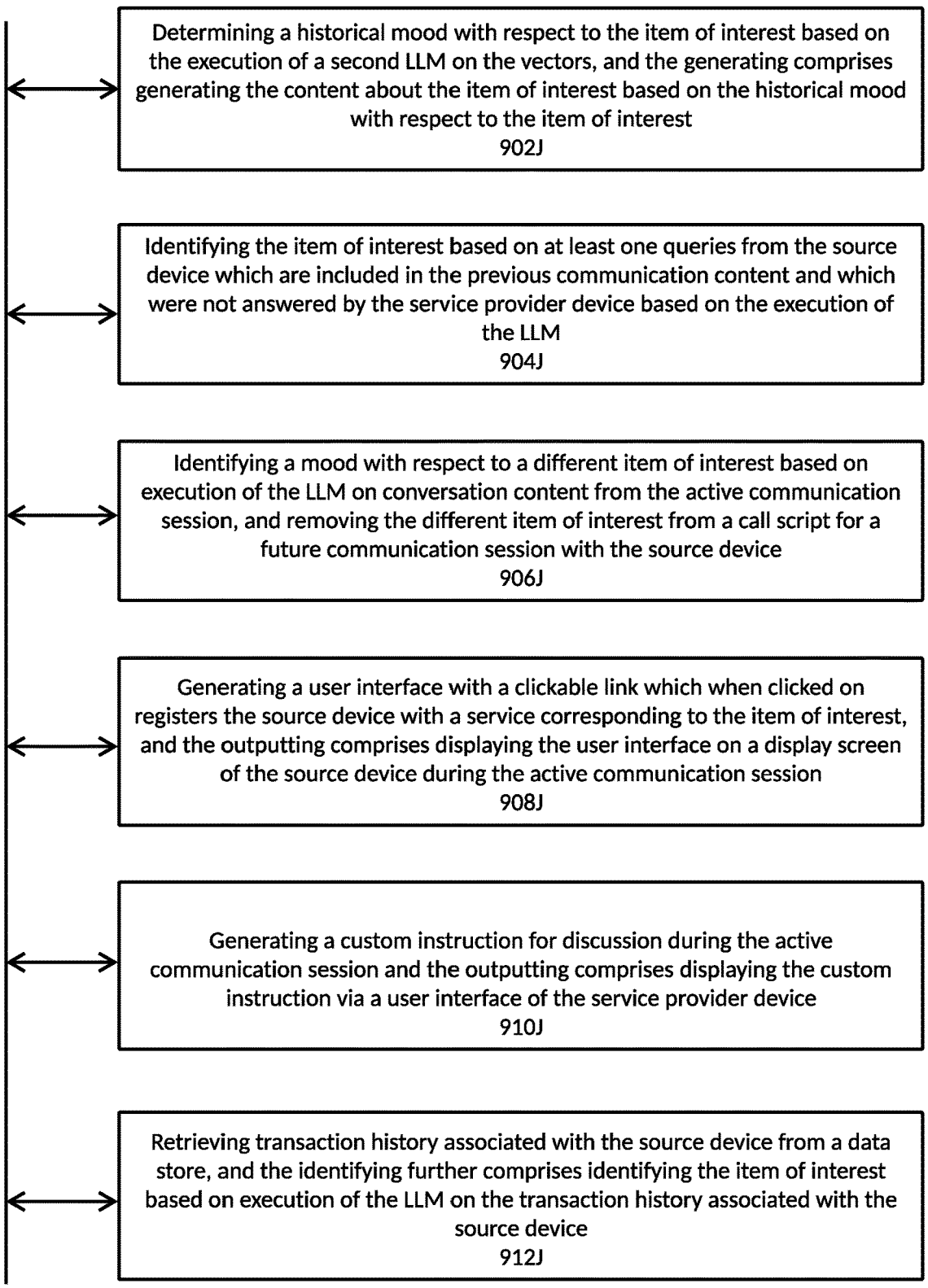

FIG. 9J illustrates an example flow diagram according to example embodiments. As an example, the method 900J may be performed by a computing system, a software application, a server, a cloud platform, a combination of systems, and the like. Referring to FIG. 9J, in 902J, the method may include determining a historical mood with respect to the item of interest based on the execution of a second LLM on the vectors, and the generating comprises generating the content about the item of interest based on the historical mood with respect to the item of interest. In 904J, the method may include identifying the item of interest based on at least one queries from the source device which are included in the previous communication content and which were not answered by the service provider device based on the execution of the LLM. In 906J, the method may include identifying a mood with respect to a different item of interest based on execution of the LLM on conversation content from the active communication session, and removing the different item of interest from a call script for a future communication session with the source device. In 908J, the method may include generating a user interface with a clickable link which when clicked on registers the source device with a service corresponding to the item of interest, and the outputting comprises displaying the user interface on a display screen of the source device during the active communication session. In 910J, the method may include generating a custom instruction for discussion during the active communication session and the outputting comprises displaying the custom instruction via a user interface of the service provider device. In 912J, the method may include retrieving transaction history associated with the source device from a data store, and the identifying further comprises identifying the item of interest based on execution of the LLM on the transaction history associated with the source device.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 10 illustrates an example computer system architecture, which may represent or be integrated in any of the above-described components, etc.

The instant features, structures, or characteristics described in this specification may be combined in any suitable manner in one or more embodiments. For example, the usage of the phrases "example embodiments," "some embodiments,", "a first embodiment", or other similar language throughout this specification refers to the fact that a particular feature, structure, or characteristic described in connection with the one or more embodiments may be included in one or more other embodiments described or depicted herein. Thus, the one or more embodiments, described or depicted throughout this specification can all refer to the same embodiment. Thus, these embodiments may work in conjunction with any of the other embodiments, may not be functionally separate, and the described features, structures, or characteristics may be combined in any suitable manner in one or more embodiments. Although described in a particular manner, by example only, or more feature(s), element(s), and step(s) described herein may be utilized together and in various combinations, without exclusivity, unless expressly indicated otherwise herein. In the figures, any connection between elements can permit one-way and/or two-way communication, even if the depicted connection is a one-way or two-way connection, such as an arrow.

Figure 10:
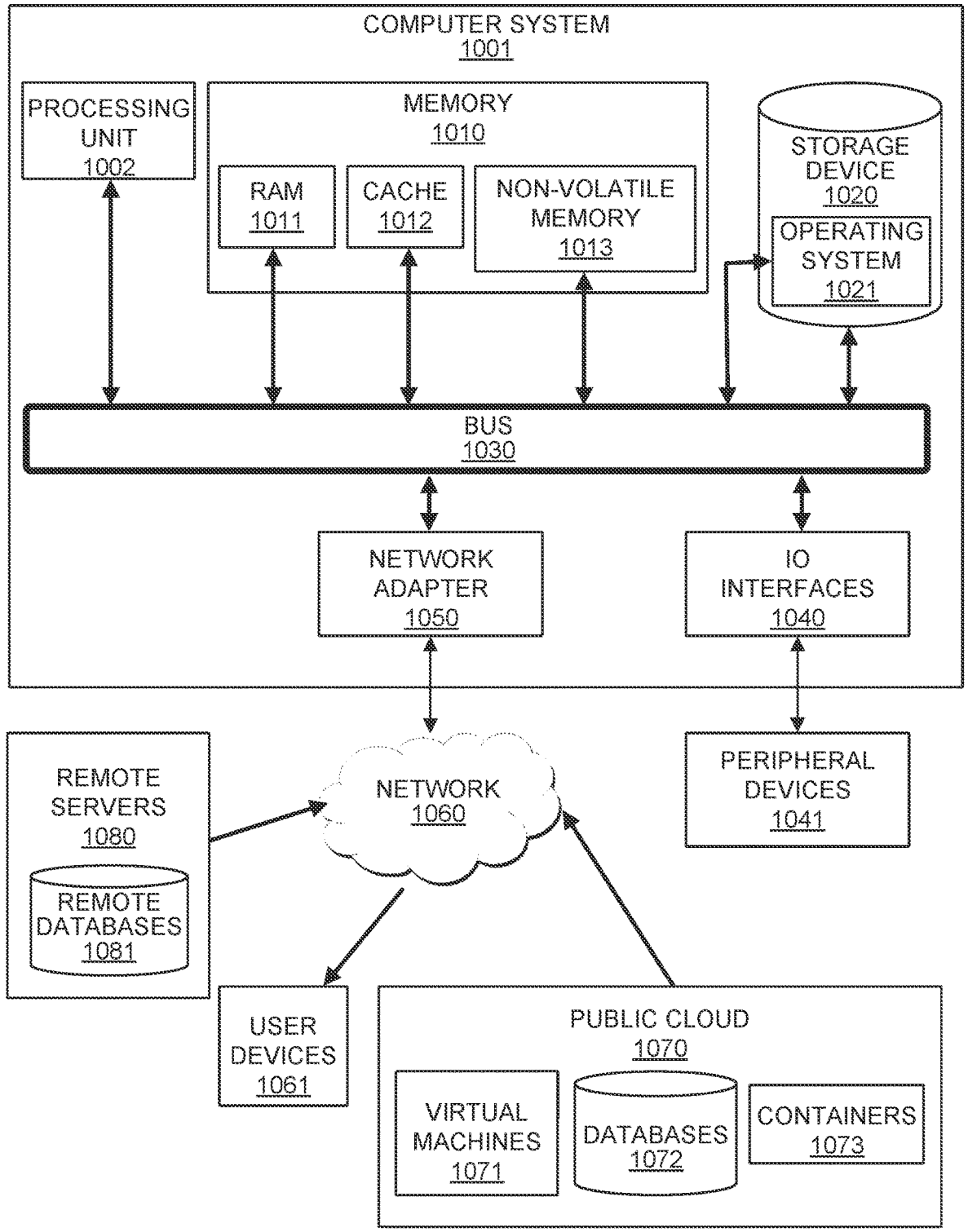
FIG. 10 is a diagram illustrating a computing system that may be used in any of the example embodiments described herein.

FIG. 10 illustrates a computing environment according to example embodiments. FIG. 10 is not intended to suggest any limitation as to the scope of use or functionality of embodiments of the application described herein. Regardless, the computing environment 1000 can be implemented to perform any of the functionalities described herein. In computer environment 1000, there is a computer system 1001, operational within numerous other general-purpose or special-purpose computing system environments or configurations.

Computer system 1001 may take the form of a desktop computer, laptop computer, tablet computer, smartphone, smartwatch or other wearable computer, server computer system, thin client, thick client, network PC, minicomputer system, mainframe computer, quantum computer, and distributed cloud computing environment that include any of the described systems or devices, and the like or any other form of computer or mobile device now known or to be developed in the future that is capable of running a program, accessing a network 1060 or querying a database. Depending upon the technology, the performance of a computer-implemented method may be distributed among multiple computers and among multiple locations. However, in this presentation of the computing environment 1000, a detailed discussion is focused on a single computer, specifically computer system 1001, to keep the presentation as simple as possible.

Computer system 1001 may be located in a cloud, even though it is not shown in a cloud in FIG. 10. On the other hand, computer system 1001 is not required to be in a cloud except to any extent as may be affirmatively indicated. Computer system 1001 may be described in the general context of computer system-executable instructions, such as program modules, executed by a computer system 1001. Generally, program modules may include routines, programs, objects, components, logic, data structures, and so on that perform tasks or implement certain abstract data types. As shown in FIG. 10, computer system 1001 in computing environment 1000 is shown in the form of a general-purpose computing device. The components of computer system 1001 may include, but are not limited to, one or more processors or processing units 1002, a system memory 1010, and a bus 1030 that couples various system components, including system memory 1010 to processing unit 1002.

Processing unit 1002 includes one or more computer processors of any type now known or to be developed. The processing unit 1002 may contain circuitry distributed over multiple integrated circuit chips. The processing unit 1002 may also implement multiple processor threads and multiple processor cores. Cache 1012 is a memory that may be in the processor chip package(s) or may be located "off-chip," as depicted in FIG. 10. Cache 1012 is typically used for data or code that should be available for rapid access by the threads or cores running on the processing unit 1002. In some computing environments, processing unit 1002 may be designed to work with qubits and perform quantum computing.

Memory 1010 is any type of volatile memory now known or to be developed in the future. Examples include dynamic type random access memory (RAM 1011) or static type RAM 1011. Typically, the volatile memory is characterized by random access, but this is not required unless affirmatively indicated. In computer system 1001, memory 1010 is located in a single package and is internal to computer system 1001, but alternatively or additionally, the volatile memory may be distributed over multiple packages and/or located externally with respect to computer system 1001. By way of example only, memory 1010 can be provided for reading from and writing to a non-removable, non-volatile magnetic media (shown as storage device 1020, and typically called a "hard drive"). Memory 1010 may include at least one program product having a set (e.g., at least one) of program modules that are configured to carry out the functions of various embodiments of the application. A typical computer system 1001 may include cache 1012, a type of specialized volatile memory generally faster than RAM 1011 and generally located closer to the processing unit 1002. Cache 1012 stores frequently accessed data and instructions accessed by the processing unit 1002 to speed up processing time. The computer system 1001 may also include non-volatile memory 1013 in the form of ROM, PROM, EEPROM, and flash memory. Non-volatile memory 1013 often contains programming instructions for starting the computer, including the Basic Input/Output System (BIOS) and information required to start the operating system 1021.

Computer system 1001 may include a removable/non-removable, volatile/non-volatile computer storage device 1020. By way of example only, storage device 1020 can be a non-removable, non-volatile magnetic media (not shown and typically called a "hard drive"). It can be connected to the bus 1030 by one or more data interfaces. In embodiments where computer system 1001 is required to have a large amount of storage (for example, where computer system 1001 locally stores and manages a large database), then this storage may be provided by storage devices 1020 designed for storing very large amounts of data, such as a storage area network (SAN) that is shared by multiple, geographically distributed computers.

The operating system 1021 is software that manages computer system 1001 hardware resources and provides common services for computer programs. Operating system 1021 may take several forms, such as various known proprietary operating systems or open-source Portable Operating System Interface type operating systems that employ a kernel.

The bus 1030 represents at least one of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. The bus 1030 is the signal conduction path that allows the various components of computer system 1001 to communicate with each other. Computer system 1001 may also communicate with one or more peripheral devices 1041 via an input/output (I/O) interface 1040. Such devices may include a keyboard, a pointing device, a display, etc., one or more devices that enable a user to interact with computer system 1001; and/or any devices (e.g., network card, modem, etc.) that enable computer system 1001 to communicate with one or more other computing devices. Such communication can occur via I/O interfaces 1040. As depicted, I/O interface 1040 communicates with the other components of computer system 1001 via bus 1030.

Network adapter 1050 enables the computer system 1001 to connect and communicate with one or more networks 1060, such as a local area network (LAN), a wide area network (WAN), and/or a public network (e.g., the Internet). It bridges the computer's internal bus 1030 and the external network, allowing data to be exchanged efficiently and reliably. Network adapter 1050 may include hardware, such as modems or Wi-Fi signal transceivers, software for packetizing and/or de-packetizing data for communication network transmission. Network adapter 1050 supports various communication protocols to ensure compatibility with network standards. For Ethernet connections, it adheres to protocols such as IEEE 802.3, while for wireless communications, it might support IEEE 802.11 standards, Bluetooth, near-field communication (NFC), or other network wireless radio standards.

Network 1060 is any computer network that can receive and/or transmit data. Network 1060 can include a WAN, LAN, private cloud, or public Internet, capable of communicating computer data over non-local distances by any technology for communicating computer data now known or to be developed in the future. Any connection depicted can be wired and/or wireless and may traverse other components that are not shown. In some embodiments, a network 1060 may be replaced and/or supplemented by LANs designed to communicate data between devices located in a local area, such as a Wi-Fi network. The network 1060 typically includes computer hardware such as copper transmission cables, optical transmission fibers, wireless transmission, routers, firewalls, switches, gateway computers, edge servers, and network infrastructure known now or to be developed in the future. Computer system 1001 connects to network 1060 via network adapter 1050 and bus 1030.

User devices 1061 are any computer systems used and controlled by an end user in connection with computer system 1001. For example, in a hypothetical case where computer system 1001 is designed to provide a recommendation to an end user, this recommendation may typically be communicated from network adapter 1050 of computer system 1001 through network 1060 to a user device 1061, allowing user device 1061 to display, or otherwise present, the recommendation to an end user. User devices can be a wide array of devices, including PCs, laptop computers, tablet computers, hand-held computers, mobile phones, etc.

A public cloud 1070 is on-demand availability of computer system resources, including data storage, and computing power, without direct active management by the user. Public clouds 1070 are often distributed, with data centers in multiple locations for availability and performance. Computing resources on public clouds 1070 are shared across multiple tenants through virtual computing environments comprising virtual machines 1071, databases 1072, containers 1073, and other resources. A container 1073 is an isolated, lightweight software for running an application on the host operating system 1021. Containers 1073 are built on top of the host operating system's kernel and contain only applications and some lightweight operating system APIs and services. In contrast, virtual machines 1071 may be referred to as a software layer which may include a complete operating system 1021 and kernel. Virtual machines 1071 are built on top of a hypervisor emulation layer designed to abstract a host computer's hardware from the operating software environment. Public clouds 1070 generally offer hosted databases 1072 abstracting high-level database management activities. It should be further understood that at least one of the elements described or depicted in FIG. 10 can perform at least one of the actions, functionalities, or features described or depicted herein.

Remote servers 1080 are any computers that serve at least some data and/or functionality over a network 1060, for example, WAN, a virtual private network (VPN), a private cloud, or via the Internet to computer system 1001. These networks 1060 may communicate with a LAN to reach users. The user interface may include a web browser or an application that facilitates communication between the user and remote data. Such applications have been referred to as "thin" desktop applications or "thin clients." Thin clients typically incorporate software programs to emulate desktop sessions. Mobile applications can also be used. Remote servers 1080 can also host remote databases 1081, with the database located on one remote server 1080 or distributed across multiple remote servers 1080. Remote databases 1081 are accessible from database client applications installed locally on the remote server 1080, other remote servers 1080, user devices 1061, or computer system 1001 across a network 1060.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by at least one of the modules or components described herein or in a distributed architecture and may include a transmitter, receiver, or pair of both. For example, all or part of the functionality performed by the individual modules may be performed by at least one of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via at least one of the other modules.

One skilled in the art will appreciate that a "system" may be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
    a memory; and
    a processor coupled to the memory, the processor configured to:
        train an artificial intelligence (AI) model to identify contextual attributes from communication content and embed the contextual attributes into vectors;
        receive interaction content from a communication session between a first device and a second device,
        identify contextual attributes from the communication session based on execution of the AI model on the interaction content and embed the contextual attributes into metadata of a vector,
        identify at least one vector stored in a vector database that includes corresponding metadata that contains the contextual attributes,
        generate a response based on execution of a large language model (LLM) on the at least one vector, and
        output the response to the first device during the communication session.

2. The apparatus of claim 1, wherein the processor is further configured to generate a prompt which includes the at least one vector and input the prompt to the LLM during the execution of the LLM.

3. The apparatus of claim 1, wherein the processor is further configured to embed the interaction content into the vector and identify the at least one vector based on a similarity between the vector and a plurality of vectors in vector space.

4. The apparatus of claim 1, wherein the processor is configured to identify a tone and a speech rate of the communication session based on execution of an additional LLM on the interaction content, and embed the tone and the speech rate into the at least one vector.

5. The apparatus of claim 1, wherein the AI model comprises a multi-headed attention mechanism corresponding to a plurality of contextual attributes and the processor is configured to identify a plurality of values for the plurality of contextual attributes from the interaction content based on the multi-headed attention mechanism.

6. The apparatus of claim 1, wherein the processor is configured to simultaneously perform the communication session and execute the LLM based on real-time interaction content from the communication session.

7. A method comprising:
    training an artificial intelligence (AI) model to identify contextual attributes from communication content and embed the contextual attributes into vectors;
    receiving interaction content from a communication session between a first device and a second device;
    identifying contextual attributes from the communication session based on execution of the AI model on the interaction content and embedding the contextual attributes into metadata of a vector;
    identifying at least one vector stored in a vector database that includes corresponding metadata that contains the contextual attributes;
    generating a response based on execution of a large language model (LLM) on the at least one vector; and
    outputting the response to the first device during the communication session.

8. The method of claim 7, wherein the method further comprises generating a prompt which includes the at least one vector and the generating comprises inputting the prompt to the LLM during the execution of the LLM.

9. The method of claim 8, wherein the method further comprises generating additional text and adding the additional text to the prompt prior to inputting the prompt to the LLM during the execution of the LLM.

10. The method of claim 7, wherein the method further comprises embedding the interaction content into the vector and identifying the at least one vector based on a similarity between the vector and a plurality of vectors in vector space.

11. The method of claim 7, wherein the identifying comprises identifying a tone and a speech rate of the communication session based on execution of an additional LLM on the interaction content, and embedding the tone and the speech rate into the at least one vector.

12. The method of claim 7, wherein the AI model comprises a multi-headed attention mechanism corresponding to a plurality of contextual attributes and the identifying comprises identifying a plurality of values for the plurality of contextual attributes from the interaction content based on the multi-headed attention mechanism.

13. The method of claim 7, wherein the generating the response comprises simultaneously performing the communication session and executing the LLM based on real-time interaction content from the communication session.

14. A computer-readable storage medium comprising instructions stored therein which when executed by a processor cause the processor to perform:
    training an artificial intelligence (AI) model to identify contextual attributes from communication content and embed the contextual attributes into vectors;
    receiving interaction content from a communication session between a first device and a second device;
    identifying contextual attributes from the communication session based on execution of the AI model on the interaction content and embedding the contextual attributes into metadata of a vector;
    identifying at least one vector from among a plurality of vectors stored in a vector database which includes corresponding metadata that contains the contextual attributes;
    generating a response based on execution of a large language model (LLM) on the at least one vector; and
    outputting the response to the first device during the communication session.

15. The computer-readable storage medium of claim 14, wherein the processor is further configured to perform generating a prompt which includes the at least one vector and the generating comprises inputting the prompt to the LLM during the execution of the LLM.

16. The computer-readable storage medium of claim 15, wherein the processor is further configured to perform generating additional text and adding the additional text to the prompt prior to inputting the prompt to the LLM during the execution of the LLM.

17. The computer-readable storage medium of claim 14, wherein the processor is further configured to perform embedding the interaction content into a search vector and identifying the at least one vector based on a similarity between the search vector and the plurality of vectors in vector space.

18. The computer-readable storage medium of claim 14, wherein the identifying comprises identifying a tone and a speech rate of the communication session based on execution of an additional LLM on the interaction content, and embedding the tone and the speech rate into the at least one vector.

19. The computer-readable storage medium of claim 14, wherein the AI model comprises a multi-headed attention mechanism corresponding to a plurality of contextual attributes and the identifying comprises identifying a plurality of values for the plurality of contextual attributes from the interaction content based on the multi-headed attention mechanism.

20. The apparatus of claim 1, wherein the processor is configured to identify a cluster of vectors stored within the vector database that include a shared contextual label identifying the contextual attributes, and generate the response based on the cluster of vectors.

\* \* \* \* \*